United States Patent [19]

Matyjaszewski et al.

[11] Patent Number: 5,807,937

[45] Date of Patent: Sep. 15, 1998

[54] PROCESSES BASED ON ATOM (OR GROUP) TRANSFER RADICAL POLYMERIZATION AND NOVEL (CO) POLYMERS HAVING USEFUL STRUCTURES AND PROPERTIES

[75] Inventors: Krzysztof Matyjaszewski; Simion Coca; Scott G. Gaynor; Dorota Greszta; Timothy E. Patten, all of Pittsburgh, Pa.; Jin-Shan Wang, Naperville, Ill.; Jianhui Xia, Pittsburgh, Pa.

[73] Assignee: Carnegie Mellon University, Pittsburgh, Pa.

[21] Appl. No.: 559,309

[22] Filed: Nov. 15, 1995

[51] Int. Cl.$^6$ .................................. C08F 4/06; C08F 4/40
[52] U.S. Cl. ..................... 526/135; 526/145; 526/146; 526/147
[58] Field of Search ............................. 526/92, 135, 145, 526/146, 147

[56] References Cited

U.S. PATENT DOCUMENTS 5,169,914  12/1992  Kaszas et al. .
5,405,913  4/1995  Harwood et al. .
5,451,647  9/1995  Faust et al. ........................... 526/147

Primary Examiner—Joseph L. Schofer
Assistant Examiner—Wu C. Cheng
Attorney, Agent, or Firm—Oblon, Spivak, McClelland, Maier & Neustadt, P.C.

[57] ABSTRACT

Improved processes have been developed for atom (or group) transfer radical polymerization (ATRP). In one improvement, the ATRP process involves polymerizing in the presence of a (partially) free radical-deactivating amount of the corresponding reduced or oxidized transition metal compound. In a further improvement, the ATRP process involves polymerizing in a homogeneous system or in the presence of a solubilized initiating/catalytic system. The present invention also concerns end-functional, site-specific functional and telechelic homopolymers and copolymers; block, random, graft, alternating and tapered (or "gradient") copolymers which may have certain properties or a certain novel structure; star, comb and "hyperbranched" polymers and copolymers; multi-functional hyperbranched, end-functional polymers; cross-linked polymers and gels; water-soluble polymers and hydrogels (e.g., a copolymer prepared by radical copolymerization of a water-soluble monomer and a divinyl monomer); and an ATRP process using water as a medium.

24 Claims, 9 Drawing Sheets

PROCESSES BASED ON ATOM (OR GROUP) TRANSFER RADICAL POLYMERIZATION AND NOVEL (CO) POLYMERS HAVING USEFUL STRUCTURES AND PROPERTIES

BACKGROUND OF THE INVENTION

1. Field of the Invention

The present invention concerns novel (co)polymers and a novel radical polymerization process based on transition metal-mediated atom or group transfer polymerization ("atom transfer radical polymerization").

2. Discussion of the Background

Living polymerization renders unique possibilities of preparing a multitude of polymers which are well-defined in terms of molecular dimension, polydispersity, topology, composition, functionalization and microstructure. Many living systems based on anionic, cationic and several other types of initiators have been developed over the past 40 years (see O. W. Webster, Science, 251, 887 (1991)).

However, in comparison to other living systems, living radical polymerization represented a poorly answered challenge prior to the present invention. It was difficult to control the molecular weight and the polydispersity to achieve a highly uniform product of desired structure by prior radical polymerization processes.

On the other hand, radical polymerization offers the advantages of being applicable to polymerization of a wide variety of commercially important monomers, many of which cannot be polymerized by other polymerization processes. Moreover, it is easier to make random copolymers by radical polymerization than by other (e.g., ionic) polymerization processes. Certain block copolymers cannot be made by other polymerization processes. Further, radical polymerization processes can be conducted in bulk, in solution, in suspension or in an emulsion, in contrast to other polymerization processes.

Thus, a need is strongly felt for a radical polymerization process which provides (co)polymers having a predetermined molecular weight, a narrow molecular weight distribution (low "polydispersity"), various topologies and controlled, uniform structures.

Three approaches to preparation of controlled polymers in a "living" radical process have been described (Greszta et al, *Macromolecules*, 27, 638 (1994)). The first approach involves the situation where growing radicals react reversibly with scavenging radicals to form covalent species. The second approach involves the situation where growing radicals react reversibly with covalent species to produce persistent radicals. The third approach involves the situation where growing radicals participate in a degenerative transfer reaction which regenerates the same type of radicals.

There are some patents and articles on living/controlled radical polymerization. Some of the best-controlled polymers obtained by "living" radical polymerization are prepared with preformed alkoxyamines or are those prepared in situ (U.S. Pat. No. 4,581,429; Hawker, *J. Am. Chem. Soc.*, 116, 11185 (1994); Georges et al, WO 94/11412; Georges et al, *Macromolecules*, 26, 2987 (1993)). A Co-containing complex has been used to prepare "living" polyacrylates (Wayland, B. B., Pszmik, G., Mukerjee, S. L., Fryd, M. J. *Am. Chem. Soc.*, 116, 7943 (1994)). A "living" poly(vinyl acetate) can be prepared using an Al(i-Bu)$_3$: Bpy:TEMPO initiating system (Mardare et al, *Macromolecules*, 27, 645 (1994)). An initiating system based on benzoyl peroxide and chromium acetate has been used to conduct the controlled radical polymerization of methyl methacrylate and vinyl acetate (Lee et al, *J. Chem. Soc. Trans. Faraday Soc. I*, 74, 1726 (1978); Mardare et al, *Polym. Prep. (ACS)*, 36(1) (1995)).

However, none of these "living" polymerization systems include an atom transfer process based on a redox reaction with a transition metal compound.

One paper describes a redox iniferter system based on Ni(O) and benzyl halides. However, a very broad and bimodal molecular weight distribution was obtained, and the initiator efficiency based on benzyl halides used was about 1–2% or less (T. Otsu, T. Tashinori, M. Yoshioka, *Chem. Express* 1990, 5(10), 801). Tazaki et al (*Mem. Fac. Eng., Osaka City Univ.*, vol. 30 (1989), pages 103–113) disclose a redox iniferter system based on reduced nickel and benzyl halides or xylylene dihalides. The examples earlier disclosed by Tazaki et al do not include a coordinating ligand. Tazaki et al also disclose the polymerization of styrene and methyl methacrylate using their iniferter system.

These systems are similar to the redox initiators developed early (Bamford, in *Comprehensive Polymer Science*, Allen, G., Aggarwal, S. L., Russo, S., eds., Pergamon: Oxford, 1991, vol. 3, p. 123), in which the small amount of initiating radicals were generated by redox reaction between (1) RCHX$_2$ or RCX$_3$ (where X=Br, Cl) and (2) Ni(O) and other transition metals. The reversible deactivation of initiating radicals by oxidized Ni is very slow in comparison with propagation, resulting in very low initiator efficiency and a very broad and bimodal molecular weight distribution.

Bamford (supra) also discloses a Ni[P(OPh)$_3$]$_4$/CCl$_4$ or CBr$_4$ system for polymerizing methyl methacrylate or styrene, and use of Mo(CO)$_n$ to prepare a graft copolymer from a polymer having a brominated backbone and as a suitable transition metal catalyst for CCl$_4$, CBr$_4$ or CCl$_3$CO$_2$Et initiators for polymerizing methyl methacrylate. Organic halides other than CCl$_4$ and CBr$_4$ are also disclosed. Mn$_2$(CO)$_{10}$/CCl$_4$ is taught as a source of CCl$_3$ radicals. Bamford also teaches that systems such as Mn(acac)$_3$ and some vanadium (V) systems have been used as a source of radicals, rather than as a catalyst for transferring radicals.

A number of the systems described by Bamford are "self-inhibiting" (i.e., an intermediate in initiation interferes with radical generation). Other systems require coordination of monomer and/or photoinitiation to proceed. It is further suggested that photoinitiating systems result in formation of metal-carbon bonds. In fact, Mn(CO)$_5$Cl, a thermal initiator, is also believed to form Mn—C bonds under certain conditions.

In each of the reactions described by Bamford, the rate of radical formation appears to be the rate-limiting step. Thus, once a growing radical chain is formed, chain growth (propagation) apparently proceeds until transfer or termination occurs.

Another paper describes the polymerization of methyl methacrylate, initiated by CCl$_4$ in the presence of RuCl$_2$(PPh$_3$)$_3$. However, the reaction does not occur without methylaluminum bis(2,6-di-tert-butylphenoxide), added as an activator (see M. Kato, M. Kamigaito, M. Sawamoto, T. Higashimura, *Macromolecules*, 28, 1721 (1995)).

U.S. Pat. No. 5,405,913 (to Harwood et al) discloses a redox initiating system consisting of Cu$^{II}$ salts, enolizable aldehydes and ketones (which do not contain any halogen atoms), various combinations of coordinating agents for Cu$^{II}$ and Cu$^{I}$, and a strong amine base that is not oxidized by Cu$^{II}$. The process of Harwood et al requires use of a strong amine base to deprotonate the enolizable initiator (thus forming an enolate ion), which then transfers a single electron to $Cu^{II}$, consequently forming an enolyl radical and $Cu^{I}$. The redox initiation process of Harwood et al is not reversible.

In each of the systems described by Tazaki et al, Otsu et al, Harwood et al and Bamford, polymers having uncontrolled molecular weights and polydispersities typical for those produced by conventional radical processes were obtained (i.e., >1.5). Only the system described by Kato et al (*Macromolecules*, 28, 1721 (1995)) achieves lower polydispersities. However, the polymerization system of Kato et al requires an additional activator, reportedly being inactive when using $CCl_4$, transition metal and ligand alone.

Atom transfer radical addition, ATRA, is a known method for carbon-carbon bond formation in organic synthesis. (For reviews of atom transfer methods in organic synthesis, see Curran, D. P. *Synthesis*, 1988, 489; Curran, D. P. in *Free Radicals in Synthesis and Biology*, Minisci, F., ed., Kluwer: Dordrecht, 1989, p. 37; and Curran, D. P. in *Comprehensive Organic Synthesis*, Trost, B. M., Fleming, I., eds., Pergamon: Oxford, 1991, Vol. 4, p. 715.) In a very broad class of ATRA, two types of atom transfer methods have been largely developed. One of them is known as atom abstraction or homolytic substitution (see Curran et al, *J. Org. Chem.*, 1989, 54, 3140; and Curran et al, *J. Am. Chem. Soc.*, 1994, 116, 4279), in which a univalent atom (typically a halogen) or a group (such as SPh or SePh) is transferred from a neutral molecule to a radical to form a new σ-bond and a new radical in accordance with Scheme 1 below:

Scheme 1

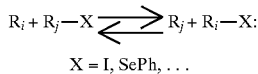

$X = I, SePh, \ldots$

In this respect, iodine atom and the SePh group were found to work very well, due to the presence of very weak C—I and C—SePh bonds towards the reactive radicals (Curran et al, *J. Org. Chem.* and *J. Am. Chem. Soc.*, supra). In earlier work, the present inventors have discovered that alkyl iodides may induce the degenerative transfer process in radical polymerization, leading to a controlled radical polymerization of several alkenes. This is consistent with the fact that alkyl iodides are outstanding iodine atom donors that can undergo a fast and reversible transfer in an initiation step and degenerative transfer in a propagation step (see Gaynor et al, *Polym. Prep.* (Am. Chem. Soc., Polym. Chem. Div.), 1995, 36(1), 467; Wang et al, *Polym. Prep.* (Am. Chem. Soc., Polym. Chem. Div.), 1995, 36(1), 465; Matyjaszewski et al, *Macromolecules*, 1995, 28, 2093). By contrast, alkyl bromides and chlorides are relatively inefficient degenerative transfer reagents.

Another atom transfer method is promoted by a transition metal species (see Bellus, D. *Pure & Appl. Chem.* 1985, 57, 1827; Nagashima, H.; Ozaki, N.; Ishii, M.; Seki, K.; Washiyama, M.; Itoh, K. *J. Org. Chem.* 1993, 58, 464; Udding, J. H.; Tuijp, K. J. M.; van Zanden, M. N. A.; Hiemstra, H.; Speckamp, W. N. *J. Org. Chem.* 1994, 59, 1993; Seijas et al, *Tetrahedron*, 1992, 48(9), 1637; Nagashima, H.; Wakamatsu, H.; Ozaki, N.; Ishii, T.; Watanabe, M.; Tajima, T.; Itoh, K. *J. Org. Chem.* 1992, 57, 1682; Hayes, T. K.; Villani, R.; Weinreb, S. M. *J. Am. Chem. Soc.* 1988, 110, 5533; Hirao et al, *Syn. Lett.*, 1990, 217; and Hirao et al, *J. Synth. Org. Chem.* (*Japan*), 1994, 52(3), 197; Iqbal, J; Bhatia, B.; Nayyar, N. K. *Chem. Rev.*, 94, 519 (1994); Asscher, M., Vofsi, D. *J. Chem. Soc.* 1963, 1887; and van de Kuil et al, Chem. Mater., 1994, 6, 1675). In these reactions, a catalytic amount of transition metal compound acts as a carrier of the halogen atom in a redox process.

Initially, the transition metal species, $M_t^n$, abstracts halogen atom X from the organic halide, R-X, to form the oxidized species, $M_t^{n+1}X$, and the carbon-centered radical $R^-$. In the subsequent step, the radical, $R^-$, reacts with alkene, M, with the formation of the intermediate radical species, R—M$^-$. The reaction between $M_t^{n+1}X$ and R—M$^-$ results in the target product, R—M—X, and regenerates the reduced transition metal species, $M_t^n$, which further reacts with R—X and promotes a new redox process.

The high efficiency of transition metal-catalyzed atom transfer reactions in producing the target product, R—M—X, in good to excellent yields (often >90%) may suggest that the presence of an $M_t^n/M_t^{n+1}$ cycle-based redox process can effectively compete with the bimolecular termination reactions between radicals (see Curran, *Synthesis*, in *Free Radicals in Synthesis and Biology*, and in *Comprehensive organic Synthesis*, supra). However, the mere presence of a transition metal compound does not ensure success in telomerization or polymerization, even in the presence of initiators capable of donating a radical atom or group. For example, Asscher et al (*J. Chem. Soc.*, supra) reported that copper chloride completely suppresses telomerization.

Furthermore, even where a transition metal compound is present and telomerization or polymerization occurs, it is difficult to control the molecular weight and the polydispersity (molecular weight distribution) of polymers produced by radical polymerization. Thus, it is often difficult to achieve a highly uniform and well-defined product. It is also often difficult to control radical polymerization processes with the degree of certainty necessary in specialized applications, such as in the preparation of end functional polymers, block copolymers, star (co)polymers, etc. Further, although several initiating systems have been reported for "living"/controlled polymerization, no general pathway or process for "living"/ controlled polymerization has been discovered.

Copolymerization of electron-donor type monomers (unsaturated hydrocarbons, vinyl ethers, etc.) with electron acceptor type monomers (acrylates, methacrylates, unsaturated nitriles, unsaturated ketones, etc.) in the presence of monomer complexing agents ($ZnCl_2$, $Et_3Al_2Cl_3$, etc.) yield highly, if not strictly alternating copolymers (Hirooka et al, *J. Polym. Sci. Part B*, 5, 47 (1967); Furukawa et al, *Rubber Chem. Technol.*, 51(3), 601 (1979)). The copolymerization succeeded, however, only if the polar monomer was significantly complexed by the Lewis acid. Further, the copolymerization was often initiated spontaneously, thus yielding very high molecular weight products having broad polydispersities. The mechanism of this reaction is controversial and there are suggestions that it is due to a complex (Hirai, *J. Polym. Sci. Macromol. Rev.*, 11, 47 (1976)) or to enhanced cross-propagation rates (Bamford et al, *J. Polym. Sci. Polym. Lett. Ed.*, 19, 229 (1981) and *J. Chem. Soc. Faraday Trans.* 1, 78, 2497 (1982)).

In the radical copolymerization of isobutylene (IB) and acrylic esters, the resulting copolymers contain at most 20–30% of IB and have low molecular weights because of degradative chain transfer of IB (U.S. Pat. Nos. 2,411,599 and 2,531,196; and Mashita et al, *Polymer*, 36, 2973 (1995).

Conjugated monomers such acrylic esters and acrylonitrile react with donor monomers such as propylene, isobutylene, styrene in the presence of alkylaluminum halide to give 1:1 alternating copolymers (Hirooka et al, *J. Polym. Sci. Polym. Chem.*, 11, 1281 (1973)). The alternating copolymer was obtained when [Lewis acid]$_0$/[acrylic esters]$_0$=0.9 and [IB]$_0$>[acrylic esters]$_0$. The copolymer of IB and methyl acrylate (MA) obtained by using ethyl aluminum sesquichloride and 2-methyl pentanoyl peroxide as an initiating system is highly alternating, with either low or high (60%) isotacticity in the presence of EtAlCl$_2$ (10 molar % relative to MA) at 50° C. (Florjanczyk et al, *Makromol. Chem.,* 183, 1081 (1982)).

Recently, alkyl boron halide was found to have a much higher activity than alkyl aluminum halide in alternating copolymerization of IB and acrylic esters (Mashita et al, *Polymer,* 36, 2983 (1995)). The polymerization rate has a maximum at about −50° C. and decreased significantly above 0° C. The copolymerization is controlled by O$_2$ in terms of both rate and molecular weight. The alternating copolymer was obtained when [IB]$_0$>[Acrylic esters]$_0$. Stereoregularity was considered to be nearly random. The copolymer is an elastomer of high tensile strength and high thermal decomposition temperature. The oil resistance is very good, especially at elevated temperatures, and the hydrolysis resistance was excellent compared to that of the corresponding poly(acrylic ester)s (Mashita et al, supra).

Dendrimers have recently received much attention as materials with novel physical properties (D. A. Tomalia, A. M. Naylor, W. A. G. III, *Angew. Chem., Int. Ed. Engl.* 29, 138 (1990); J. M. J. Frechet, *Science* 263, 1710 (1994)). These polymers have viscosities lower than linear analogs of similar molecular weight, and the resulting macromolecules can be highly functionalized. However, the synthesis of dendrimers is not trivial and requires multiple steps, thus generally precluding their commercial development.

Polymers consisting of hyperbranched phenylenes (O. W. Webster, Y. H. Kim, *J. Am. Chem. Soc.* 112, 4592 (1990) and *Macromolecules* 25, 5561 (1992)), aromatic esters (J. M. J. Frechet, C. J. Hawker, R. Lee, *J. Am. Chem. Soc.,* 113, 4583 (1991)), aliphatic esters (A. Hult, E. Malmstrom, M. Johansson, *J. Polym. Sci. Polym. Ed.* 31, 619 (1993)), siloxanes (L. J. Mathias, T. W. Carothers, *J. Am. Chem. Soc.* 113, 4043 (1991)), amines (M. Suzuki, A. Li, T. Saegusa, *Macromolecules* 25, 7071 (1992)) and liquid crystals (V. Percec, M. Kawasumi, *Macromolecules* 25, 3843 (1992)) have been synthesized in the past few years.

Recently, a method has been described by which functionalized vinyl monomers could be used as monomers for the synthesis of hyperbranched polymers by a cationic polymerization (J. M. J. Frechet, et al., *Science* 269, 1080 (1995)). The monomer satisfies the AB$_2$ requirements for formation of hyperbranched polymers by the vinyl group acting as the difunctional B group, and an additional alkyl halide functional group as the A group. By activation of the A group with a Lewis acid, polymerization through the double bond can occur. In this method, 3-(1-chloroethyl)-ethenylbenzene was used as a monomer and was cationically polymerized in the presence of SnCl$_4$.

A need is strongly felt for a radical polymerization process which provides (co)polymers having a predictable molecular weight and a controlled molecular weight distribution ("polydispersity"). A further need is strongly felt for a radical polymerization process which is sufficiently flexible to provide a wide variety of products, but which can be controlled to the degree necessary to provide highly uniform products with a controlled structure (i.e., controllable topology, composition, stereoregularity, etc.), many of which are suitable for highly specialized uses (such as thermoplastic elastomers, end-functional polymers for chain-extended polyurethanes, polyesters and polyamides, dispersants for polymer blends, etc.).

SUMMARY OF THE INVENTION

Accordingly, one object of the present invention is to provide a novel method for radical polymerization of alkenes based on atom transfer radical polymerization (ATRP), which provides a level of molecular control over the polymerization process presently obtainable only by living ionic or metathesis polymerization, and which leads to more uniform and more highly controllable products.

A further object of the present invention is to provide novel improvements to a method for radical polymerization of alkenes based on atom transfer radical polymerization (ATRP), which increases initiator efficiencies and process yields, and improves product properties.

A further object of the present invention is to provide a broad variety of novel (co)polymers having more uniform properties than those obtained by conventional radical polymerization.

A further object of the present invention is to provide novel (co)polymers having new and useful structures and properties.

A further object of the present invention is to provide a process for radically polymerizing a monomer which is adaptable to use with existing equipment.

A further object of the present invention is to provide a method for producing a (co)polymer which relies on readily available starting materials and catalysts.

A further object of the present invention is to provide (co)polymers having a wide variety of compositions (e.g., random, alternating, tapered, end-functional, telechelic, etc.) and topologies (block, graft, star, dendritic or hyperbranched, comb, etc.) having controlled, uniform and/or well-defined structures and properties.

A further object of the present invention is to provide a novel method for radically polymerizing a monomer which can use water as a solvent and which provides novel water-soluble (co) polymers.

A further object of the present invention is to provide novel (co)polymers which are useful as gels and hydrogels, and to provide novel methods for making such (co) polymers.

A further object of the present invention is to provide novel (co)polymers which are useful in a wide variety of applications (for example, as adhesives, asphalt modifiers, in contact lenses, as detergents, diagnostic agents and supports therefor, dispersants, emulsifiers, elastomers, engineering resins, viscosity index improvers, in ink and imaging compositions, as leather and cement modifiers, lubricants and/or surfactants, with paints and coatings, as paper additives and coating agents, as an intermediate for preparing larger macromolecules such as polyurethanes, as resin modifiers, in textiles, as water treatment chemicals, in the chemical and chemical waste processing, composite fabrication, cosmetics, hair products, personal care products in plastics compounding as, for example, an antistatic agent, in food and beverage packaging, pharmaceuticals [as, e.g., a bulking agent, "slow release" or sustained release compounding agent], in rubber, and as a preservative).

These and other objects of the present invention, which will be readily understood in the context of the following detailed description of the preferred embodiments, have been provided in part by a novel controlled process of atom (or group) radical transfer polymerization, comprising the steps of:

polymerizing one or more radically polymerizable monomers in the presence of an initiating system comprising:
an initiator having a radically transferable atom or group,
a transition metal compound which participates in a reversible redox cycle (i.e., with the initiator),
an amount of the redox conjugate of the transition metal compound sufficient to deactivate at least some initially-formed radicals, and
any N-, O-, P- or S- containing ligand which coordinates in a σ-bond or any carbon-containing ligand which coordinates in a π-bond to the transition metal, or any carbon-containing ligand which coordinates in a carbon-transition metal σ-bond but which does not form a carbon-carbon bond with said monomer under the polymerizing conditions, to form a (co)polymer, and isolating the formed (co)polymer;

and, in part, by novel (co)polymers prepared by atom (or group) radical transfer polymerization.

DESCRIPTION OF THE PREFERRED EMBODIMENTS

Figure 1:
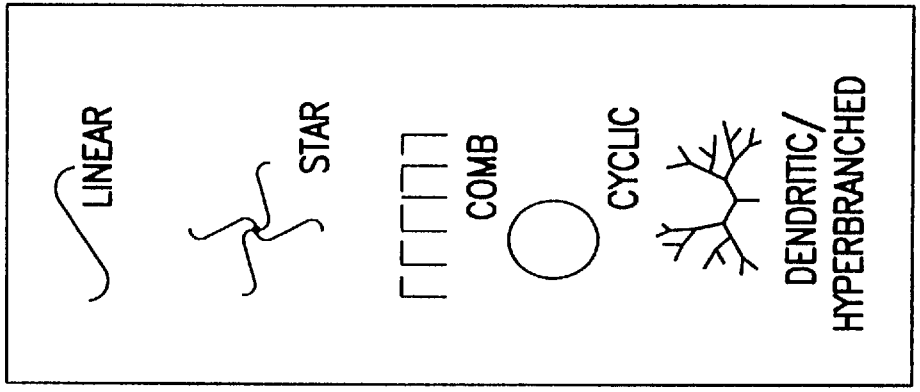
FIG. 1 shows a variety of different polymer topologies, compositions and functionalizations which can be achieved by the present invention, but to which the present invention is not restricted.
Figure 1:
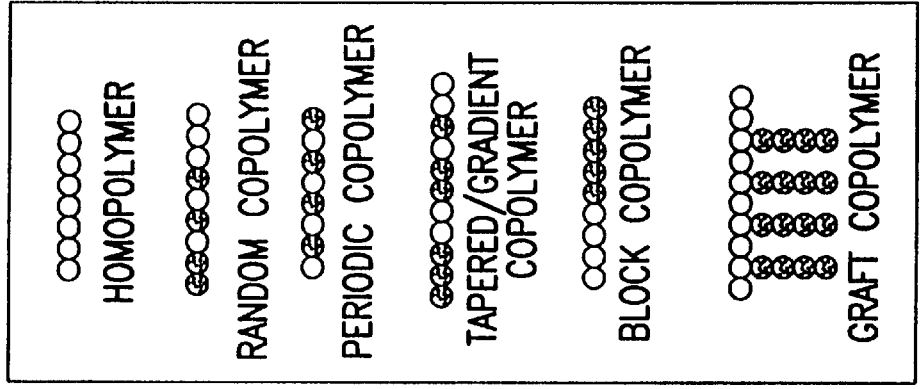
Figure 1:
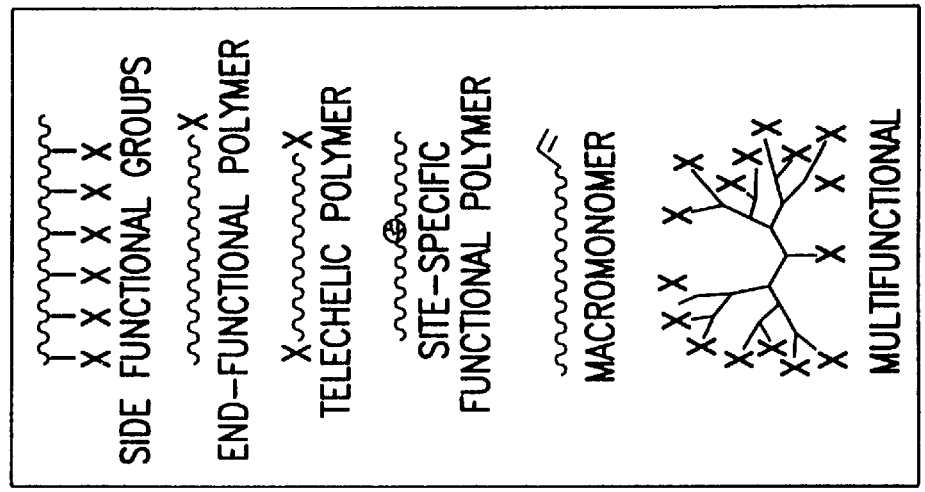

It has been conceptualized that if (1) the organic halide R—$M_t$—X resulting from an ATRA reaction is sufficiently reactive towards the transition metal $M_t^n$ and (2) the alkene monomer is in excess, a number or sequence of atom transfer radical additions (i.e., a possible "living"/ controlled radical polymerization) may occur. By analogy to ATRA, the present new process of radical polymerization has been termed "atom (or group) transfer radical polymerization" (or "ATRP"), which describes the involvement of (1) the atom or group transfer pathway and (2) a radical intermediate.

Living/controlled polymerization (i.e., when chain breaking reactions such as transfer and termination are substantially absent) enables control of various parameters of macromolecular structure such as molecular weight, molecular weight distribution and terminal functionalities. It also allows the preparation of various copolymers, including block and star copolymers. Living/controlled radical polymerization requires a low stationary concentration of radicals, in equilibrium with various dormant species.

In the context of the present invention, the term "controlled" refers to the ability to produce a product having one or more properties which are reasonably close to their predicted value (presuming a particular initiator efficiency). For example, if one assumes 100% initiator efficiency, the molar ratio of catalyst to monomer leads to a particular predicted molecular weight. The polymerization is said to be "controlled" if the resulting number average molecular weight ($M_w$(act)) is reasonably close to the predicted number average molecular weight ($M_w$(pred)); e.g., within an order of magnitude, preferably within a factor of four, more preferably within a factor of three and most preferably within a factor of two (i.e., $M_w$(act) is in the range of from (0.1)×$M_w$(pred) to 10×$M_w$(pred), preferably from (0.25)× $M_w$(pred) to 4×$M_w$(pred), more preferably from (0.5)×$M_w$ (pred) to 2 $M_w$(pred), and most preferably from (0.8)×$M_w$ (pred) to 1.2×$M_w$(pred)).

Similarly, one can "control" the polydispersity by ensuring that the rate of deactivation is the same or greater than the initial rate of propagation. However, the importance of the relative deactivation/propagation rates decreases proportionally with increasing polymer chain length and/or increasing predicted molecular weight or degree of polymerization.

The present invention describes use of novel initiating systems leading to living/controlled radical polymerization. The initiation system is based on the reversible formation of growing radicals in a redox reaction between various transition metal compounds and an initiator, exemplified by (but not limited to) alkyl halides, aralkyl halides or haloalkyl esters. Using 1-phenylethyl chloride (1-PECl) as a model initiator, CuCl as a model catalyst and bipyridine (Bpy) as a model ligand, a "living" radical bulk polymerization of styrene at 130° C. affords the predicted molecular weight up to $M_n \approx 10^5$ with a narrow molecular weight distribution (e.g., $M_w/M_n < 1.5$).

A key factor in the present invention is to achieve rapid exchange between growing radicals present at low stationary concentrations (in the range of from $10^{-9}$ mol/L to $10^{-5}$ mol/L, preferably $10^{-8}$ mol/L to $10^{-5}$ mol/L) and dormant chains present at higher concentrations (typically in the range $10^{-4}$ mol/L to 3 mol/L, preferably $10^{-2}$ mol/L to $10^{-1}$ mol/L). It may be desirable to "match" the initiator/catalyst/ ligand system and monomer(s) such that these concentration ranges are achieved.

Although these concentration ranges are not essential to conducting polymerization, certain disadvantageous effects may result if the concentration ranges are exceeded. For example, if the concentration of growing radicals exceeds $10^{-5}$ mol/L, there may be too many active species in the reaction, which may lead to an undesirable increase in the rate of side reactions (e.g., radical-radical quenching, radical abstraction from species other than the catalyst system, etc.). If the concentration of growing radicals is less than $10^{-9}$ mol/L, the rate may be undesirably slow. However, these considerations are based on an assumption that only free radicals are present in the reaction system. It is believed that some radicals are in a caged form, the reactivities of which, especially in termination-deactivation reactions, may differ from those of uncaged free radicals.

Similarly, if the concentration of dormant chains is less than $10^{-4}$ mol/L, the molecular weight of the product polymer may increase dramatically, thus leading to a potential loss of control of the molecular weight and the polydispersity of the product. On the other hand, if the concentration of dormant species is greater than 3 mol/L, the molecular weight of the product may become too small, and the properties of the product may more closely resemble the properties of oligomers. (However, oligomeric products are useful, and are intended to be included within the scope of the invention.)

For example, in bulk, a concentration of dormant chains of about $10^{-2}$ mol/L provides product having a molecular weight of about 100,000 g/mol. On the other hand, a concentration of dormant chains exceeding 1M leads to formation of (roughly) less than decameric products, and a concentration of about 3M leads to formation of (predominantly) trimers.

In application Ser. No. 08/414,415 (incorporated herein by reference in its entirety), a method of preparing a (co)polymer by ATRP is disclosed which comprises:

polymerizing one or more radically polymerizable monomers in the presence of an initiator having a radically transferable atom or group, a transition metal compound and a ligand to form a (co)polymer, the transition metal compound being capable of participating in a redox cycle with the initiator and a dormant polymer chain, and the ligand being any N-, O-, P- or S- containing compound which can coordinate in a σ-bond to the transition metal or any carbon-containing compound which can coordinate in a π-bond to the transition metal, such that direct bonds between the transition metal and growing polymer radicals are not formed, and isolating the formed (co)polymer.

The present invention includes the following:

(1) an ATRP process in which the improvement comprises polymerizing in the presence of an amount of the corresponding reduced or oxidized transition metal compound which deactivates at least some free radicals;

(2) an ATRP process in which the improvement comprises polymerizing in a homogeneous system or in the presence of a solubilized initiating/catalytic system;

(3) end-functional, site-specific functional and telechelic homopolymers and copolymers (see FIG. 1);

(4) block, random, graft, alternating and tapered (or "gradient") copolymers which may have certain properties or a certain structure (e.g., a copolymer of alternating donor and acceptor monomers, such as the radical copolymer of isobutylene and a (meth)acrylate ester; see FIG. 1);

(5) star, comb and dendritic (or "hyperbranched") polymers and copolymers (see FIG. 1);

(6) end-functional and/or multi-functional hyperbranched polymers (see FIG. 1);

(7) cross-linked polymers and gels;

(8) water-soluble polymers and new hydrogels (e.g., copolymers prepared by radical polymerization, comprising a water-soluble backbone and well-defined hydrophobic (co)polymer chains grafted thereonto); and (9) an ATRP process using water as a medium.

In one embodiment, the present invention concerns improved methods of atom or group transfer radical polymerization, in which a proportion (e.g., 0.1–99.9 mol %, preferably 0.2–10 mol % and more preferably 0.5–5 mol %) of the transition metal catalyst is in an oxidized or reduced state, relative to the bulk of the transition metal catalyst. The oxidized or reduced transition metal catalyst is the redox conjugate of the primary transition metal catalyst; i.e., for the $M_t^{n+}:M_t^{m+}$ redox cycle, 90–99.9 mol % of transition metal $M_t$ atoms may be in the $n^+$ oxidation state and 0.1–10 mol % of transition metal $M_t$ atoms may be in the $m^+$ oxidation state. The term "redox conjugate" thus refers to the corresponding oxidized or reduced form of the transition metal catalyst. Oxidation states n and m are attained by transition metal $M_t$ as a consequence of conducting ATRP.

The present Inventors have found that an amount of redox conjugate sufficient to deactivate at least some of the radicals which may form at the beginning of polymerization (e.g., the product of self-initiation or of addition of an initiator radical or growing polymer chain radical to a monomer) greatly improves the polydispersity and control of the molecular weight of the product. The effects and importance of rates of exchange between growing species of different reactivities and different lifetimes, relative to the rate of propagation, has not been sufficiently explored in previous work by others, but has been found by the present Inventors to have a tremendous effect on polydispersity and control of molecular weight in living/controlled polymerizations.

Figure 2:
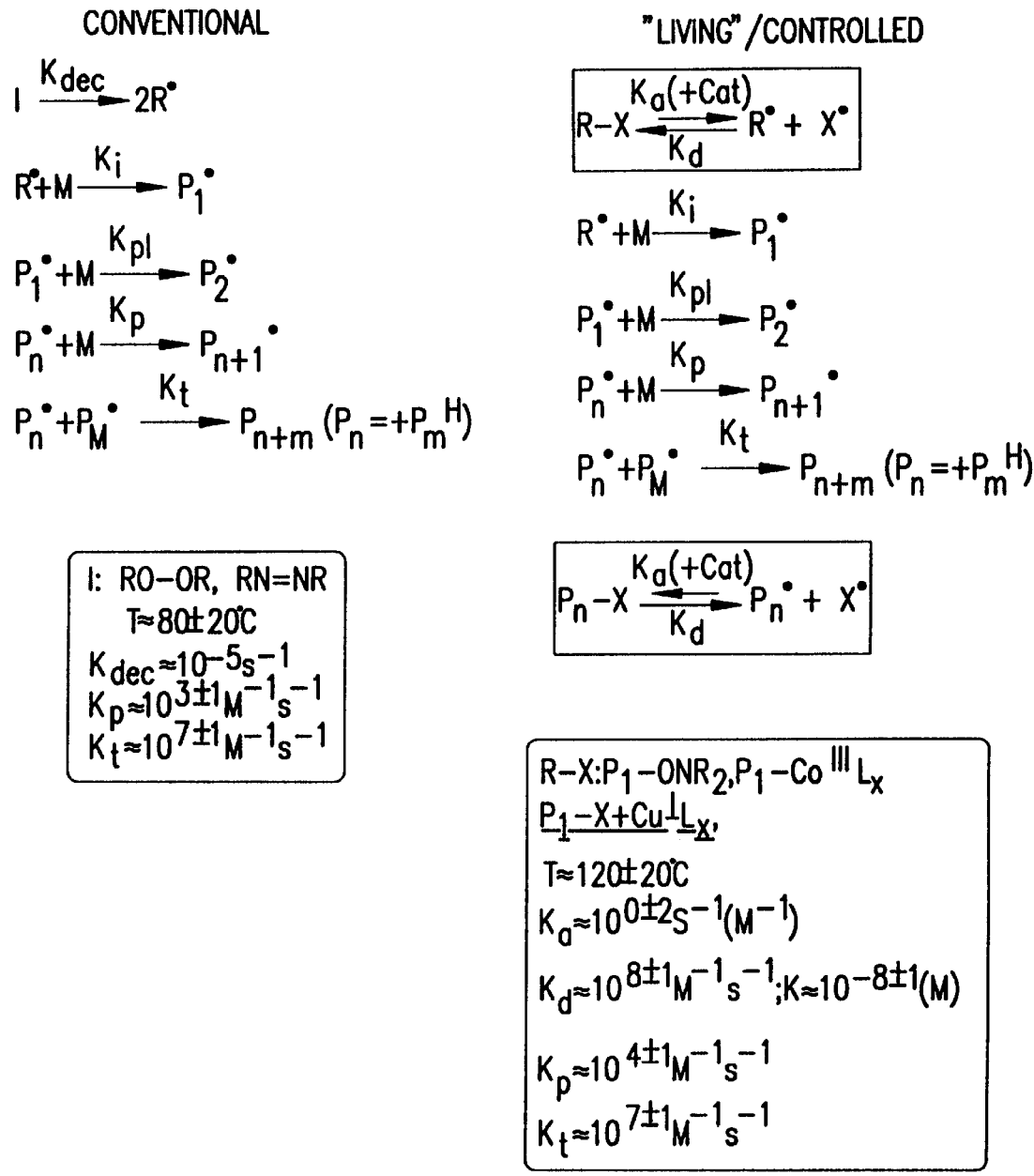
FIG. 2 shows a comparison of mechanisms, exemplary kinetic parameters and product properties of conventional radical polymerization with the present "living"/controlled radical polymerization.

As is shown in FIG. 2, both conventional and controlled polymerizations comprise the reactions of initiating radicals with monomer at a rate constant $k_i$, propagation of growing chains with monomer at a rate constant $k_p$, and termination by coupling and/or disproportionation with an average rate constant $k_t$. In both systems, the concentration of radicals at any given moment (the momentary concentration of growing radicals, or $[P]_0$) is relatively low, about $10^{-7}$ mol/L or less.

However, in conventional radical polymerization, initiator is consumed very slowly ($k_{dec} \approx 10^{-5} \div 1 s^{-1}$). Furthermore, in conventional radical polymerization, the initiator half-lifetime is generally in the range of hours, meaning that a significant proportion of initiator remains unreacted, even after monomer is completely consumed.

By contrast, in controlled polymerization systems, the initiator is largely consumed at low monomer conversion (e.g., 90% or more of initiator may be consumed at less than 10% monomer conversion).

In ATRP, growing radicals are in dynamic equilibrium with dormant covalent species. Covalent R—X and P—X bonds (initiator and dormant polymer, respectively) are homolytically cleaved to form initiating (R⁻) or propagating (P⁻) radicals and corresponding counter-radicals X⁻. The equilibrium position defines the momentary concentration of growing radicals, the polymerization rate and the contribution of termination. The dynamics of equilibration also affects polydispersity and the molecular weight of the polymer as a function of monomer conversion.

A model study has been performed on polymerization of methyl acrylate at 100° C., based on numerical integration using a discrete Galerkin method (Predici program). In this study, the rate constants of propagation ($k_p=7\times10^3$ mol$^{-1}$ L s$^{-1}$) and termination ($k_t=10^7$ mol$^1$ L s$^{-1}$) were based on data available from published literature. The rate constants of activation and deactivation for the initiating system 1-phenylethyl chloride/CuCl/2,2'-bipyridyl were then varied over five orders of magnitude, maintaining an equilibrium constant value K=$10^{-8}$. As a result of this model study, it was found that addition of 1% Cu(II) (redox conjugate) dramatically improves the polydispersity of, and provides predictable molecular weights for, the obtained (co)polymer products.

The equilibrium constant (i.e., the ratio of the activation rate constant $k_a$ to deactivation rate constant $k_d$) can be estimated from known concentrations of radicals, covalent alkyl halides, activator and deactivator according to the equation:

$$K=k_a/k_d=([Cu^{II}][P^-])/([Cu^I][I]_0)$$

Simulations were performed for bulk polymerization of methyl acrylate ([M]$_0$=11 M) or styrene ([M]$_0$=9 M) using an initiating system containing 1-PECl ([I]$_0$=0.1 M), a 2,2'-bipyridyl)CuCl complex ([Cu$^I$]0 =0.1 M) and either 1% or 0% Cu$^{II}$ as an initial deactivator ([Cu$^{II}$]$_0$=0.001 M or 0 M). The stationary concentration of radicals is approximately 10$^{-7}$ M, leading to the result that K is approximately 10$^{-8}$.

After initiation in the system without Cu(II), the momentary concentration of radicals is reduced from 8×10$^{-7}$ M at 10% conversion to 3.3×10$^{-7}$ M at 50% conversion and 1.6×10$^{-7}$ M at 90% conversion. At the same time, the concentration of deactivator (Cu$^{II}$) increases from 1.2×10$^{-4}$ M at 10% conversion to 3×10$^{-4}$ M at 50% conversion and 6×10$^{-4}$ M at 90% conversion. The concentration of deactivator corresponds to the concentration of terminated chains, which at 90% monomer conversion, is only about 0.6% of all chains generated from the initiator.

In the presence of 1% deactivator (redox conjugate), a nearly constant concentration of growing radicals is predicted. The momentary concentration of polymer radicals is much more constant in the presence of 1% deactivator, going from 0.98×10$^{-7}$ M at 10% conversion to 0.94×10$^{-7}$ M at 50% conversion and 0.86×10$^{-7}$ M at 90% conversion. At the same time, the deactivator concentration increases from 1.01×10$^{-3}$ M at 10% conversion to 1.05×10$^{-3}$ M at 50% conversion and 1.15×10$^{-3}$M at 90% conversion. The concentration of terminated chains corresponds to the increase in concentration of deactivator although the initial concentration, which translates to 0.15% of all chains being terminated at 90% conversion.

The dynamics of exchange has no effect on kinetics in the studied range of $k_a$ and $k_d$ values. However, dynamics has a tremendous effect on molecular weights and polydispersities.

In the absence of deactivator in the model systems studied, a degree of polymerization (DP$_n$) of about 90 is expected. However, if deactivation is slow, very high molecular weights are initially observed. As conversion increases, the molecular weights slowly begin to coincide with predicted values. The initial discrepancy has a tremendous effect on polydispersities, as will be discussed below.

If deactivation is sufficiently fast (in the model system, about 10$^7$ mol$^{-1}$ L s$^{-1}$), the predicted and observed molecular weights are in substantial agreement from the beginning of polymerization. However, when deactivation is slow, the initial DP is substantially higher than predicted (DP=60 when $k_d=10^{-6}$ M$^{-1}$ s$^{-1}$, and DP=630 when $k_d=10^{-5}$ M$^{-1}$ s$^{-1}$). Thus, initial values of DP can be predicted by the ratio of propagation to deactivation rates by the equation:

$$DP=R_p/R_d=k_p[M]_0[P^-]/kd[Cu^{III}]_0[P^-]$$

Regardless of the rate of deactivation, however, initial polydispersities are much higher than those predicted for a Poisson distribution. However, if deactivation is sufficiently fast, at complete conversion, vary narrow polydispersities (M$_w$/M$_n$) are observed (e.g., less than 1.1). On the other hand, if the rate of deactivation is about the same as the rate of termination (in the model case, about 10$^7$M$^{-1}$ s$^{-1}$), then the polydispersity at complete conversion is about 1.5. When deactivation is about three times slower, the polydispersity at complete conversion is about 2.5.

However, in the presence of 1% deactivator, a deactivation rate which is about the same as the termination rate results in a polydispersity close to ideal (<1.1) at complete conversion, although initially, it is rather high (about 2), decreasing to about 1.5 at 25% conversion and <1.2 at 75% conversion. Where deactivation is slower ($k_d=10^6$), the final polydispersity is 1.7. A small quantity of deactivator (redox conjugate) is sufficient to trap or quench the free radicals formed during polymerization. A large excess of redox conjugate is not necessary, although it does not have an adverse or continuous effect on the polymerization rate.

It is noted that an average termination rate constant $k_t=10^7$ M$^{-1}$ s$^{-1}$ was used. However, the actual termination rate constant strongly depends on chain length. For monomeric radicals, it can be as high at 10$^9$ M$^{-1}$ s$^{-1}$, but for very long chains, it can be as low as 10$^2$ M$^{-1}$ s$^{-1}$. One major difference between controlled polymerization and conventional radical polymerization is that nearly all chains have similar chain length in controlled polymerization, whereas new radicals are continuously generated in conventional radical polymerization. Therefore, at substantial conversion, long chain radicals do not react with one another, but rather, with newly generated low molecular mass radicals in conventional polymerization. In controlled systems, by contrast, after a certain chain length has been achieved, the reaction mixture becomes more viscous, and the actual rate constant of termination may dramatically drop, thus improving control of polymerization to a degree greater than one would predict prior to the present invention.

The addition of a redox conjugate to ATRP also increases control of molecular weight and polydispersities by scavenging radicals formed by other processes, such as thermal self-initiation of monomer. For example, in the model systems studied, CuCl$_2$ acts as an inhibitor of polymerization, and scavenges polymer chains at an early stage, preventing formation of a high molecular weight polymer which may be formed by thermal self-initiation.

It has been observed by the present Inventors that the rate of polymerization is not affected in a linear fashion by the amount or concentration of the deactivating agent (redox conjugate). For example, the presence of 5 mol % of redox conjugate may be expected to decrease the polymerization rate 10-fold relative to 0.5 mol % of redox conjugate. However, 5 mol % of redox conjugate actually decreases the polymerization rate by a significantly smaller amount than 10-fold relative to 0.5 mol % of redox conjugate. Although a precise explanation for this phenomenon is not yet available, it is believed that many radicals generated by the present ATRP initiator/transition metal compound/ligand system may be protected by a solvent/monomer "cage." Thus, the presence of more than 10 mol % of redox conjugate does not adversely affect polymerization by ATRP, although it may slow the polymerization rate to a small extent.

Experimental observations also support the idea that large amounts of redox conjugate are not harmful to polymerization, a result which is surprising in view of observations that redox conjugates adversely affect ATRA. For example, in the heterogeneous ATRP of acrylates using copper(I) chloride, the color of the catalyst changes from red ($Cu^I$) to green ($Cu^{II}$). However, the apparent rate constant of polymerization is essentially constant, or at least does not significantly decrease.

As described above, the redox conjugate is present in an amount sufficient to deactivate at least some of the initially-formed initiator-monomer adduct radicals, thermal self-initiation radicals and subsequently-formed growing polymer radicals. One key to achieving narrow polydispersities is to control the polymerization reaction parameters such that the rate of radical deactivation is roughly the same as or greater than the rate of propagation.

In one embodiment, the improvement to the method comprises adding the transition metal redox conjugate to the reaction mixture prior to polymerizing. Alternatively, when the transition metal compound is commercially available as a mixture with its redox conjugate (e.g., many commercially available Cu(I) salts contain 1–2 mol % of Cu(II)), the improved process comprises adding the transition metal compound to the polymerization reaction mixture without purification.

In an alternative embodiment, the improved ATRP method comprises exposing the transition metal compound to oxygen for a length of time prior to polymerizing the monomer(s). In preferred embodiments, the source of oxygen is air, and the length of time is sufficient to provide from 0.1 to 10 mol % of the redox conjugate of the transition metal compound. This embodiment is particularly suitable when the transition metal is a Cu(I) compound, such as CuCl or CuBr.

One may also conduct a "reverse" ATRP, in which the transition metal compound is in its oxidized state, and the polymerization is initiated by, for example, a radical initiator such as azobis(isobutyronitrile) ("AIBN"), a peroxide such as benzoyl peroxide (BPO) or a peroxy acid such as peroxyacetic acid or peroxybenzoic acid. The radical initiator is believed to initiate "reverse" ATRP in the following fashion:

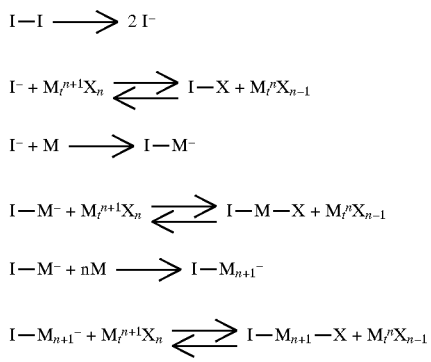

where "I" is the initiator, $M_t^n X_{n-1}$ is the transition metal compound, M is the monomer, and I—M—X and $M_t^n X_{n-1}$ participate in "conventional" or "forward" ATRP in the manner described above.

After the polymerizing step is complete, the formed polymer is isolated. The isolating step of the present process is conducted by known procedures, and may comprise evaporating any residual monomer and/or solvent, precipitating in a suitable solvent, filtering or centrifuging the precipitated polymer, washing the polymer and drying the washed polymer. Transition metal compounds may be removed by passing a mixture containing them through a column or pad of alumina, silica and/or clay. Alternatively, transition metal compounds may be oxidized (if necessary) and retained in the (co)polymer as a stabilizer.

Precipitation can be typically conducted using a suitable $C_5$–$C_8$-alkane or $C_5$–$C_8$-cycloalkane solvent, such as pentane, hexane, heptane, cyclohexane or mineral spirits, or using a $C_1$–$C_6$-alcohol, such as methanol, ethanol or isopropanol, or any mixture of suitable solvents. Preferably, the solvent for precipitating is water, hexane, mixtures of hexanes, or methanol.

The precipitated (co)polymer can be filtered by gravity or by vacuum filtration, in accordance with known methods (e.g., using a Büchner funnel and an aspirator). Alternatively, the precipitated (co)polymer can be centrifuged, and the supernatant liquid decanted to isolate the (co)polymer. The (co)polymer can then be can be washed with the solvent used to precipitate the polymer, if desired. The steps of precipitating and/or centrifuging, filtering and washing may be repeated, as desired.

Once isolated, the (co)polymer may be dried by drawing air through the (co)polymer, by vacuum, etc., in accordance with known methods (preferably by vacuum). The present (co)polymer may be analyzed and/or characterized by size exclusion chromatography, NMR spectroscopy, etc., in accordance with known procedures.

The various initiating systems of the present invention work for any radically polymerizable alkene, including (meth)acrylates, styrenes and dienes. It also provides various controlled copolymers, including block, random, alternating, gradient, star, graft or "comb," and hyper-branched and/or dendritic (co)polymers. (In the present application, "(co)polymer" refers to a homopolymer, copolymer, or mixture thereof.) Similar systems have been used previously in organic synthesis, but have not been used for the preparation of well-defined macromolecular compounds.

In the present invention, any radically polymerizable alkene can serve as a monomer for polymerization. However, monomers suitable for polymerization in the present method include those of the formula:

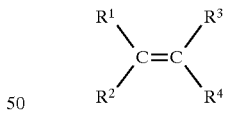

wherein $R^1$ and $R^2$ are independently selected from the group consisting of H, halogen, CN, straight or branched alkyl of from 1 to 20 carbon atoms (preferably from 1 to 6 carbon atoms, more preferably from 1 to 4 carbon atoms) which may be substituted with from 1 to (2n+1) halogen atoms where n is the number of carbon atoms of the alkyl group (e.g. $CF_3$), α, β-unsaturated straight or branched alkenyl or alkynyl of 2 to 10 carbon atoms (preferably from 2 to 6 carbon atoms, more preferably from 2 to 4 carbon atoms) which may be substituted with from 1 to (2n–1) halogen atoms (preferably chlorine) where n is the number of carbon atoms of the alkyl group (e.g. $CH_2$=CCl—), $C_3$–$C_8$ cycloalkyl which may be substituted with from 1 to (2n–1) halogen atoms (preferably chlorine) where n is the number of carbon atoms of the cycloalkyl group, $C(=Y)R^5$, $C(=Y)NR^6R^7$, $YC(=Y)R^5$, $SOR^5$, $SO_2R^5$, $OSO_2R^5$, $NR^8SO_2R^5$, $PR^5{}_2$, $P(=Y)R^5{}_2$, $YPR^5{}_2$, $YP(=Y)R^5{}_2$, $NR^8{}_2$ which may be quaternized with an additional $R^8$ group, aryl and heterocyclyl; where Y may be $NR^8$, S or O (preferably O); $R^5$ is alkyl of from 1 to 20 carbon atoms, alkylthio of from 1 to 20 carbon atoms, $OR^{24}$ (where $R^{24}$ is H or an alkali metal), alkoxy of from 1 to 20 carbon atoms, aryloxy or heterocyclyloxy; $R^6$ and $R^7$ are independently H or alkyl of from 1 to 20 carbon atoms, or $R^6$ and $R^7$ may be joined together to form an alkylene group of from 2 to 7 (preferably 2 to 5) carbon atoms, thus forming a 3- to 8-membered (preferably 3- to 6-membered) ring, and $R^8$ is H, straight or branched $C_1$–$C_{20}$ alkyl or aryl;

$R^3$ and $R^4$ are independently selected from the group consisting of H, halogen (preferably fluorine or chlorine), $C_1$–$C_6$ (preferably $C_1$) alkyl and $COOR^9$ (where $R^9$ is H, an alkali metal, or a $C_1$–$C_6$ alkyl group), or $R^1$ and $R^3$ may be joined to form a group of the formula $(CH_2)_n$, (which may be substituted with from 1 to 2n' halogen atoms or $C_1$–$C_4$ alkyl groups) or $C(=O)$—Y—$C(=O)$, where n' is from 2 to 6 (preferably 3 or 4) and Y is as defined above; and at least two of $R^1$, $R^2$, $R^3$ and $R^4$ are H or halogen.

In the context of the present application, the terms "alkyl", "alkenyl" and "alkynyl" refer to straight-chain or branched groups (except for $C_1$ and $C_2$ groups). "Alkenyl" and "alkynyl" groups may have sites of unsaturation at any adjacent carbon atom position(s) as long as the carbon atoms remain tetravalent, but α,β- or terminal (i.e., at the ω- and (ω-1)-positions) are preferred.

Furthermore, in the present application, "aryl" refers to phenyl, naphthyl, phenanthryl, phenalenyl, anthracenyl, triphenylenyl, fluoranthenyl, pyrenyl, pentacenyl, chrysenyl, naphthacenyl, hexaphenyl, picenyl and perylenyl (preferably phenyl and naphthyl) in which each hydrogen atom may be replaced with halogen, alkyl of from 1 to 20 carbon atoms (preferably from 1 to 6 carbon atoms and more preferably methyl) in which each of the hydrogen atoms may be independently replaced by an X group as defined above (e.g., a halide, preferably a chloride or a bromide), alkenyl or alkynyl of from 2 to 20 carbon atoms in which each of the hydrogen atoms may be independently replaced by an X group as defined above (e.g., a halide, preferably a chloride or a bromide), alkoxy of from 1 to 6 carbon atoms, alkylthio of from 1 to 6 carbon atoms, $C_3$–$C_8$ cycloalkyl in which each of the hydrogen atoms may be independently replaced by an X group as defined above (e.g., a halide, preferably a chloride or a bromide), phenyl, $NH_2$ or $C_1$–$C_6$-alkylamino or $C_1$–$C_6$-dialkylamino which may be quaternized with an $R^8$ group, $COR^5$, $OC(=O)R^5$, $SOR^5$, $SO_2R^5$, $OSO_2R^5$, $PR^5{}_2$, $POR^5{}_2$ and phenyl which may be substituted with from 1 to 5 halogen atoms and/or $C_1$–$C_4$ alkyl groups. (This definition of "aryl" also applies to the aryl groups in "aryloxy" and "aralkyl.") Thus, phenyl may be substituted from 1 to 5 times and naphthyl may be substituted from 1 to 7 times (preferably, any aryl group, if substituted, is substituted from 1 to 3 times) with one or more of the above substituents. More preferably, "aryl" refers to phenyl, naphthyl, phenyl substituted from 1 to 5 times with fluorine or chlorine, and phenyl substituted from 1 to 3 times with a substituent selected from the group consisting of alkyl of from 1 to 6 carbon atoms, alkoxy of from 1 to 4 carbon atoms and phenyl. Most preferably, "aryl" refers to phenyl, tolyl, α-chlorotolyl, α-bromotolyl and methoxyphenyl.

In the context of the present invention, "heterocyclyl" refers to pyridyl, furyl, pyrrolyl, thienyl, imidazolyl, pyrazolyl, pyrazinyl, pyrimidinyl, pyridazinyl, pyranyl, indolyl, isoindolyl, indazolyl, benzofuryl, isobenzofuryl, benzothienyl, isobenzothienyl, chromenyl, xanthenyl, purinyl, pteridinyl, quinolyl, isoquinolyl, phthalazinyl, quinazolinyl, quinoxalinyl, naphthyridinyl, phenoxathiinyl, carbazolyl, cinnolinyl, phenanthridinyl, acridinyl, 1,10-phenanthrolinyl, phenazinyl, phenoxazinyl, phenothiazinyl, oxazolyl, thiazolyl, isoxazolyl, isothiazolyl, and hydrogenated forms thereof known to those in the art. Preferred heterocyclyl groups include pyridyl, furyl, pyrrolyl, thienyl, imidazolyl, pyrazolyl, pyrazinyl, pyrimidinyl, pyridazinyl, pyranyl and indolyl, the most preferred heterocyclyl group being pyridyl. Accordingly, suitable vinyl heterocycles to be used as a monomer in the present invention include 2-vinyl pyridine, 4-vinyl pyridine, 2-vinyl pyrrole, 3-vinyl pyrrole, 2-vinyl oxazole, 4-vinyl oxazole, 2-vinyl thiazole, 4-vinyl thiazole, 2-vinyl imidazole, 4-vinyl imidazole, 3-vinyl pyrazole, 4-vinyl pyrazole, 3-vinyl pyridazine, 4-vinyl pyridazine, 3-vinyl isoxazole, 4-vinyl isoxazole, 3-vinyl isothiazole, 4-vinyl isothiazole, 2-vinyl pyrimidine, 4-vinyl pyrimidine, 5-vinyl pyrimidine, and 2-vinyl pyrazine, the most preferred being 2-vinyl pyridine. The vinyl heterocycles mentioned above may bear one or more substituents as defined above for an "aryl" group (preferably 1 or 2) in which each H atom may be independently replaced, e.g., with $C_1$–$C_6$ alkyl groups, $C_1$–$C_6$ alkoxy groups, cyano groups, ester groups or halogen atoms, either on the vinyl group or the heterocyclyl group, but preferably on the heterocyclyl group. Further, those vinyl heterocycles which, when unsubstituted, contain a N atom may be quaternized with an $R^8$ group (as defined above), and those which contain an N=H group may be protected at that position with a conventional blocking or protecting group, such as a $C_1$–$C_6$ alkyl group, a tris-($C_1$–$C_6$ alkyl)silyl group, an acyl group of the formula $R^{10}CO$ (where $R^{10}$ is alkyl of from 1 to 20 carbon atoms in which each of the hydrogen atoms may be independently replaced by halide [preferably fluoride or chloride]), alkenyl of from 2 to 20 carbon atoms (preferably vinyl), alkynyl of from 2 to 10 carbon atoms (preferably acetylenyl), phenyl which may be substituted with from 1 to 5 halogen atoms or alkyl groups of from 1 to 4 carbon atoms, or aralkyl (aryl-substituted alkyl, in which the aryl group is phenyl or substituted phenyl and the alkyl group is from 1 to 6 carbon atoms, such as benzyl), etc. This definition of "heterocyclyl" also applies to the heterocyclyl groups in "heterocyclyloxy" and "heterocyclic ring."

More specifically, preferred monomers include $C_3$–$C_{12}$ α-olefins, isobutene, (meth)acrylic acid and alkali metal salts thereof, (meth)acrylate esters of $C_1$–$C_{20}$ alcohols, acrylonitrile, acrylamide, cyanoacrylate esters of $C_1$–$C_{20}$ alcohols, didehydromalonate diesters of $C_1$–$C_6$ alcohols, vinyl pyridines, vinyl N—$C_1$–$C_6$-alkylpyrroles, N-vinyl pyrrolidones, vinyl oxazoles, vinyl thiazoles, vinyl pyrimidines, vinyl imidazoles, vinyl ketones in which the a-carbon atom of the alkyl group does not bear a hydrogen atom (e.g., vinyl $C_1$–$C_6$-alkyl ketones in which both a-hydrogens are replaced with $C_1$–$C_4$ alkyl, halogen, etc., or a vinyl phenyl ketone in which the phenyl may be substituted with from 1 to 5 $C_1$–$C_6$-alkyl groups and/or halogen atoms), and styrenes which may bear a $C_1$–$C_6$-alkyl group on the vinyl moiety (preferably at the α-carbon atom) and from 1 to 5 (preferably from 1 to 3) substituents on the phenyl ring selected from the group consisting of $C_1$–$C_6$-alkyl, $C_1$–$C_6$-alkenyl (preferably vinyl), $C_1$–$C_6$-alkynyl (preferably acetylenyl), $C_1$–$C_6$-alkoxy, halogen, nitro, carboxy, $C_1$–$C_6$-alkoxycarbonyl, hydroxy protected with a $C_1$–$C_6$ acyl, $SO_2R^5$, cyano and phenyl. The most preferred monomers are isobutene, N-vinyl pyrrolidone, methyl acrylate (MA), methyl methacrylate (MMA), butyl acrylate (BA), 2-ethylhexyl acrylate (EHA), acrylonitrile (AN), styrene (St) and p-tert-butylstyrene.

In the present invention, the initiator may be any compound having one or more atom(s) or group(s) which are radically transferable under the polymerizing conditions. Suitable initiators include those of the formula:

$R^{11}R^{12}R^{13}C-X$ $R^{11}C(=O)-X$ $R^{11}R^{12}R^{13}Si-X$ $R^{11}R^{12}N-X$ $R^{11}N-X_2$ $(R^{11})_nP(O)_m-X_{3-n}$ $(R^{11}O)_nP(O)_m-X_{3-n}$ and $(R^{11})(R^{12}O)P(O)_m-X$ where:

X is selected from the group consisting of Cl, Br, I, $OR^{10}$ (as defined above), $SR^{14}$, $SeR^{14}$, $OC(=O)R^{14}$, $OP(=O)R^{14}$, $OP(=O)(OR^{14})_2$, $OP(=O)OR^{14}$, O—N$(R^{14})_2$, S—C(=S)N$(R^{14})_2$, CN, NC, SCN, CNS, OCN, CNO and $N_3$, where $R^{14}$ is aryl or a straight or branched $C_1$–$C_{20}$ (preferably $C_1$–$Cl_{10}$) alkyl group, or where an $N(R^{14})_2$ group is present, the two $R^{14}$ groups may be joined to form a 5-, 6- or 7-membered heterocyclic ring (in accordance with the definition of "heterocyclyl" above); and $R^{11}$, $R^{12}$ and $R^{13}$ are each independently selected from the group consisting of H, halogen, $C_1$–$C_{20}$ alkyl (preferably $C_1$–$C_{10}$ alkyl and more preferably $C_1$–$C_6$ alkyl), $C_3$–$C_8$ cycloalkyl, $R^8{}_3Si$, C(=Y)$R^5$, C(=Y)NR$^6R^7$ (where $R^5$–$R^7$ are as defined above), COCl, OH (preferably only one of $R^{11}$, $R^{12}$ and $R^{13}$ is OH), CN, $C_2$–$C_{20}$ alkenyl or alkynyl (preferably $C_2$–$C_6$ alkenyl or alkynyl, and more preferably allyl or vinyl), oxiranyl, glycidyl, $C_2$–$C_6$ alkylene or alkenylene substituted with oxiranyl or glycidyl, aryl, heterocyclyl, aralkyl, aralkenyl (aryl-substituted alkenyl, where aryl is as defined above, and alkenyl is vinyl which may be substituted with one or two $C_1$–$C_6$ alkyl groups and/or halogen atoms [preferably chlorine]), $C_1$–$C_6$ alkyl in which from 1 to all of the hydrogen atoms (preferably 1) are replaced with halogen (preferably fluorine or chlorine where 1 or more hydrogen atoms are replaced, and preferably fluorine, chlorine or bromine where 1 hydrogen atom is replaced) and $C_1$–$C_6$ alkyl substituted with from 1 to 3 substituents (preferably 1) selected from the group consisting of $C_1$–$C_4$ alkoxy, aryl, heterocyclyl, C(=Y)$R^5$ (where $R^5$ is as defined above), C(=Y)NR$^6R^7$ (where $R^6$ and $R^7$ are as defined above), oxiranyl and glycidyl; preferably such that no more than two of $R^{11}$, $R^{12}$ and $R^{13}$ are H (more preferably no more than one of $R^{11}$, $R^{12}$ and $R^{13}$ is H);

m is 0 or 1; and n is 0, 1 or 2.

In the present invention, X is preferably Cl or Br. Cl-containing initiators generally provide (1) a slower reaction rate and (2) higher product polydispersity than the corresponding Br-containing initiators. However, Cl-terminated polymers generally have higher thermal stability than the corresponding Br-terminated polymers.

When an alkyl, cycloalkyl, or alkyl-substituted aryl group is selected for one of $R^{11}$, $R^{12}$ and $R^{13}$, the alkyl group may be further substituted with an X group as defined above. Thus, it is possible for the initiator to serve as a starting molecule for branch or star (co)polymers. One example of such an initiator is a 2,2-bis(halomethyl)-1,3-dihalopropane (e.g., 2,2-bis(chloromethyl)-1,3-dichloropropane, 2,2-bis(bromomethyl)-1,3-dibromopropane), and a preferred example is where one of $R^{11}$, $R^{12}$ and $R^{13}$ is phenyl substituted with from one to five $C_1$–$C_6$ alkyl substituents, each of which may independently be further substituted with a X group (e.g., α,α'-dibromoxylene, tetrakis- or hexakis(α-chloro- or α-bromomethyl)-benzene).

Preferred initiators include 1-phenylethyl chloride and 1-phenylethyl bromide (e.g., where $R^{11}$=Ph, $R^{12}$=CH$_3$, $R^{13}$=H and X=Cl or Br), chloroform, carbon tetrachloride, 2-chloropropionitrile, $C_1$–$C_6$-alkyl esters of a 2-halo-$C_1$–$C_6$-carboxylic acid (such as 2-chloropropionic acid, 2-bromopropionic acid, 2-chloroisobutyric acid, 2-bromoisobutyric acid, etc.), p-halomethylstyrenes and compounds of the formula $C_6H_x(CH_2X)_y$ or $CX_x[(CH_2)_n(CH_2X)]y'$, where X is Cl or Br, x+y=6, x'+y'=4, $0 \leq n \leq 5$ and both y' and y$\geq$1. More preferred initiators include 1-phenylethyl chloride, 1-phenylethyl bromide, methyl 2-chloropropionate, ethyl 2-chloropropionate, methyl 2-bromopropionate, ethyl 2-bromoisobutyrate, p-chloromethylstyrene, α,α'-dichloroxylene, α,α'-dibromoxylene and hexakis(a-bromomethyl)benzene.

Any transition metal compound which can participate in a redox cycle with the initiator and dormant polymer chain is suitable for use in the present invention. Preferred transition metal compounds are those which do not form a direct carbon-metal bond with the polymer chain. Particularly suitable transition metal compounds are those of the formula $M_t^{n+}X'_n$, where:

$M_t^{n+}$ may be, for example, selected from the group consisting of Cu$^{1+}$, Cu$^{2+}$, Au$^+$, Au$^{2+}$, Au$^{3+}$, Ag$^+$, Ag$^{2+}$, Hg$^+$, Hg$^{2+}$, Ni$^0$, Ni$^+$, Ni$^{2+}$, Ni$^{3+}$, Pd$^0$, Pd$^+$, Pd$^{2+}$, Pt$^0$, Pt$^+$, Pt$^{+2}$, Pt$^{+3}$, Pt$^{+4}$, Rh$^+$, Rh$^{2+}$, Rh$^{3+}$, Rh$^{4+}$, Co$^+$, Co$^{2+}$, Co$^{3+}$, Ir$^0$, Ir$^+$, Ir$^{2+}$, Ir$^{3+}$, Ir$^{4+}$, Fe$^{2+}$, Fe$^{3+}$, Ru$^{2+}$, Ru$^{3+}$, Ru$^{4+}$, Ru$^{5+}$, Ru$^{6+}$, Os$^{2+}$, Os$^{3+}$, Os$^{4+}$, Re$^{2+}$, Re$^{3+}$, Re$^{4+}$, Re$^{6+}$, Re$^{7+}$, Mn$^{2+}$, Mn$^{3+}$, Mn$^{4+}$, Cr$^{2+}$, Cr$^{3+}$, Mo$^0$, Mo$^+$, Mo$^{2+}$, Mo$^{3+}$, W$^{2+}$, W$^{3+}$, V$^{2+}$, V$^{3+}$, V$^{4+}$, V$^{5+}$, Nb$^{2+}$, Nb$^{+3}$, Nb$^{4+}$, Nb$^{5+}$, Ta$^{3+}$, Ta$^{4+}$, Ta$^{5+}$, Zn$^+$and Zn$^{2+}$;

X' may be, for example, selected from the group consisting of halogen, OH, (O)$_{1/2}$, $C_1$–$C_6$-alkoxy, (SO$_4$)$_{1/2}$, (PO$_4$)$_{1/3}$, (HPO$_4$)$_{1/2}$, (H$_2$PO$_4$), triflate, hexafluorophosphate, methanesulfonate, arylsulfonate (preferably benzenesulfonate or toluenesulfonate), SeR$^{14}$, CN, NC, SCN, CNS, OCN, CNO, N$_3$ and R$^{15}$CO$_2$, where R$^{14}$ is as defined above and R$^{15}$ is H or a straight or branched $C_1$–$C_6$ alkyl group (preferably methyl) or aryl (preferably phenyl) which may be substituted from 1 to 5 times with a halogen (preferably 1 to 3 times with fluorine or chlorine); and n is the formal charge on the metal (e.g., $0 \leq n \leq 7$).

Suitable ligands for use in the present invention include compounds having one or more nitrogen, oxygen, phosphorus and/or sulfur atoms which can coordinate to the transition metal through a σ-bond, ligands containing two or more carbon atoms which can coordinate to the transition metal through a π-bond, ligands having a carbon atom which can coordinate to the transition metal through a σ-bond but which do not form a carbon-carbon bond with the monomer under the conditions of the polymerizing step (e.g., ligands which do not participate in β-addition reactions with (coordinated) monomers; see, e.g., the ligand(s) described by van de Kuil et al, supra; and van Koten et al, *Recl. Trav. Chim. Pays-Bas,* 113, 267–277 (1994)), and ligands which can coordinate to the transition metal through a μ-bond or a η-bond.

Preferred N-, O-, P- and S- containing ligands may have one of the following formulas:

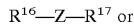

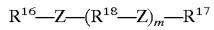

where:
- $R^{16}$ and $R^{17}$ are independently selected from the group consisting of H, $C_1$–$C_{20}$ alkyl, aryl, heterocyclyl, and $C_1$–$C_6$ alkyl substituted with $C_1$–$C_6$ alkoxy, $C_1$–$C_4$ dialkylamino, $C(=Y)R^5$, $C(=Y)R^6R^7$ and/or $YC(=Y)RB$, where Y, $R^5$, $R^6$, $R^7$ and $R^8$ are as defined above; or
- $R^{16}$ and $R^{17}$ can be joined to form a saturated, unsaturated or heterocyclic ring as described above for the "heterocyclyl" group;
- Z is O, S, $NR^{19}$ or $PR^{19}$, where $R^{19}$ is selected from the same group as $R^{16}$ and $R^{17}$,
- each $R^{18}$ is independently a divalent group selected from the group consisting of $C_2$–$C_4$ alkylene (alkanediyl) and $C_2$–$C_4$ alkenylene where the covalent bonds to each Z are at vicinal positions (e.g., in a 1,2-arrangement) or at β-positions (e.g., in a 1,3-arrangement) and $C_3$–$C_8$ cycloalkanediyl, $C_3$–$C_8$ cycloalkenediyl, arenediyl and heterocyclylene where the covalent bonds to each Z are at vicinal positions; and
- m is from 1 to 6.

In addition to the above ligands, each of $R^{16}$—Z and $R^{17}$—Z can form a ring with the $R^{18}$ group to which the Z is bound to form a linked or fused heterocyclic ring system (such as is described above for "heterocyclyl"). Alternatively, when $R^{16}$ and/or $R^{17}$ are heterocyclyl, Z can be a covalent bond (which may be single or double), $CH_2$ or a 4- to 7-membered ring fused to $R^{16}$ and/or $R^{17}$, in addition to the definitions given above for Z. Exemplary ring systems for the present ligand include bipyridyl, bipyrrole, 1,10-phenanthroline, a cryptand, a crown ether, etc.

Where Z is $PR^{19}$, $R^{19}$ can also be $C_1$–$C_{20}$-alkoxy.

Also included as suitable ligands in the present invention are CO (carbon monoxide), porphyrins and porphycenes, the latter two of which may be substituted with from 1 to 6 (preferably from 1 to 4) halogen atoms, $C_1$–$C_6$ alkyl groups, $C_1$–$C_6$-alkoxy groups, $C_1$–$C_6$ alkoxycarbonyl, aryl groups, heterocyclyl groups, and $C_1$–$C_6$ alkyl groups further substituted with from 1 to 3 halogens.

Further ligands suitable for use in the present invention include compounds of the formula $R^{20}R^{21}C(C(=Y)R^5)_2$, where Y and $R^5$ are as defined above, and each of $R^{20}$ and $R^{21}$ is independently selected from the group consisting of H, halogen, $C_1$–$C_{20}$ alkyl, aryl and heterocyclyl, and $R^{20}$ and $R^{21}$ may be joined to form a $C_3$–$C_8$ cycloalkyl ring or a hydrogenated (i.e., reduced, non-aromatic or partially or fully saturated) aromatic or heterocyclic ring (consistent with the definitions of "aryl" and "heterocyclyl" above), any of which (except for H and halogen) may be further substituted with 1 to 5 and preferably 1 to 3 $C_1$–$C_6$ alkyl groups, $C_1$–$C_6$ alkoxy groups, halogen atoms and/or aryl groups. Preferably, one of $R^{20}$ and $R^{21}$ is H or a negative charge.

Additional suitable ligands include, for example, ethylenediamine and propylenediamine, both of which may be substituted from one to four times on the amino nitrogen atom with a $C_1$–$C_4$ alkyl group or a carboxymethyl group; aminoethanol and aminopropanol, both of which may be substituted from one to three times on the oxygen and/or nitrogen atom with a $C_1$–$C_4$ alkyl group; ethylene glycol and propylene glycol, both of which may be substituted one or two times on the oxygen atoms with a $C_1$–$C_4$ alkyl group; diglyme, triglyme, tetraglyme, etc.

Suitable carbon-based ligands include arenes (as described above for the "aryl" group) and the cyclopentadienyl ligand. Preferred carbon-based ligands include benzene (which may be substituted with from one to six $C_1$–$C_4$ alkyl groups [e.g., methyl]) and cyclopentadienyl (which may be substituted with from one to five methyl groups, or which may be linked through an ethylene or propylene chain to a second cyclopentadienyl ligand). Where the cyclopentadienyl ligand is used, it may not be necessary to include a counteranion (X') in the transition metal compound.

Preferred ligands include unsubstituted and substituted pyridines and bipyridines (where the substituted pyridines and bipyridines are as described above for "heterocyclyl"), acetonitrile, $(R^{10}O)_3P$, $PR^{10}_3$, 1,10-phenanthroline, porphyrin, cryptands such as $K_{222}$ and crown ethers such as 18-crown-6. The most preferred ligands are bipyridyl, 4,4'-dialkyl-bipyridyls and $(R^{10}O)_3P$.

A preformed transition metal-ligand complex can be used in place of a mixture of transition metal compound and ligand without affecting the behavior of the polymerization.

The present invention also concerns an improved atom or group transfer radical polymerization process employing a solubilized catalyst, which in a preferred embodiment, results in a homogeneous polymerization system. In this embodiment, the method employs a ligand having substituents rendering the transition metal-ligand complex at least partially soluble, preferably more soluble than the corresponding complex in which the ligand does not contain the substituents, and more preferably, at least 90 to 99% soluble in the reaction medium.

In this embodiment, the ligand may have one of the formulas $R^{16}$—Z—$R^{17}$, $R^{16}$—Z—$(R^{18}$—Z$)_m$—$R^{17}$ or $R^{20}R^{21}C(C(=Y)R^5)_2$ above, where at least one of $R^{16}$ and $R^{17}$ or at least one of $R^{20}$ and $R^{21}$ are $C_2$–$C_{20}$ alkyl, $C_1$–$C_6$ alkyl substituted with $C_1$–$C_6$ alkoxy and/or $C_1$–$C_4$ dialkylamino, or are aryl or heterocyclyl substituted with at least one aliphatic substituent selected from the group consisting of $C_1$–$C_{20}$ alkyl, $C_2$–$C_{20}$ alkylene, $c_2$–$C_{20}$ alkynylene and aryl such that at least two, preferably at least four, more preferably at least six, and most preferably at least eight carbon atoms are members of the aliphatic substituent(s). Particularly preferred ligands for this embodiment of the invention include 2,2'-bipyridyl having at least two alkyl substituents containing a total of at least eight carbon atoms, such as 4,4'-di-(5-nonyl)-2,2'-bipyridyl (dNbipy), 4,4'-di-n-heptyl-2,2'-bipyridyl (dHbipy) and 4,4'-di-tert-butyl-2,2'-bipyridyl (dTbipy).

Particularly when combined with the aforementioned process for polymerizing a monomer in the presence of a small amount of transition metal redox conjugate, a substantial improvement in product polydispersity is observed. Whereas heterogeneous ATRP yields polymers with polydispersities generally ranging from 1.1 to 1.5, so-called "homogeneous ATRP" (e.g., based on dNbipy, dHbipy or dtbipy) with transition metal redox conjugate present (e.g., Cu(I)/Cu(II)) yields polymers with polydispersities ranging from less than 1.05 to 1.10.

In the present polymerization, the amounts and relative proportions of initiator, transition metal compound and ligand are those effective to conduct ATRP. Initiator efficiencies with the present initiator/transition metal compound/ligand system are generally very good (e.g., at least 25%, preferably at least 50%, more preferably >80%, and most preferably >90%). Accordingly, the amount of initiator can be selected such that the initiator concentration is from $10^{-4}$M to 3M, preferably $10^{-3}$–$10^{-1}$M. Alternatively, the initiator can be present in a molar ratio of from $10^{-4:1}$ to 0.5:1, preferably from $10^{-3:1}$ to $5 \times 10^{-2:1}$, relative to monomer. An initiator concentration of 0.1–1M is particularly useful for preparing end-functional polymers.

The molar proportion of transition metal compound relative to initiator is generally that which is effective to polymerize the selected monomer(s), but may be from 0.0001:1 to 10:1, preferably from 0.1:1 to 5:1, more preferably from 0.3:1 to 2:1, and most preferably from 0.9:1 to 1.1:1. Conducting the polymerization in a homogeneous system may permit reducing the concentration of transition metal and ligand such that the molar proportion of transition metal compound to initiator is as low as 0.001:1.

Similarly, the molar proportion of ligand relative to transition metal compound is generally that which is effective to polymerize the selected monomer(s), but can depend upon the number of coordination sites on the transition metal compound which the selected ligand will occupy. (One of ordinary skill understands the number of coordination sites on a given transition metal compound which a selected ligand will occupy.) The amount of ligand may be selected such that the ratio of (a) coordination sites on the transition metal compound to (b) coordination sites which the ligand will occupy is from 0.1:1 to 100:1, preferably from 0.2:1 to 10:1, more preferably from 0.5:1 to 3:1, and most preferably from 0.8:1 to 2:1. However, as is also known in the art, it is possible for a solvent or for a monomer to act as a ligand. For the purposes of this application, however, the monomer is preferably (a) distinct from and (b) not included within the scope of the ligand, although in some embodiments (e.g., the present process for preparing a graft and/or hyperbranched (co)polymer), the monomer may be self-initiating (i.e., capable of serving as both initiator and monomer). Nonetheless, certain monomers, such as acrylonitrile, certain (meth)acrylates and styrene, are capable of serving as ligands in the present invention, independent of or in addition to their use as a monomer.

The present polymerization may be conducted in the absence of solvent ("bulk" polymerization). However, when a solvent is used, suitable solvents include ethers, cyclic ethers, $C_5$–$C_{10}$ alkanes, $C_5$–$C_8$ cycloalkanes which may be substituted with from 1 to 3 $C_1$–$C_4$ alkyl groups, aromatic hydrocarbon solvents, halogenated hydrocarbon solvents, acetonitrile, dimethylformamide, ethylene carbonate, propylene carbonate, dimethylsulfoxide, dimethylsulfone, water, mixtures of such solvents, and supercritical solvents (such as $CO_2$, $C_1$–$C_4$ alkanes in which any H may be replaced with F, etc.). The present polymerization may also be conducted in accordance with known suspension, emulsion, miniemulsion, gas phase, dispersion, precipitation and reactive injection molding polymerization processes, particularly mimiemulsion and dispersion polymerization processes.

Suitable ethers include compounds of the formula $R^{22}OR^{23}$, in which each of $R^{22}$ and $R^{23}$ is independently an alkyl group of from 1 to 6 carbon atoms or an aryl group (such as phenyl) which may be further substituted with a $C_1$–$C_4$-alkyl or $C_1$–$C_4$-alkoxy group. Preferably, when one of $R^{22}$ and $R^{23}$ is methyl, the other of $R^{22}$ and $R^{23}$ is alkyl of from 4 to 6 carbon atoms, $C_1$–$C_4$-alkoxyethyl or p-methoxyphenyl. Examples include diethyl ether, ethyl propyl ether, dipropyl ether, methyl t-butyl ether, di-t-butyl ether, glyme (dimethoxyethane), diglyme (diethylene glycol dimethyl ether), 1,4-dimethoxybenzene, etc.

Suitable cyclic ethers include THF and dioxane. Suitable aromatic hydrocarbon solvents include benzene, toluene, o-xylene, m-xylene, p-xylene and mixtures thereof. Suitable halogenated hydrocarbon solvents include $CH_2Cl_2$, 1,2-dichloroethane and benzene substituted from 1 to 6 times with fluorine and/or chlorine, although preferably, the selected halogenated hydrocarbon solvent(s) does not act as an initiator under the polymerization reaction conditions.

ATRP may also be conducted either in bulk or in an aqueous medium to prepare water-soluble or water-miscible polymers. Water-soluble polymers are important scientifically and commercially, because they find a wide range of applications in mineral-processing, water-treatment, oil recovery, etc. (Bekturov, E. A.; Bakauova, Z. K. *Synthetic Water-Soluble Polymers in Solution*, Huethig and Wepf: Basel, 1986; Molyneux, P. *Water-Soluble Synthetic Polymers: Properties and Behavior*, CRC Press: Boca Raton, Fla., 1991). Many of the industrially important water-soluble polymers are prepared by the free-radical polymerization of acrylic and vinyl monomers, because this polymerization technique is amenable for use in aqueous solutions (Elias, H.; Vohwinkel, F. *New Commercial Polymers* 2; Gordon and Breach: New York, 1986). For these reasons, it is beneficial to develop well-controlled radical polymerizations for use in aqueous polymerizations (Keoshkerian, B.; Georges, M. K.; Boils-Boissier, D. *Macromolecules* 1995, 28, 6381).

Thus, the present ATRP process can be conducted in an aqueous medium. An "aqueous medium" refers to a water-containing mixture which is liquid at reaction and processing temperatures. Examples include water, either alone or admixed with a water-soluble $C_1$–$C_4$ alcohol, ethylene glycol, glycerol, acetone, methyl ethyl ketone, dimethylformamide, dimethylsulfoxide, dimethylsulfone, hexamethylphosphoric triamide, or a mixture thereof. Additionally, the pH of the aqueous medium may be adjusted to a desired value with a suitable mineral acid or base (e.g., phosphoric acid, hydrochloric acid, ammonium hydroxide, NaOH, $NaHCO_3$, $Na_2CO_3$, etc.). However, the preferred aqueous medium is water.

When conducted in an aqueous medium, the polymerization temperature may be from 0° C. to the reflux temperature of the medium, preferably from 20° C. to 100° C. and more preferably from 70° C. to 100° C. Preferably, the monomer (s) polymerized in this embodiment are at least partially water-soluble or water-miscible, or alternatively, capable of being polymerized in an aqueous emulsion which further comprises a surfactant (preferably in an amount sufficient to emulsify the monomer(s)). Such monomers are preferably sufficiently soluble in 80° C. water to provide a monomer concentration of at least $10^{-2}$M, and more preferably $10^{-1}$M.

Suitable water-soluble or water-miscible monomers include those of the formula:

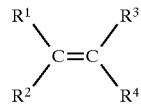

wherein $R^1$ and $R^2$ are independently selected from the group consisting of H, halogen, CN, straight or branched alkyl of from 1 to 10 carbon atoms (preferably from 1 to 6 carbon atoms, more preferably from 1 to 4 carbon atoms) which may be substituted, α,β-unsaturated straight or branched alkenyl or alkynyl of 2 to 10 carbon atoms (preferably from 2 to 6 carbon atoms, more preferably from 2 to 4 carbon atoms) which may be substituted, $C_3$–$C_8$ cycloalkyl which may be substituted, $NR^8{}_2$, $N^+R^8{}_3$, $C(=Y)R^5$, $C(=Y)NR^6R^7$, $YC(=Y)R^8$, $YC(=Y)YR^8$, $YS(=Y)R^8$, $YS(=Y)_2R^8$, $YS(=Y)_2YR^8$, $P(R^8)_2$, $P(=Y)(R^8)_2$, $P(YR^8)_2$, $P(=Y)(YR^8)_2$, $P(YR^8)R^8$, $P(=Y)(YR^8)R^8$, and aryl or heterocyclyl (as defined above) in which one or more nitrogen atoms (if present) may be quaternized with an $R^8$ group (preferably H or $C_1$–$C_4$ alkyl); where Y may be $NR^8$, S or O (preferably O), $R^5$ is alkyl of from 1 to 10 carbon atoms, alkoxy of from 1 to 10 carbon atoms, aryl, aryloxy or heterocyclyloxy; $R^6$ and $R^7$ are independently H or alkyl of from 1 to 20 carbon atoms, or $R^6$ and $R^7$ may be joined together to form an alkylene group of from 2 to 5 carbon atoms, thus forming a 3- to 6-membered ring; and $R^8$ is (independently) H, straight or branched $C_1$–$C_{10}$ alkyl (which may be joined to form a 3- to 8-membered ring where more than one $R^8$ group is covalently bound to the same atom) or aryl, and when $R^8$ is directly bonded to S or O, it may be an alkali metal or an ammonium ($N^+R^8{}_4$) group; and $R^3$ and $R^4$ are independently selected from the group consisting of H, halogen (preferably fluorine or chlorine), CN, $C_1$–$C_6$ (preferably $C_1$) alkyl and $COOR^9$ (where $R^9$ is as defined above); or $R^1$ and $R^3$ may be joined to form a group of the formula $(CH_2)_{n'}$ (which may be substituted) or $C(=O)$—Y—C$(=O)$, where n' is from 2 to 6 (preferably 3 or 4) and Y is as defined above;

at least two of $R^1$, $R^2$, $R^3$ and $R^4$ are H or halogen; and at least one of $R^1$, $R^2$, $R^3$ and $R^4$ in at least one monomer is, or is substituted with, OH, $NR^8{}_2$, $N^+R^8{}_3$, $COOR^9$, $C(=Y)R^5$, $C(=Y)NR^6R^7$, $YC(=Y)R^8$, $YC(=Y)YR^8$, $YS(=Y)R^8$, $YS(=Y)_2R^8$, $YS(=Y)_2YR^8$, $P(YR^8)_2$, $P(=Y)(YR^8)_2$, $P(YR^8)R^8$, $P(=Y)(YR^8)R^8$, $P(=Y)R^8{}_2$, hydroxy-substituted $C_1$–$C_{10}$ alkyl or hetercyclyl in which one or more nitrogen atoms is quaternized with an $R^8$ group (e.g., H or $C_1$–$C_4$ alkyl).

A group "which may be substituted" refers to the alkyl, alkenyl, alkynyl, aryl, heterocyclyl, alkylene and cycloalkyl groups substituted in accordance with the descriptions herein. A preferred monomer is a sulfonated acrylamide.

The present invention also encompasses water swellable polymers and hydrogels. Hydrogels are polymers which, in the presence of water, do not dissolve, but absorb water and thus swell in size. These polymers have found wide applications ranging from drug delivery to oil recovery. Generally, these polymeric materials are synthesized by radical polymerization of a water-soluble material in the presence of a divinyl monomer. The divinyl monomer introduces chemical cross links which makes the polymer permanently insoluble in any solvent (i.e., without degrading the polymer and its physical properties).

The present ATRP process also provides a process for synthesizing a hydrogel which utilizes physical cross links between chains and which allows for dissolution of the polymer without loss of physical properties. The present water swellable polymers and hydrogel polymers can also be processed from a melt, a characteristic that polymers having chemical crosslinks lack. The water-soluble monomers described above may be used to prepare the present water swellable (co)polymers and hydrogels. An exemplary polymer which was synthesized to demonstrate such abilities is poly(N-vinylpyrrolidinone-g-styrene) (see the Examples below).

In a preferred embodiment, the hydrogel comprises a base (co)polymer and at least two (preferably at least three, more preferably at least four, and even more preferably at least five) relatively hydrophobic side-chains grafted thereonto (e.g., by conventional radical polymerization or by the present ATRP process). The base (co)polymer may be a (co)polymer containing a water-soluble or water-miscible monomer in an amount sufficient to render the (co)polymer water-soluble or water-miscible (e.g., containing at least 10 mol. %, preferably at least 30 mol. %, and preferably at least 50 mol. % of the water-soluble or water-miscible monomer). Preferred hydrophobic side-chains contain monomeric units of the formula —$R^1R^2C$—$CR^3R^4$—, in which:

$R^1$ and $R^2$ are independently selected from the group consisting of H, halogen, CN, straight or branched alkyl of from 1 to 10 carbon atoms (preferably from 1 to 6 carbon atoms, more preferably from 1 to 4 carbon atoms) which may be substituted, straight or branched alkenyl or alkynyl of from 2 to 10 carbon atoms (preferably from 2 to 6 carbon atoms, more preferably from 2 to 3 carbon atoms) which may be substituted, $C_3$–$C_8$ cycloalkyl which may be substituted, $NR^8{}_2$, $C(=Y)R^5$, $C(=Y)NR^6R^7$, $YC(=Y)R^8$, $YC(=Y)YR^8$, $YS(=Y)R^8$, $YS(=Y)_2R^8$, $YS(=Y)_2YR^8$, $P(R^8)_2$, $P(=Y)(R^8)_2$, $P(YR^8)_2$, $P(=Y)(YR^8)_2$, $P(YR^8)R^8$, $P(=Y)(YR^8)R^8$, and aryl or heterocyclyl in which each H atom may be replaced with halogen atoms, $NR^8{}_2$, $C_1$–$C_6$alkyl or $C_1$–$C_6$ alkoxy groups; where Y may be $NR^8$, S or O (preferably O); $R^5$ is alkyl of from 1 to 10 carbon atoms, alkoxy of from 1 to 10 carbon atoms, aryl, aryloxy or heterocyclyloxy; $R^6$ and $R^7$ are alkyl of from 1 to 20 carbon atoms, or $R^6$ and $R^7$ may be joined together to form an alkylene group of from 2 to 7 carbon atoms, thus forming a 3- to 8-membered ring; and $R^8$ is (independently) straight or branched $C_1$–$C_{10}$ alkyl (which may be joined to form a 3- to 7-membered ring where more than one $R^8$ group is covalently bound to the same atom); and $R^3$ and $R^4$ are independently selected from the group consisting of H, halogen (preferably fluorine or chlorine), CN, $C_1$–$C_6$ (preferably $C_1$) alkyl and $COOR^9$ (where $R^9$ is alkyl of from 1 to 10 carbon atoms or aryl);

$R^1$ and $R^3$ may be joined to form a group of the formula $(CH_2)_{n'}$ (which may be substituted) where n' is from 2 to 6 (preferably 3 or 4); and at least two of $R^1$, $R^2$, $R^3$ and $R^4$ are H or halogen.

Polymers produced by the present process may be useful in general as molding materials (e.g., polystyrene containers) and as barrier or surface materials (e.g., poly (methyl methacrylate), or PMMA, is well-known in this regard as PLEXIGLAS™). However, the polymers produced by the present process, which typically will have uniform, predictable, controllable and/or tunable properties relative to polymers produced by conventional radical polymerization, will be most suitable for use in specialized or performance applications.

For example, block copolymers of polystyrene and polyacrylate (e.g., PSt-PA-PSt triblock copolymers) are useful thermoplastic elastomers. Poly(methyl methacrylate)-polyacrylate triblock copolymers (e.g., PMMA-PA-PMMA) are useful, fully acrylic thermoplastic elastomers. Homo- and copolymers of styrene, (meth)acrylates and/or acrylonitrile are useful plastics, elastomers and adhesives. Either block or random copolymers of styrene and a (meth)acrylate or acrylonitrile may be useful thermoplastic elastomers having high solvent resistance.

Furthermore, block copolymers in which the blocks alternate between polar monomers and non-polar monomers produced by the present invention are useful amphiphilic surfactants or dispersants for making highly uniform polymer blends. Star polymers produced by the present process are useful high-impact (co)polymers. (For example, STYROLUX™, an anionically-polymerized styrene-butadiene star block copolymer, is a known, useful high-impact copolymer.)

The (co)polymers of the present invention (and/or a block thereof) may have an average degree of polymerization (DP) of at least 3, preferably at least 5, and more preferably at least 10, and may have a weight and/or number average molecular weight of at least 250 g/mol, preferably at least 500 g/mol, more preferably at least 1,000 g/mol, even more preferably at least 2,000 g/mol, and most preferably at least 3,000 g/mol. The present (co)polymers, due to their "living" character, can have a maximum molecular weight without limit. However, from a practical perspective, the present (co)polymers and blocks thereof may have an upper weight or number average molecular weight of, e.g., 5,000,000 g/mol, preferably 1,000,000 g/mol, more preferably 500,000 g/mol, and even more preferably 250,000 g/mol. For example, when produced in bulk, the number average molecular weight may be up to 1,000,000 (with a minimum weight or number average molecular weight as mentioned above).

The number average molecular weight may be determined by size exclusion chromatography (SEC) or, when the initiator has a group which can be easily distinguished from the monomer(s), by NMR spectroscopy (e.g., when 1-phenylethyl chloride is the initiator and methyl acrylate is the monomer).

Thus, the present invention also encompasses novel end-functional, telechelic and hyperbranched homopolymers, and block, multi-block, star, gradient, random, graft or "comb" and hyperbranched copolymers. Each of the these different types of copolymers will be described hereunder.

Because ATRP is a "living" polymerization, it can be started and stopped, practically at will. Further, the polymer product retains the functional group "X" necessary to initiate a further polymerization. Thus, in one embodiment, once the first monomer is consumed in the initial polymerizing step, a second monomer can then be added to form a second block on the growing polymer chain in a second polymerizing step. Additional polymerizations with the same or different monomer(s) can be performed to prepare multi-block copolymers.

Furthermore, since ATRP is radical polymerization, blocks can be prepared in essentially any order. One is not necessarily limited to preparing block copolymers where the sequential polymerizing steps must flow from the least stabilized polymer intermediate to the most stabilized polymer intermediate, such as is necessary in ionic polymerization. Thus, one can prepare a multi-block copolymer in which a polyacrylonitrile or a poly(meth)acrylate block is prepared first, then a styrene or butadiene block is attached thereto, etc.

As is described throughout the application, certain advantageous reaction design choices will become apparent. However, one is not limited to those advantageous reaction design choices in the present invention.

Furthermore, a linking group is not necessary to join the different blocks of the present block copolymer. One can simply add successive monomers to form successive blocks. Further, it is also possible (and in some cases advantageous) to first isolate a (co)polymer produced by the present ATRP process, then react the polymer with an additional monomer using a different initiator/catalyst system (to "match" the reactivity of the growing polymer chain with the new monomer). In such a case, the product polymer acts as the new initiator for the further polymerization of the additional monomer.

Thus, the present invention also encompasses end-functional homopolymers having a formula:

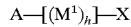

and random copolymers having a formula:

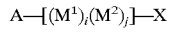

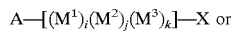

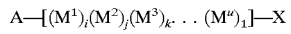

where A may be $R^{11}R^{12}R^{13}C$, $R^{11}R^{12}R^{13}Si$, $(R^{11})_m Si$, $R^{11}R^{12}N$, $(R^{11})_n P$, $(R^{11}O)_n P$, $(R^{11})(R^{12}O)P$, $(R^{11})_n P(O)$, $(R^{11}O)_n P(O)$ or $(R^{11})(R^{12}O)P(O)$; $R^{11}$, $R^{12}$, $R^{13}$ and X are as defined above; $M^1$, $M^2$, $M^3$, . . . up to $M^u$ are each a radically polymerizable monomer (as defined above); h, i, j, k . . . up to l are each average degrees of polymerization of at least 3; and i, j, k . . . up to l represent molar ratios of the radically polymerizable monomers $M^1$, $M^2$, $M^3$, . . . up to $M^u$.

Preferably, at least one of $M^1$, $M^2$, $M^3$, . . . up to $M^u$ has the formula:

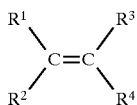

wherein at least one of $R^1$ and $R^2$ is CN, $CF_3$, straight or branched alkyl of from 4 to 20 carbon atoms (preferably from 4 to 10 carbon atoms, more preferably from 4 to 8 carbon atoms), $C_3$–$C_8$ cycloalkyl, aryl, heterocyclyl, $C(=Y)R^5$, $C(=Y)NR^6R^7$ and $YC(=Y)R^8$, where aryl, heterocyclyl, Y, $R^5$, $R^6$, $R^7$ and $R^8$ are as defined above; and $R^3$ and $R^4$ are as defined above; or $R^1$ and $R^3$ are joined to form a group of the formula $(CH_2)_{n'}$ or $C(=O)$—Y—$C(=O)$, where n' and Y are as defined above.

Preferably, these (co)polymers have either a weight or number average molecular weight of at least 250 g/mol, more preferably at least 500 g/mol, even more preferably 1,000 g/mol and most preferably at least 3,000 g/mol. Preferably, the (co)polymers have a polydispersity of 1.50 or less, more preferably 1.35 or less, even more preferably 1.25 or less and most preferably 1.20 or less. Although the present gels may have a weight or number average molecular weight well above 5,000,000 g/mol, from a practical perspective, the present (co)polymers and blocks thereof may have an upper weight or number average molecular weight of, e.g., 5,000,000 g/mol, preferably 1,000,000 g/mol, more preferably 500,000 g/mol, and even more preferably 250,000 g/mol.

Preferred random copolymers include those prepared from any combination of styrene, vinyl acetate, acrylonitrile, acrylamide and/or $C_1$–$C_8$ alkyl (meth)acrylates, and particularly include those of (a) methyl methacrylate and styrene having from 10 to 75 mol % styrene, (b) methyl methacrylate and methyl acrylate having from 1 to 75 mol % methyl acrylate, (c) styrene and methyl acrylate, and (d) methyl methacrylate and butyl acrylate.

The present invention also concerns block copolymers of the formula:

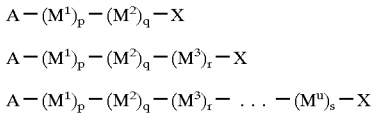

wherein A and X are as defined above; $M^1$, $M^2$, $M^3$, ... up to $M^u$ are each a radically polymerizable monomer (as defined above) selected such that the monomers in adjacent blocks are not identical (although monomers in non-adjacent blocks may be identical) and p, q, r, ... up to s are independently selected such that the average degree of polymerization and/or the weight or number average molecular weight of each block or of the copolymer as a whole may be as described above for the present (co) polymers. After an appropriate end group conversion reaction (conducted in accordance with known methods), X may also be, for example, H, OH, $N_3$, $NH_2$, COOH or $CONH_2$.

Preferred block copolymers may have the formula

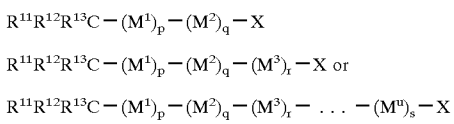

Preferably, each block of the present block copolymers has a polydispersity of 1.50 or less, more preferably 1.35 or less, even more preferably 1.25 or less and most preferably 1.20 or less. The present block copolymer, as a complete unit, may have a polydispersity of 3.0 or less, more preferably 2.5 or less, even more preferably 2.0 or less and most preferably 1.50 or less.

The present invention may be used to prepare periodic or alternating copolymers. The present ATRP process is particularly useful for producing alternating copolymers where one of the monomers has one or two bulky substituents (e.g., where at least one of $M^1$, $M^2$, $M^3$, ... up to $M^u$ are each 1,1-diarylethylene, didehydromalonate $C_1$–$C_{20}$ diesters, $C_1$–$C_{20}$ diesters of maleic or fumaric acid, maleic anhydride and/or maleic diimides [where Y is $NR^8$ as defined above], etc.), from which homopolymers may be difficult to prepare, due to steric considerations. Thus, some preferred monomer combinations for the present alternating copolymers containing "bulky" substituents include combinations of styrene, acrylonitrile and/or $C_1$–$C_8$ esters of (meth)acrylic acid, with maleic anhydride, $C_1$–$C_8$ alkyl maleimides and/or 1,1-diphenylethylene.

Copolymerization of monomers with donor and acceptor properties results in the formation of products with predominantly alternating monomer structure (Cowie, "Alternating Copolymerization," *Comprehensive Polymer Science*, vol. 4, p. 377, Pergamon Press (1989)). These copolymers can exhibit interesting physical and mechanical properties that can be ascribed to their alternating structure (Cowie, *Alternating Copolymers*, Plenum, New York (1985)).

So-called "alternating" copolymers can be produced using the present method. "Alternating" copolymers are prepared by copolymerization of one or more monomers having electron-donor properties (e.g., unsaturated hydrocarbons, vinyl ethers, etc.) with one or more monomers having electron acceptor type properties (acrylates, methacrylates, unsaturated nitriles, unsaturated ketones, etc.). Thus, the present invention also concerns an alternating copolymer of the formula:

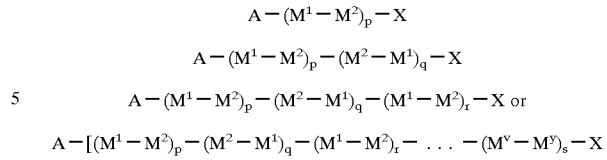

where A and X are as defined above, $M^1$ and $M^2$ are different radically-polymerizable monomers (as defined above), and $M^v$ is one of $M^1$ and $M^2$ and $M^y$ is the other of $M^1$ and M2. However, p, q, r, ... up to s are independently selected such that the average degree of polymerization and/or the weight or number average molecular weight of the copolymer as a whole or of each block may be described above for the present end-functional or random (co)polymers. (The description "r . . . up to s" indicates that any number of blocks equivalent to those designated by the subscripts p, q and r can exist between the blocks designated by the subscripts r and s.)

Preferably, A is $R^{11}R^{12}R^{13}C$, $M^1$ is one or more monomers having electron-donor properties (e.g., $C_2$–$C_{20}$ unsaturated hydrocarbons which may have one or more alkyl, alkenyl, alkynyl, alkoxy, alkylthio, dialkylamino, aryl or tri(alkyl and/or aryl)silyl substituents as defined above [e.g., isobulene or vinyl $C_2$–$C_{10}$ ethers], etc.) and $M^2$ is one or more monomers having electron acceptor properties (e.g., (meth)acrylic acid or a salt thereof, $C_1$–$C_{20}$ (meth)acrylate esters, $C_3$—$C_{20}$ unsaturated nitriles, $C_3$—$C_{20}$ α,β-unsaturated aldehydes, ketones, sulfones, phosphates, sulfonates, etc., as defined above).

Preferably, the present alternating copolymers have either a weight or number average molecular weight of at least 250 g/mol, more preferably 500 g/mol, even more preferably 1,000 g/mol, and most preferably 3,000 g/mol. Preferably, the present alternating copolymers have a maximum weight or number average molecular weight of 5,000,000 g/mol, preferably 1,000,000 glmol and even more preferably 500,000 g/mol, although the upper the limit of the molecular weight of the present "living" (co)polymers is not limited. Preferably, the present alternating copolymers have a polydispersity of 1.50 or less, more preferably 1.35 or less, even more preferably 1.25 or less and most preferably 1.20 or less.

The present random or alternating copolymer can also serve as a block in any of the present block, star, graft, comb or hyperbranched copolymers.

Where the A (or preferably $R^{11}R^{12}R^{13}C$) group of the initiator contains a second "X" group, ATRP may be used to prepare "telechelic" (co)polymers. "Telechelic" homopolymers may have the following formula:

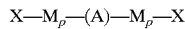

where A (preferably $R^{11}R^{12}R^{13}C$) and X are as defined above, M is a radically polymerizable monomer as defined above, and p is an average degree of polymerization of at least 3, subject to the condition that A is a group bearing an X substituent.

Preferred telechelic homopolymers include those of styrene, acrylonitrile, $C_1$–$C_8$ esters of (meth)acrylic acid, vinyl chloride, vinyl acetate and tetrafluoroethylene. Such telechelic homopolymers preferably have either a weight or number average molecular weight of at least 250 g/mol, more preferably at least 500 g/mol, even more preferably at least 1,000 g/mol, and most preferably at least 3,000 g/mol, and/or have a polydispersity of 1.50 or less, more preferably 1.3 or less, even more preferably 1.2 or less and most preferably 1.15 or less. From a practical standpoint, the present alternating copolymers may have a maximum weight or number average molecular weight of 5,000,000 g/mol, preferably 1,000,000 g/mol, more preferably 500,000 g/mol, and even more preferably 250,000 g/mol, although the upper limit of the molecular weight of the present "living" (co)polymers is not particularly limited.

Block copolymers prepared by ATRP from an initiator having a second "X" group may have one of the following formulas:

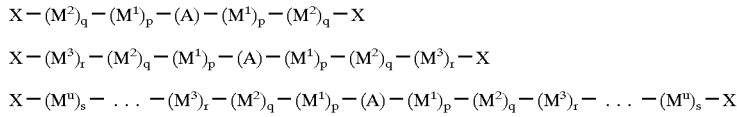

and random copolymers may have one of the following formulas:

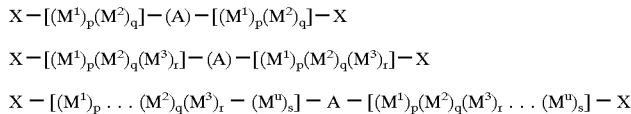

where A (preferably $R^{11}R^{12}R^{13}C$), X, $M^1$, $M^2$, $M^3$, ... up to $M''$, and p, q, r, ... up to s are as defined above, subject to the condition that A is a group bearing an X substituent.

The present invention also concerns gradient copolymers. Gradient copolymers form an entirely new class of polymers with a controlled structure and composition which changes gradually and in a systematic and predictable manner along the copolymer chain. Due to this composition distribution and consequent unusual interchain interactions, gradient copolymers are expected to have very unique thermal properties (e.g., glass transition temperatures and/or melting points). They may also exhibit unprecedented phase separation and uncommon mechanical behavior, and may provide unique abilities as surfactants or as modifiers for blending incompatible materials.

Gradient copolymers can be obtained in a system without a significant chain-breaking reaction, such as ATRP. To control the copolymer composition, it is beneficial to maintain continuous growth of the polymer chain and regulate the comonomers' feed composition during the course of the reaction. Otherwise, the distribution of the monomer units along the polymer chain may be random or block-like.

To date, there are no publications on the subject of gradient copolymers. The closest examples described so far are tapered copolymers prepared through living anionic polymerization (Sardelis et al, *Polymer*, 25, 1011 (1984) and *Polymer*, 28, 244 (1987); Tsukuhara et al, *Polym. J.*, 12, 455 (1980)). Tapered copolymers differ from gradient copolymers since they retain block-like character despite the composition gradient in the middle block. Additionally, the compositional gradient of tapered polymers is inherent and cannot be changed or controlled.

Gradient copolymers may be prepared via ATRP copolymerization of two or more monomers with different homopolymerization reactivity ratios (e.g., $r^1 >> r_2$, where $r^1$ may be greater than 1 and $r_2$ may be less than 1). Such comonomers usually do not copolymerize randomly (Odian, *Principles of Polymerization*, 3rd ed., John Wiley & Sons, New York, p. 463 (1991)). For example, in conventional radical polymerization, a mixture of homopolymers is obtained.

In the present controlled system, where the polymer chain is not terminated at any stage of the reaction, initially only the more (or most) reactive monomer reacts until its concentration decreases to such a level that the less (or second most) reactive monomer begins to incorporate into the growing polymer chains. The less reactive monomer is gradually incorporated into the polymer chain to a greater extent, and its content in the chain increases, as the more reactive monomer is further consumed. Finally, only the least reactive monomer is present in the system and as it reacts, it forms a block of the least reactive monomer at the end of the chain. The gradient of composition in such a copolymer is controlled by the difference in the reactivity ratios and the rate with which each of the monomers reacts. It might also be considered an inherent control over the copolymer's composition, which can be altered by intentionally changing the concentration of one or more of the monomers.

Thus, in an example of the gradient copolymerization including two distinct monomers, the polymerizing step of the present method of controlled atom or group transfer polymerization may comprise polymerizing first and second radically polymerizable monomers present in amounts providing a molar ratio of the first monomer to the second monomer of from a:b to b:a, where a and b are each from 0 to 100 and (a+b)=100, then adding an additional amount of the first and/or second monomer providing a molar ratio of the first monomer to the second monomer of from c:d to d:c, where c differs from a, d differs from b and (c+d)=100, and if desired, repeating as often as desired the adding step such that if c>a, the molar proportion (or percentage) of the first monomer increases, but if d>b, the molar proportion (or percentage) of the second monomer increases. The adding step(s) may be continuous, in intermittent portions or all at once.

Thus, the present invention also encompasses a gradient copolymer of the formula:

$$A—M^1{}_n—(M^1{}_aM^2{}_b)_x—\ldots—(M^1{}_cM^2{}_d)_y—M^2{}_m—X$$

where A and X are as defined above, $M^1$ and $M^2$ are radically-polymerizable monomers (as defined above) having different reactivities (preferably in which the ratio of homopolymerization and/or copolymerization reactivity rates are at least 1.5, more preferably at least 2 and most preferably at least 3), a, b, c and d are non-negative numbers independently selected such that a+b=c+d=100, wherein the a:b ratio is from 99:1 to 50:50, the c:d ratio is from 50:50 to 99:1, and the molar proportion of $M^1$ to $M^2$ gradually decreases along the length of the polymer chain from a:b to c:d, and n, m, x and y are independently an integer of at least 2, preferably at least 3, more preferably at least 5 and most preferably at least 10. The weight or number average molecular weight of each block or of the copolymer as a whole may be as described above for the present (co) polymers. Preferably, A is $R^{11}R^{12}R^{13}C$, and X is a halogen.

To determine the gradient, the copolymerization can be intermittently sampled, and the molar proportion of units of the copolymer corresponding to each monomer determined in accordance with known methods. As long as the proportion of one monomer increases as the other(s) decrease(s) during the course of the copolymerization, the molar proportion of the one monomer increases along the length of the polymer chain as the other(s) decrease(s).

Alternatively, the decrease of the monomer ratio along the length of the polymer chain a:b to c:d can be determined in accordance with the numbers of monomer units along the polymer chain. The number of subblocks must be smaller than the number of monomeric units in each subblock, but the subblocks may overlap by a number of monomer units smaller than the size of the subblock. For example, where the central block of the polymer contains 6 monomeric units, the ratios may be determined for two 3-unit subblocks (e.g., (3-mer)-(3-mer)). Where the central block of the polymer contains, for example 9 monomeric units, the ratios may be determined for three 4-unit subblocks where the central subblock overlaps each terminal subblock by one monomer unit (e.g., (4-mer)-(overlapping 4-mer)-(4-mer). Where the central block of the polymer contains, for example, from 10 to 50 monomeric units, the ratios may be determined for 5- to 10-unit subblocks (e.g., (5-mer)-(5-mer), (6-mer)-(8-mer)-(6-mer), (10-mer)-(10-mer), (5-mer)-(5-mer)-(5-mer)-(5-mer), etc.). Where the central block of the polymer contains, for example, from 51 to 380 monomeric units, the ratios may be determined for 10- to 20-unit subblocks; etc. Such copolymers can be prepared by carefully controlling the molar ratios of monomers to each other and to initiator or dormant polymer chains.

In a further embodiment, the relative proportions of first monomer to second monomer are controlled in a continuous manner, using for example by adding the second monomer via a programmable syringe or feedstock supply pump.

When either the initiator or monomer contains a substituent bearing a remote (i.e., unconjugated) ethylene or acetylene moiety, ATRP can be used to prepare cross-linked polymers and copolymers.

The present invention is also useful for forming so-called "star" polymers and copolymers. Thus, where the initiator has three or more "X" groups, each of the "X" groups can serve as a polymerization initiation site. Thus, the present invention also encompasses star (co)polymers of the formula:

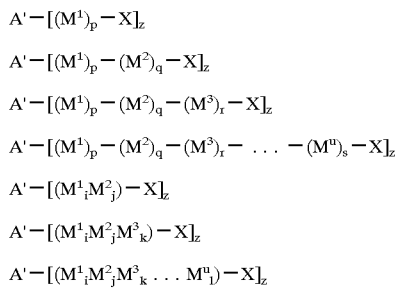

where A' is the same as A with the proviso that $R^{11}$, $R^{12}$ and $R^{13}$ combined contain from 2 to 5 X groups, where X is as defined above; $M^1$, $M^2$, $M^3$, ... $M^u$ are as defined above for the present block copolymers; and z is from 3 to 6. Preferably, A' is $R^{11}R^{12}R^{13}C$, and X is halogen (preferably chlorine or bromine).

Initiators suitable for use in preparing the present star (co)polymers are those in which the A (or preferably $R^{11}R^{12}R^{13}C$) group possesses at least three substituents which can be "X" (as defined above). Preferably, these substituents are identical to "X". Examples of such initiators include compounds of the formula $C_6H_x(CH_2X)_y$ or $CH_{x'}(CH_2X)_{y'}$, where X is a halogen, x+y=6, x'+y'=4 and y and y' are each $\geq 3$. Preferred initiators of this type include 2,2-bis(chloromethyl)- 1,3-dichloropropane, 2,2-bis (bromomethyl)-1,3-dibromopropane), α,α',α''-trichloro- and α,α', α''-tribromocumene, and tetrakis- and hexakis(α-chloro- and α-bromomethyl)benzene), the most preferred being hexakis(α-bromomethyl)benzene.

Branched and hyperbranched polymers may also be prepared in accordance with the present invention. The synthesis of hyperbranched polymers has been explored to develop dendritic molecules in a single, one-pot reaction.

Conventional hyperbranched polymers are obtained by the reaction of $AB_2$ monomers in which A and B are moieties containing functional groups capable of reacting with each other to form stable bonds. Because of the $AB_2$ structure of the monomers, reaction of two monomers results in the formation of a dimer with one A group and three B groups. This process repeats itself by reaction with either monomer, dimer, trimer, etc., in a similar fashion to provide step-wise growth of polymers.

The resulting polymer chains have only one A group and (n+1) B groups, where n is the number of repeat units. Polymers resulting from these reactions are sometimes highly functionalized. These polymers, however, do not have perfectly symmetrical architectures, but rather, are of irregular shapes. This may be due to uneven growth of the macromolecule in various directions.

The present hyperbranched polymers have some of the qualities of dendrimers, but may lack some properties of perfect dendrimers. The cationic process described by Frechet et al. (*Science* 269, 1080 (1995)) differs from the present synthesis of hyperbranched polymers not only in the mechanism of polymerization, but also by extending the reaction to primary benzyl halides.

The present invention also concerns a process for preparing hyperbranched polymers (e.g., hyperbranched polystyrene) by atom or group transfer radical polymerization (ATRP), preferably in "one-pot" (e.g., in a single reaction sequence without substantial purification steps, and more specifically, in a single reaction vessel without any intermediate purification steps), using the present process and at least one radically polymerizable monomer in which at least one of $R^1$, $R^2$, $R^3$ and $R^4$ also contains a radically transferable X group, optionally in the absence of an initiator (or if an initiator is used, the X group of the monomer may be the same or different from the X group of the initiator).

For example, commercially available p-chloromethylstyrene (p-CMS) may be polymerized in the presence of a transition metal compound (e.g., Cu(I)) and ligand (e.g., 2,2'-bipyridyl, or "bipy"). A demonstrative example of the copolymerization of styrene and p-CMS, and its comparison with a linear standard, is presented in the Examples below.

In fact, the monomer may also act as initiator (e.g., the homopolymerization of p-CMS in the presence of Cu(I) and bipy). It is possible to remove the chlorine atom at the benzylic position homolytically, thus forming $Cu(II)Cl_2$ and a benzyl radical capable of initiating the polymerization of monomer through the double bonds (see Scheme 3). This results in the formation of a polymer chain with pendant groups consisting of p-benzyl chloride. Also, the polymer has a double bond at the chain end which can be incorporated into a growing polymer chain.

Thus, the present invention also concerns a hyperbranched (co)polymer of the formula:

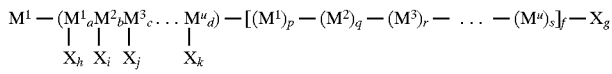

where $M^1$ is a radically polymerizable monomer having both a carbon-carbon multiple bond and at least one X group (as defined above); $M^2$, $M^3$... up to $M^u$ are radically polymerizable monomers (as defined above); a, b, c ... up to d are numbers of at least zero such that the sum of a, b, c ... up to d is at least 2, preferably at least 3, more preferably at least 4 and most preferably at least 5; e is the sum of the products of (i) a and the number of X groups on $M^1$, (ii) b and the number of X groups on $M^2$, (iii) c and the number of X groups on $M^3$... up to (iv) d and the number of X groups on $M^u$; $f \leq e$ and $(g+h+i+j+k)=e$.

The formula "$M^1$—$(M^1{}_a M^2{}_b M^3{}_c \ldots M^u{}_d)$—$X_e$" represents a "perfect" hyperbranched polymer, in which each "X" group is at the end of a chain or branch of monomeric units. (In the present hyperbranched (co)polymer, a "chain" may be defined as the longest continuous series of monomeric units of a polymer. A "branch" may be defined as any covalently-bound series of monomer units in the polymer containing a number of monomeric units smaller than the "chain".) The formula:

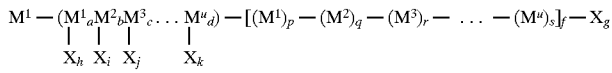

represents those (co)polymers in which one or more "X" groups are bound to non-terminal monomer units (i.e., monomer units not at the end of a branch or chain).

In fact, the present invention also encompasses those (co)polymers in which the "X" substituent is located at either or both ends of the (co)polymer chain, on an internal monomeric unit, or any combination thereof. "Internal" X groups can be put into place by incorporating into the polymer chain a monomer having a substituent encompassed by the definition of "X" above.

In the present hyperbranched (co)polymer, the number of branches will be at most $2^{(a-1)}-1$, assuming all "x" groups are active in subsequent ATRP steps. Where, for example, a number "h" of "X" groups fail to react in subsequent ATRP steps (e.g., where one of the 1° or 2° Cl groups on a branch in the octamer shown in Scheme 3 below does not react in subsequent ATRP steps, but the other does), a product of the formula:

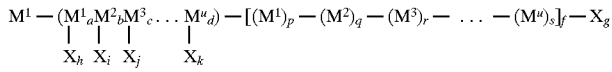

is formed. The subsequent number of branches is reduced by $2^h$.

The present invention also concerns cross-linked polymers and gels, and processes for producing the same. By conducting the polymerizing step which produces the present branched and/or hyperbranched (co)polymers for a longer period of time, gelled polymers may be formed. For example, by increasing the amount or proportion of p-chloromethyl styrene in the reaction mixture (e.g., relative to solvent or other monomer(s)), the cross-link density may be increased and the reaction time may be lowered.

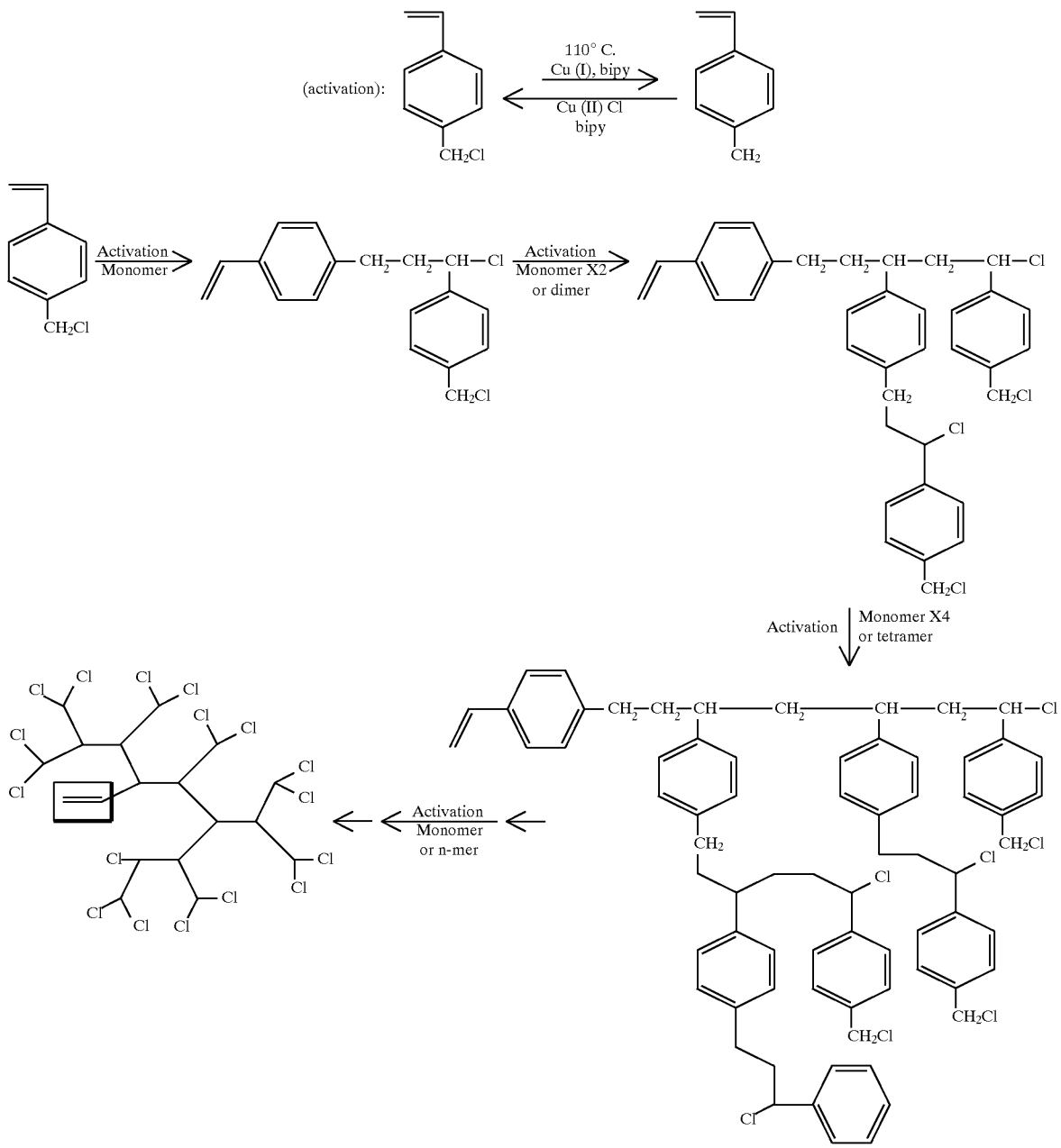

Scheme 3

(Typically, a polymerizing step in any aspect of the present invention may be conducted for a length of time sufficient to consume at least 25%, preferably at least 50%, more preferably at least 75%, even more preferably at least 80% and most preferably at least 90% of monomer. Alternatively, the present polymerizing step may be conducted for a length of time sufficient to render the reaction mixture too viscous to stir, mix or pump with the stirring, mixing or pumping means being used. However, the polymerizing step may generally be conducted for any desired length of time.)

The present invention also encompasses graft or "comb" copolymers, prepared by sequential polymerizations. For example, a first (co)polymer may be prepared by conventional radical polymerization, then a second (or one or more further) (co)polymer chains or blocks may be grafted onto the first (co)polymer by ATRP; a first (co)polymer may be prepared by ATRP, then one or more further (co)polymer chains or blocks may be grafted onto the first (co)polymer by conventional radical polymerization; or the first (co)polymer may be prepared and the further (co)polymer chains or blocks may be grafted thereonto by sequential ATRP's.

A combination of ATRP and one or more other polymerization methods can also be used to prepare different blocks of a linear or star block copolymer (i.e., when extending one or several chains from a base (co)polymer). Alternatively, a combination of ATRP and one or more other polymerization methods can be used to prepare a "block homopolymer", in which distinct blocks of a homopolymer having one or more different properties (e.g., tacticity) are prepared by different polymerization processes. Such "block homopolymers" may exhibit microphase separation.

Thus, the present invention further concerns a method of preparing a graft or "comb" (co)polymer which includes the present ATRP process, which may comprise reacting a first (co)polymer having either a radically transferable X substituent (as defined above) or a group that is readily converted (by known chemical methods) into a radically transferable substituent with a mixture of (i) transition metal compound capable of participating in a reversible redox cycle with the first (co)polymer, (ii) a ligand (as defined above) and (iii) one or more radically polymerizable monomers (as defined above) to form a reaction mixture containing the graft or "comb" (co)polymer, then isolating the formed graft or "comb" (co)polymer from the reaction mixture. The method may further comprise the step of preparing the first (co)polymer by conventional radical, anionic, cationic or metathesis polymerization or by a first ATRP, in which at least one of the monomers has a $R^1$—$R^4$ substituent which is encompassed by the description of the "X" group above. Where the catalyst and/or initiator used to prepare the first (co)polymer (e.g., a Lewis acid used in conventional cationic polymerization, a conventional metathesis catalyst having a metal-carbon multiple bond, a conventional organolithium reagent) may be incompatible with the chosen ATRP initiation/catalyst system, or may produce an incompatible intermediate, the process may further comprise the step of deactivating or removing the catalyst and/or initiator used to prepare the first (co)polymer prior to the grafting step (i.e., reacting the first (co)polymer with subsequent monomer(s) by ATRP).

Alternatively, the method of preparing a graft or "comb" (co)polymer may comprise preparing a first (co)polymer by the present ATRP process, then grafting a number of (co) polymer chains or blocks onto the first (co)polymer by forming the same number of covalent bonds between the first (co)polymer and one or more polymerizable monomers (e.g., by conventional radical polymerization, conventional anionic polymerization, conventional cationic polymerization, conventional metathesis polymerization, or the present ATRP process) polymerizing the polymerizable monomer(s) in accordance with the conventional or ATRP processes mentioned to form a reaction mixture containing the graft or "comb" (co)polymer, then isolating the formed graft or "comb" (co)polymer from the reaction mixture.

Preferably the X substituent on the first (co)polymer is Cl or Br. Examples of preferred monomers for the first (co) polymer thus include allyl bromide, allyl chloride, vinyl chloride, 1- or 2-chloropropene, vinyl bromide, 1,1- or 1,2-dichloro- or dibromoethene, trichloro- or tribromoethylene, tetrachloro- or tetrabromoethylene, chloroprene, 1-chlorobutadiene, 1- or 2-bromobutadiene, vinyl chloroacetate, vinyl dichloroacetate, vinyl trichloroacetate, etc. More preferred monomers include vinyl chloride, vinyl bromide, vinyl chloroacetate and chloroprene. It may be necessary or desirable to hydrogenate (by known methods) the first (co)polymer (e.g., containing chloroprene units) prior to grafting by ATRP.

Thus, the present invention also encompasses graft or "comb" (co)polymers having a formula:

$$X_{f-e}R'' - (M^1_i - X)_e$$

$$X_{f-e}R'' - [(M^1_i M^2_j) - X]_e$$

$$X_{f-e}R'' - [(M^1_i M^2_j M^3_k) - X]_e$$

-continued
$$X_{f-e}R'' - [(M^1_i M^2_j M^3_k \ldots M^n_l) - X]_e$$

$$X_{f-e}R'' - [(M^1)_p - (M^2)_q - X]_e$$

$$X_{f-e}R'' - [(M^1)_p - (M^2)_q - (M^3)_r - X]_e$$

$$X_{f-e}R'' - [(M^1)_p - (M^2)_q - (M^3)_r - \ldots - (M^n)_s - X]_e$$

where R" is a first (co)polymer remainder from a first copolymer having a formula $RX_f$, $f \geq e$; e is a number having an average of at least 2.5, preferably at least 3.0, more preferably at least 5.0, and most preferably at least 8.0; X is as defined above (and is preferably a halogen); $M^1$, $M^2$, $M^3$, ... up to $M^n$ are each a radically polymerizable monomer (as defined above); p, q, r and s are selected to provide weight or number average molecular weights for the corresponding block is at least 100 g/mol, preferably at least 250 g/mol, more preferably at least 500 g/mol and even more preferably at least 1,000 g/mol; and i, j, k . . . up to 1 represent molar ratios of the radically polymerizable monomers $M^1$, $M^2$, $M^3$, ... up to $M^n$. The polydispersity, average degree of polymerization and/or the maximum weight or number average molecular weight of the (co)polymer or component thereof (e.g., base polymer or graft side-chain) may be as described above.

Preferred graft copolymers include those in which the first (co)polymer includes at least three units of vinyl chloride, vinyl bromide, or a $c_2$—$c_3$-alkenyl halo-$c_1$—$c_{20}$-alkanoate ester (e.g., vinyl chloroacetate). More preferred graft copolymers include those in which the first (co)polymer is an N-vinylpyrrolidone/vinyl chloroacetate copolymer containing on average at least three units of vinyl chloroacetate per chain, in which polystyrene chains are grafted thereonto by ATRP using the chloroacetate moiety as initiator. Such graft copolymers are expected to be useful to make, e.g., disposable contact lenses.

In the present copolymers, each of the blocks may have a number average molecular weight in accordance with the homopolymers described above. Thus, the present copolymers may have a molecular weight which corresponds to the number of blocks (or in the case of star polymers, the number of branches times the number of blocks) times the number average molecular weight range for each block.

Polymers and copolymers produced by the present process have surprisingly low polydispersities for (co)polymers produced by radical polymerization. Typically, the ratio of the weight average molecular weight to number average molecular weight ("$M_w/M_n$") is $\leq 1.5$, preferably $\leq 1.4$, and can be as low as 1.10 or less.

Because the "living" (co)polymer chains retain an initiator fragment in addition to an X or X' as an end group or as a substituent in the polymer chain, they may be considered end-functional or in-chain (multi)functional (co)polymers. Such (co)polymers may be used directly or be converted to other functional groups for further reactions, including crosslinking, chain extension, reactive injection molding (RIM), and preparation of other types of polymers (such as polyurethanes, polyimides, etc.).

The present invention provides the following advantages:
A larger number and wider variety of monomers can be polymerized by radical polymerization, relative to ionic and other chain polymerizations;
Polymers and copolymers produced by the present process exhibit a low polydispersity (e.g., $M_w/M_n \leq 1.5$, preferably $\leq 1.4$, more preferably $\leq 1.25$, and most preferably, $\leq 1.10$), thus ensuring a greater degree of uniformity, control and predictability in the (co)polymer properties;
One can select an initiator which provides an end group having the same structure as the repeating polymer units (1-phenylethyl chloride as initiator and styrene as monomer);

The present process provides high conversion of monomer and high initiator efficiency;

The present process exhibits excellent "living" character, thus facilitating the preparation of block copolymers which cannot be formed by ionic processes;

Polymers produced by the present process are well-defined and highly uniform, comparable to polymers produced by living ionic polymerization;

End-functional initiators (e.g., containing COOH, OH, $NO_2$, $N_3$, SCN, etc., groups) can be used to provide an end-functional polymer in one pot, and/or polymer products with different functionalities at each end (e.g., in addition to one of the above groups at one end, a carbon-carbon double bond, epoxy, imino, amide, etc., group at another end);

The end functionality of the (copolymers produced by the present process (e.g., Cl, Br, I, CN, $CO_2R$) can be easily converted to other functional groups (e.g., Cl, Br and I can be converted to OH or $NH_2$ by known processes, CN or $CO_2R$ can be hydrolyzed to form a carboxylic acid by known processes, and a carboxylic acid may be converted by known processes to a carboxylic acid halide), thus facilitating their use in chain extension processes (e.g., to form long-chain polyamides, polyurethanes and/or polyesters);

In some cases (e.g., where "X" is Cl, Br and I), the end functionality of the polymers produced by the present process can be reduced by known methods to provide end groups having the same structure as the repeating polymer units.

Even greater improvements can be realized by using (a) an amount of the corresponding reduced or oxidized transition metal compound which deactivates at least part of the free radicals which may adversely affect polydispersity and molecular weight control/predictability and/or (b) polymerizing in a homogeneous system or in the presence of a solubilized initiating/catalytic system;

A wide variety of (co)polymers having various structures and topologies (e.g., block, random, graft, alternating, tapered (or "gradient"), star, "hyperbranched", cross-linked and water-soluble copolymers and hydrogels) which may have certain desired properties or a certain desired structure may be easily synthesized; and Certain such (co)polymers may be prepared using water as a medium.

Other features of the present invention will become apparent in the course of the following descriptions of exemplary embodiments which are given for illustration of the invention, and are not intended to be limiting thereof.

EXAMPLES

Example 1:

The effect of air exposure upon heterogeneous ATRP of styrene. The following amounts of reagents were weighed into each of three glass tubes under an inert atmosphere in a nitrogen-filled dry box: 11.0 mg ($4.31 \times 10^{-2}$ mol) of $[(bipy)CuCl]_2$ (Kitagawa, S.; Munakata, M. *Inorg. Chem.* 1981, 20, 2261), 1.00 mL (0.909 g, 8.73 mmol) of dry, deinhibited styrene, and 6.0 µL (6.36 mg, $4.52 \times 10^{-2}$ mmol) of dry 1-phenylethylchloride [1-PECl].

The first tube was sealed under vacuum without exposure to air.

The second tube was uncapped outside of the dry box and shaken while exposed to ambient atmosphere for two minutes. The tube was then attached to a vacuum line, the contents were frozen using liquid nitrogen, the tube was placed under vacuum for five minutes, the contents were thawed, and then argon was let into the tube. This "freeze-pump-thaw" procedure was repeated before the tube was sealed under vacuum, and insured that dioxygen was removed from the polymerization solution.

The third tube was exposed to ambient atmosphere for 10 minutes and subsequently sealed using the same procedure.

The three tubes were heated at 130° C. for 12 h using a thermostatted oil bath. Afterwards, the individual tubes were broken, and the contents were dissolved in tetrahydrofuran [THF] and precipitated into $CH_3OH$. Volatile materials were removed from the polymer samples under vacuum. Molecular weights and polydispersities were measured using gel permeation chromatography [GPC] relative to polystyrene standards. Results are shown in Table 1 below.

TABLE 1

Results of the air exposure experiments

| Time of Air Exposure | Yield | $M_n$ | PDI |
|---|---|---|---|
| None | 100 | 18,200 | 1.61 |
| 2 min | 70 | 13,200 | 1.59 |
| 10 min | 61 | 11,900 | 1.39 |

Example 2:

General procedure for the homogeneous ATRP of styrene. The following amounts of reagents were weighed into glass tubes under ambient atmosphere: 12.0 mg ($8.37 \times 10^{-2}$ mmol) of CuBr, 1.00 mL (0.909 g, 8.73 mmol) of deinhibited styrene, and 12.0 µL (16.3 mg, $8.8 \times 10^{-2}$ mmol) of 1-phenylethylbromide [1-PEBr]. For polymerizations using dNbipy, 72.0 mg (0.175 mmol) of the ligand was added, for dTbipy, 47.0 mg (0.175 mmol) was added, and for dHbipy, 62.0 mg (0.175 mmol) was added. Two "freeze-pump-thaw" cycles (described above) were performed on the contents of each tube in order to insure that dioxygen was removed from the polymerization solution. Each tube was sealed under vacuum.

The tubes were placed in an oil bath thermostatted at 100° C. At timed intervals, the tubes were removed from the oil bath and cooled to 0° C. using an ice bath in order to quench the polymerization. Afterwards, the individual tubes were broken, and the contents were dissolved in 10.0 ml of THF. Catalyst could be removed by passing the polymer solution through an activated alumina column. Percent conversion of each sample was measured using gas chromatography, and molecular weights and polydispersities were measured using GPC relative to polystyrene standards. Results are shown in Tables 2 and 3 below.

TABLE 2

Molecular weight data for the homogeneous ATRP of styrene using dTbipy as the ligand.

| Time (min) | (%) Conversion | $M_4$ (GPC) | PDI (GPC) |
|---|---|---|---|
| 60 | 14.5 | 1250 | 1.08 |
| 120 | 20 | 1610 | 1.09 |
| 181 | 28 | 2650 | 1.09 |
| 270 | 43 | 3880 | 1.08 |
| 303 | 49 | 4670 | 1.10 |
| 438 | 59 | 5700 | 1.08 |

TABLE 3

Molecular weight data for the homogeneous ATRP of styrene using dHbipy as the ligand.

| Time (min) | % Conversion | $M_n$ (GPC) | PDI (GPC) |
|---|---|---|---|
| 60 | 31 | 2860 | 1.05 |
| 124 | 45 | 3710 | 1.04 |
| 180 | 58 | 6390 | 1.04 |
| 240 | 78 | 8780 | 1.05 |
| 390 | 90 | 9230 | 1.06 |

Example 3:

General procedures for the determination of the effect of added copper(II) on homogeneous ATRP of styrene. dhbipy was prepared according to the procedure of Kramer et al (*Angew. Chem., Intl. Ed. Engl.* 1993, 32, 703). dTbipy was prepared according to the procedure of Hadda and Bozec (*Polyhedron* 1988, 7, 575). CuCl was purified according to the procedure of Keller and Wycoff (*Inorg. Synth.* 1946, 2, 1).

Method 1: Weighed addition of the transition metal reagents

In a dry box, appropriate amounts of pure CuCl, pure $CuCl_2$, bipyridyl ligand, dry 1-PEC1 and 1,4-dimethoxybenzene added to a 100 mL Schlenk flask equipped with a magnetic stir bar. The flask was fitted with a rubber septum, removed from the dry box, and attached to a Schlenk line. The appropriate amounts of dry, deinhibited styrene and high boiling solvent were added to the flask, and the septum was fixed in place using copper wire. The flask, with the polymerization solution always under an argon atmosphere, was heated at 130° C. using a thermostatted oil bath, and upon heating a homogeneous red-brown solution formed. Aliquots of the polymerization solution (2.00 mL) were removed at timed intervals using a purged syringe and dissolved in 10.0 ml of THF. Percent conversion of each sample was measured using gas chromatography, and molecular weights and polydispersities were measured using GPC relative to polystyrene standards.

Polymerization #1 (no $CuCl_2$):
8.5 mg (0.86 mmol) of CuCl
0.120 mL (0.91 mmol) of 1-PECl
46.6 mg (1.74 mmol) of dTbipy
20.0 mL (0.175 mol) of styrene
20.0 g of p-dimethoxybenzene

TABLE 4

Results of polymerization #1

| Time (min) | % Conversion | $M_n$ (GPC) | PDI (GPC) |
|---|---|---|---|
| 38 | 12 | 2,910 | 1.60 |
| 82 | 19 | 3,700 | 1.60 |
| 120 | 23 | 5,370 | 1.57 |
| 177 | 46 | 8,480 | 1.46 |
| 242 | 58 | 11,500 | 1.37 |
| 306 | 66 | 13,300 | 1.33 |
| 373 | 69 | 14,400 | 1.29 |
| 1318 | 93 | 19,000 | 1.22 |

Polymerization #2 (3 mol % $CUCl_2$):
8.9 mg (0.90 mmol) of CuCl
0.4 mg (0.03 mmol) of $CuCl_2$
0.120 mL (0.91 mmol) of 1-PECl
47.1 mg (1.75 mmol) of dTbipy
20.0 mL (0.175 mol) of styrene
20.0 g of p-dimethoxybenzene

TABLE 5

Results of polymerization #2

| Time (min) | % Conversion | $M_n$ (GPC) | PDI (GPC) |
|---|---|---|---|
| 37 | 0 | 0 | — |
| 85 | 8 | 1,870 | 1.44 |
| 123 | 22.5 | 3,280 | 1.41 |
| 194 | 30.5 | 4,470 | 1.40 |
| 256 | 39 | 6,920 | 1.31 |
| 312 | 43 | 9,340 | 1.27 |
| 381 | 48 | 10,000 | 1.25 |
| 1321 | 79 | 15,490 | 1.21 |
| 1762 | 83 | 15,300 | 1.21 |

Method 2: Addition of stock solutions of the copper reagents

The polymerizations were conducted as in the general procedure for the homogeneous ATRP of styrene, except that stock solutions of the dipyridyl ligand with CuBr, and separately, $CuBr_2$ in styrene were prepared and added to 1-PEBr in the glass tube before removal from the dry box and sealing.

Polymerization #1 (no $CuBr_2$):
$4.5 \times 10^{-2}$ mmol of CuBr
6.2 µL ($4.5 \times 10^{-2}$ MMol) of 1-PEBr
32.0 mg ($9.0 \times 10^{-2}$ mmol) of dHbipy
0.5 mL (4.36 mol) of styrene

TABLE 6

Results of polymerization #1

| Time (min) | % Conversion | $M_n$ (GPC) | PDI (GPC) |
|---|---|---|---|
| 70 | 38 | 4,510 | 1.08 |
| 120 | 64 | 6,460 | 1.09 |
| 160 | 68 | 6,710 | 1.10 |
| 200 | 72 | 8,290 | 1.11 |
| 240 | 82 | 9,480 | 1.14 |
| 300 | 86 | 10,180 | 1.13 |

Polymerization #2 (1.0 Mol % of $CuBr_2$):
$4.5 \times 10^{-2}$ mmol of CuBr
$4.5 \times 10^{-4}$ mmol of $CuBr_2$
6.2 µL ($4.5 \times 10^{-2}$ MMol) of 1-PEBr
$9.0 \times 10^{-2}$ mmol of dHbipy
0.5 mL (4.36 mol) of styrene

TABLE 7

Results of polymerization #2

| Time (min) | % Conversion | $M_n$ (GPC) | PDI (GPC) |
|---|---|---|---|
| 50 | 5 | 1210 | 1.07 |
| 105 | 18 | 2870 | 1.05 |
| 165 | 39 | 4950 | 1.06 |
| 174 | 40 | 4990 | 1.06 |
| 300 | 68 | 6470 | 1.07 |

Example 4:
ATRP of water-soluble monomers

General procedure for the polymerization of water soluble monomers. Under ambient conditions, a glass tube was charged with the appropriate amounts of copper(I) halide (unpurified), bipy, initiator, and monomer. Water, if used, was then added. Two "freeze-pump-thaw" cycles (described above) were performed on the contents of each tube in order to insure that dioxygen was removed from the polymerization solution. Each tube was sealed under vacuum, and then placed in a thermostatted oil bath at 80° C. or 100° C. for 12 h. Afterwards, the individual tubes were broken.

(a) P(NVP). For N-vinyl pyrrolidone, the contents were dissolved in 10.0 ml of THF. Percent conversion of each sample was measured using gas chromatography.

Bulk conditions:
12.1 mg ($8.4 \times 10^{-2}$ mmol) of CuBr
28.1 mg (0.18 mmol) of bipy
4.0 µl (6.2 mg, $4.1 \times 10^{-2}$ mmol) of bromomethyl acetate
1.00 mL (0.980 g, 8.82 mmol) of N-vinyl pyrrolidone
Heated at 100° C. for 12 h
% Conversion=100

Aqueous conditions:
13.7 mg ($9.6 \times 10^{-2}$ mmol) of CuBr
30.1 mg (0.19 mmol) of bipy
4.0 µl (6.2 mg, $4.1 \times 10^{-2}$ mmol) of bromomethyl acetate
1.00 mL (0.980 g, 8.82 mmol) of N-vinyl pyrrolidone
1.00 mL of water
Heated at 100° C. for 12 h
% Conversion=80

(b) P(acrylamide). For acrylamide, the contents were dissolved in 50 mL of water and precipitated into 200 mL of CH$_3$OH. The polymer was isolated by filtration, and volatile materials were removed under vacuum.

Conditions:
10.7 mg ($7.5 \times 10^{-2}$ mmol) of CuBr
39.3 mg (0.25 mmol) of bipy
8.0 µl (12.0 mg, $7.2 \times 10^{-2}$ mmol) of methyl-2-bromopropionate
1.018 g (14.3 mmol) of acrylamide
1.00 mL of water
Heated at 100° C. for 12 h.
Yield: 0.325 (32%) of a white solid (c) P(HEMA). For 2-hydroxyethyl methacrylate, the contents were dissolved in 50 mL of dimethyl formamide [DMF] and precipitated into 200 mL of diethyl ether. The solvent was decanted from the oily solid, and the residue was dissolved in 25 mL of DMF. To this solution, 25 mL of acetyl chloride was added and the solution was heated at reflux for 4 h. Then, 50 mL of THF was added and the solution was poured into 250 mL of CH$_3$OH. The resulting suspension was isolated by centrifugation, and the material was reprecipitated from 50 mL of THF using 250 mL of CH$_3$OH. The molecular weight and polydispersity of the sample was measured using GPC relative to polystyrene standards.

Conditions:
11.1 mg ($2.1 \times 10^{-2}$ mol) of Cu(bipy)$_2^+$ (PF$_6$)$^-$
6.0 µl (8.0 mg, $4.1 \times 10^{-2}$ mmol) of ethyl-2-bromoisobutyrate
1.00 mL (1.07 g, 5.5 mmol) of 2-hydroxyethyl methacrylate
1.00 mL of water
Heated at 80° C. for 12 h.
Mn=17,400; PDI=1.60

Examples 5–8:

Random copolymers

ATRP allows preparation of random copolymers of a variety of monomers providing a broad range of compositions, well controlled molecular weights and narrow molecular weight distributions.

Example 5:

Preparation of random copolymers of methyl methacrylate and styrene (a) Copolymers containing 20% styrene 0.007 g of CuBr, 0.0089 g of 2,2'-bipyridyl and 0.067 ml of ethyl-2-bromoisobutyrate was added to a degassed mixture of styrene (0.25 ml) and methyl methacrylate (0.75 ml) and the reaction mixture was heated to 100° C. After 2.5 hrs. the polymerization was interrupted, and the resulting polymer was precipitated on methanol and purified by reprecipitation from THF/methanol. The yield of the copolymer was 35%.

The composition of the copolymer was determined by NMR to be 20 mol. % styrene. Molecular weight, $M_n$, of the copolymer was 11,000 and polydispersity (Mw/Mn)=1.25, as obtained from GPC relative to polystyrene standards.

(b) Copolymers containing 50% styrene 0.007 g of CuBr, 0.0089 g of 2,2'-bipyridyl and 0.067 ml of ethyl-2-bromoisobutyrate was added to a degassed mixture of styrene (0.5 ml) and methyl methacrylate (0.5 ml). The reaction mixture was heated to 100° C. After 3.5 hrs., the polymerization was interrupted, and the resulting polymer was precipitated in methanol and purified by reprecipitation from THF/methanol. The yield of the copolymer was 18%.

The composition of the copolymer was determined by NMR to be 50% (by moles) of styrene. Molecular weight, $M_n$, of the copolymer was 9,000 and polydispersity Mw/Mn=1.27, as obtained from GPC relative to polystyrene standards.

(c) Copolymers containing 65% styrene 0.007 g of CuBr, 0.0089 g of 2,2'-bipyridyl and 0.067 ml of ethyl-2-bromoisobutyrate was added to a degassed mixture of styrene (0.75 ml) and methyl methacrylate (0.25 ml). The reaction mixture was heated to 100° C. After 2.0 hrs., the polymerization was interrupted, and the resulting polymer was precipitated in methanol and purified by reprecipitation from THF/methanol. The yield of the copolymer was 16%.

The composition of the copolymer was determined by NMR to be 65% (by moles) of styrene. Molecular weight, $M_n$, of the copolymer was 6,000 and polydispersity Mw/Mn=1.25, as obtained from GPC relative to polystyrene standards.

Example 6:

Random Copolymerization Between Styrene (70 mol %) and Acrylonitrile (30 mol %)

2,2'-Bipyridyl (0.1781 g), dimethoxybenzene (20 g), and Cu(I) Cl (0.0376 g) were added to a 100 ml flask, which was sealed with a rubber septum and copper wire. The flask was placed under vacuum and then back-filled with argon. This was repeated two more times. Styrene (17.2 ml) and acrylonitrile (4.2 ml) were then added via syringe. The monomers had been previously deinhibited by passing through a column of alumina and degassed by bubbling argon through the monomer for fifteen minutes. 1-Phenylethyl chloride (0.0534 g) was then added to the reaction mixture by syringe, and the reaction was heated to 130° C. Samples were taken (0.5 ml each). Conversion was determined by $^1$H NMR, and the Mn and polydispersity (PD) determined by GPC. The samples were then purified by dissolution in THF and precipitation into methanol three times. The purified polymer was then evaluated for acrylonitrile content by $^1$H NMR. The differences in monomer reactivities (reactivity ratio) may provide a compositional gradient. Table 8 lists the results.

TABLE 8

| Time (h) | Conversion (%) | $M_n$ | PD | % Acrylonitrile |
|---|---|---|---|---|
| 2.0 | 27.0 | 8160 | 1.65 | 54.2 |
| 5.25 | 29.6 | 9797 | 1.51 | 35.6 |
| 8.0 | 39.4 | 11131 | 1.44 | 40.8 |
| 21.0 | 53.6 | 16248 | 1.31 | 34.1 |

Example 7:
Preparation of random copolymer of styrene and methyl acrylate 0.010 g of CuBr, 0.0322 g of 2,2'-bipyridyl and 0.010 ml of ethyl-2-bromoisobutyrate was added to a degassed mixture of methyl acrylate (0.42 ml) and styrene (1.00 ml) and the reaction mixture was heated to 90° C. After 14 hrs., the polymerization was interrupted and the resulting polymer was precipitated on methanol and purified by reprecipitation from THF/methanol. The yield of the copolymer was 87%.

The composition of the copolymer was determined by NMR to be 40% (by moles) of styrene. Molecular weight, $M_n$, of the copolymer was 22,000 and polydispersity Mw/Mn=1.18, as obtained from GPC relative to polystyrene standards. The monomer reactivity ratio may have provided a compositional gradient.

Example 8:
Preparation of random copolymer of methyl methacrylate and butyl acrylate 0.010 g of CuBr, 0.0322 g of 2,2'-bipyridyl and 0.010 ml of ethyl-2-bromoisobutyrate was added to a degassed mixture of methyl methacrylate (2.5 ml) and butyl acrylate (2.5 ml) and the reaction mixture was heated to 110° C. After 2.5 hrs., the polymerization was interrupted, and the resulting polymer was precipitated on methanol and purified by reprecipitation from THF/methanol. The yield of the copolymer was 53%.

The composition of the copolymer was determined by NMR to be 15% (by moles) of butyl acrylate. Molecular weight, $M_n$, of the copolymer was 11,000 and polydispersity Mw/Mn=1.50, as obtained from GPC relative to polystyrene standards. The monomer reactivity ratio may have provided a compositional gradient.

Alternating and Partially Alternating Copolymers

Example 9:
Alternating copolymers isobutylene (IB)/methyl acrylate (molar feed 3.5:1)

To 0.11 g ($6.68 \times 10^{-4}$ mole) 2,2'-bipyridyl and 0.036 g ($2.34 \times 10^{-4}$ mole) CuBr at −30° C. in a glass tube, were added 1.75 ml ($2 \times 10^{-2}$ mole) IB, 0.5 ml ($0.55 \times 10^{-2}$ mole) methyl acrylate (MA) and 0.036 ml ($2.34 \times 10^{-4}$ mole) 1-phenylethyl bromide under an argon atmosphere. The glass tube was sealed under vacuum, and the reaction mixture was warmed at 50° C. for 48 hours. The reaction mixture was then dissolved in THF, and conversion of MA as determined by GC was 100%. The polymer was then precipitated in methanol (three times), filtered, dried at 60° C. under vacuum for 48 h and weighed. The content of IB in copolymer was 51%, and $M_n$=4050, $M_w/M_n$=1.46 ($M_{th}$=3400). The % of IB in the copolymer as determined by integration of methoxy and gem-dimethyl regions of the $^1$H-NMR spectrum was 44%. The tacticity of the alternating copolymer as calculated from the signals of methoxy protons according to the method described by Kuntz (J. Polym. Sci. Polym. Chem. 16, 1747, 1978) is rr/mr/mm=46/28/26. The glass transition temperature of product as determined by DSC was −28° C.

Example 10:
IB/MA Copolymer (molar feed 1:1)

To 0.055 g ($3.5 \times 10^{-4}$ mole) 2,2'-bipyridyl and 0.017 g ($1.17 \times 10^{-4}$ mole) CuBr at −30° C. in a glass tube, were added 0.5 ml ($0.55 \times 10^{-2}$ mole) IB, 0.5 ml ($0.55 \times 10^{-2}$ mole) methyl acrylate and 0.016 ml ($1.17 \times 10^{-4}$ mole) 1-phenylethyl bromide under argon atmosphere. The glass tube was sealed under vacuum and the reaction mixture was warmed at 50° C. for 24 hours. The reaction mixture was then dissolved in THF, and conversion of MA as determined by GC was 100%. The polymer was than precipitated in methanol (three times), filtered, dried at 60° C. under vacuum for 48 h and weighed. The content of IB in copolymer was 28% and Mn=6400, $M_w/M_n$=1.52 ($M_{th}$=6500). The % of IB in copolymer determined by integration of methoxy and gem-dimethyl region of the $^1$H-NMR spectrum according to the method described by Kuntz was 26%. The glass transition temperature of the product as determined by DSC was −24° C.

Example 11:
IB/MA Copolymer (molar feed 1:3)

To 0.11 g ($6.68 \times 10^{-4}$ mole) 2,2'-bipyridyl and 0.036 g ($2.34 \times 10^{-4}$ mole) CuBr at −30° C. in a glass tube, were added 0.5 ml ($0.55 \times 10^{-2}$ mole) IB, 1.5 ml ($1.65 \times 10^{-2}$ mole) methyl acrylate and 0.036 ml ($2.34 \times 10^{-4}$ mole) 1-phenylethyl bromide under argon atmosphere. The glass tube was sealed under vacuum and the reaction mixture warmed at 50° C. for 48 hours. The reaction mixture was then dissolved in THF, and the conversion of MA as determined by GC was 100%. The polymer was then precipitated in methanol (three times), filtered, dried at 60° C. under vacuum for 48 h and weighed. The content of IB in the copolymer was 25%, and Mn=7570, $M_w/M_n$=1.58 ($M_{th}$=7400). The % of IB in copolymer as determined by integration of methoxy and gem-dimethyl region of the $^1$H-NMR spectrum according to the method described by Kuntz was 24%. The glass transition temperature of the product as determined by DSC was −15° C.

Example 12:
Alternating copolymers of isobutyl vinyl ether (IBVE)/methyl acrylate (1:1)

To 0.055 g ($3.51 \times 10^{-4}$ mole) 2,2'-bipyridyl and 0.017 g ($1.17 \times 10^{-4}$ mole) CuBr in a glass tube, were added 0.6 ml ($0.55 \times 10^{-2}$ mole) IBVE, 0.5 ml ($0.55 \times 10^{-2}$ mole) methyl acrylate and 0.017 ml ($1.17 \times 10^{-4}$ mole) 1-phenylethyl bromide under argon atmosphere. The glass tube was sealed under vacuum, and the reaction mixture was warmed at 50° C. for 12 hours. The reaction mixture was then dissolved in THF, and the conversion of MA and IBVE as determined by GC were 100%. The polymer was then precipitated in methanol (three times), filtered, dried at 60° C. under vacuum for 48 h and weighed. The content of IBVE in copolymer was 51%, and $M_n$=8110, $M_w/M_n$=1.54 ($M_{th}$=8700). The glass transition temperature of the product as determined by DSC was −31.3° C.

Example 13:
Copolymers of isobutyl vinyl ether/methyl acrylate (3:1)

To 0.11 g ($6.68 \times 10^{-4}$ mole) 2,2'-bipyridyl and 0.036 g ($2.34 \times 10^{-4}$ mole) CuBr in a glass tube, were added 1.8 ml ($1.65 \times 10^{-2}$ mole) IBVE, 0.5 ml ($0.55 \times 10^{-2}$ mole) methyl acrylate and 0.034 ml ($2.34 \times 10^{-4}$ mole) 1-phenylethyl bromide under argon atmosphere. The glass tube was sealed under vacuum, and the reaction mixture was warmed at 50° C. for 12 hours. The reaction mixture was then dissolved in THF, and the conversion of MA and IBVE as determined by GC were 100%. The polymer was then precipitated in methanol (three times), filtered, dried at 60° C. under vacuum for 48 h and weighed. The content of IBVE in the copolymer was 75%, and Mn=8710, $M_w/M_n$=2.00 ($M_{th}$=9090). The glass transition temperatures of the product as determined by DSC were −44.3° C. and 7.1° C.

Example 14:
Copolymers of isobutyl vinyl ether/methyl acrylate (1:3)

To 0.11 g (6.68×10$^{-4}$ mole) 2,2'-bipyridyl and 0.036 g (2.34×10$^{-4}$ mole) CuBr in a glass tube, were added 0.6 ml (0.55×10$^{-2}$ mole) IBVE, 1.5 ml (1.65×10$^{-2}$ mole) methyl acrylate and 0.034 ml (2.34×10$^{-4}$ mole) 1-phenylethyl bromide under argon atmosphere. The glass tube was sealed under vacuum, and the reaction mixture was warmed at 50° C. for 12 hours. The reaction mixture was then dissolved in THF, and the conversion of MA and IBVE as determined by GC were 100%. The polymer was then precipitated in methanol (three times), filtered, dried at 60° C. under vacuum for 48 h and weighed. The content of IBVE in the copolymer was 25%, and $M_n$=7860, $M_w/M_n$=1.90 ($M_{th}$=8400). The glass transition temperatures of the product as determined by DSC were at −31.0° C. and 5.6° C.

Periodic Copolymers

Example 15:

Under an argon atmosphere, 11.1 mL of styrene (9.6×10$^{-2}$ mole) was added to 0.097 g (6×10$^{-4}$ mole) of 2,2'-bipyridyl and 0.020 g (2×10$^{-4}$ mole) CuCl in a 50 mL glass flask. The initiator 0.030 mL (2×10$^{-4}$ mole) 1-phenylethyl chloride was then added via syringe. The flask was then immersed in oil bath at 130° C. At various time intervals, samples from the reaction mixture were transferred to an NMR tube, and the conversion of styrene was determined.

Thereafter, 1.5 eq. of maleic anhydride (0.03 g, 3×10$^{-4}$ mole) in benzene (4 mL) was injected into the flask at times of 20, 40, 60 and 80% conversion of styrene. After 25 hours, the reaction mixture was cooled to room temperature, and 15 mL of THF was added to the samples to dissolve the polymers. The conversion of styrene by measuring residual monomer was 95%.

The polymer was precipitated in dry hexane, filtered, dried at 60° C. under vacuum for 48 h and weighed. The product had a $M_n$=47500 and $M_w/M_n$=1.12 ($M_{th}$=50,000). The content of maleic anhydride was determined by IR spectroscopy, and corresponded to the introduced amount.

Gradient Copolymers

Figure 3A:
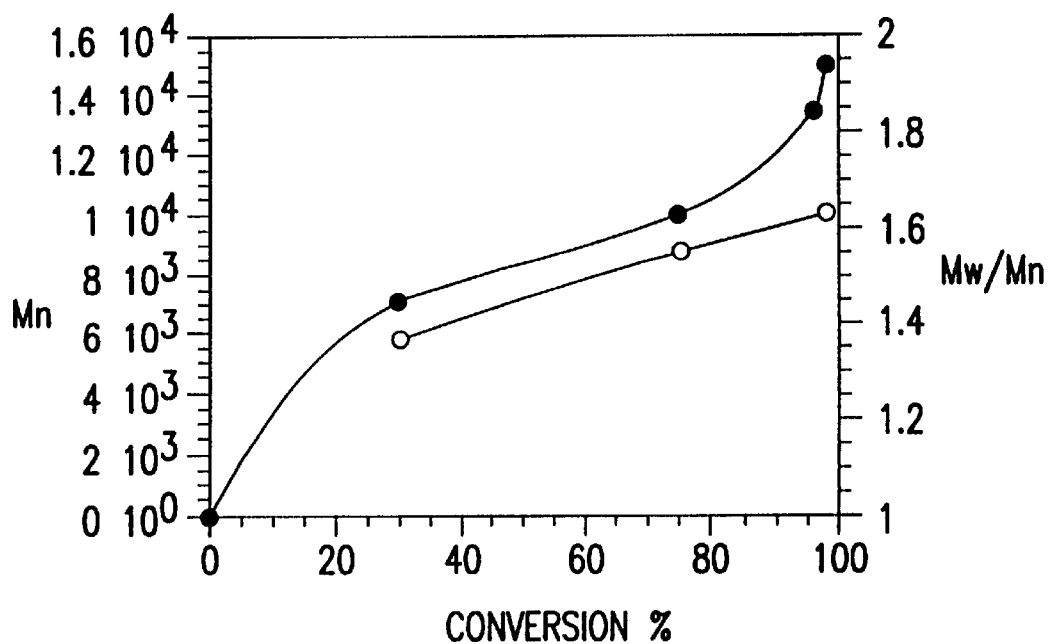
FIGS. 3A–B are plots of molecular weight ($M_n$) and polydispersities ($M_w/M_n$) vs. time (FIG. 3A) and of the instantaneous composition of the copolymer ($F_{inst}$) vs. chain length (FIG. 3B) for the gradient copolymerization of Example 16 below.
Figure 3B:
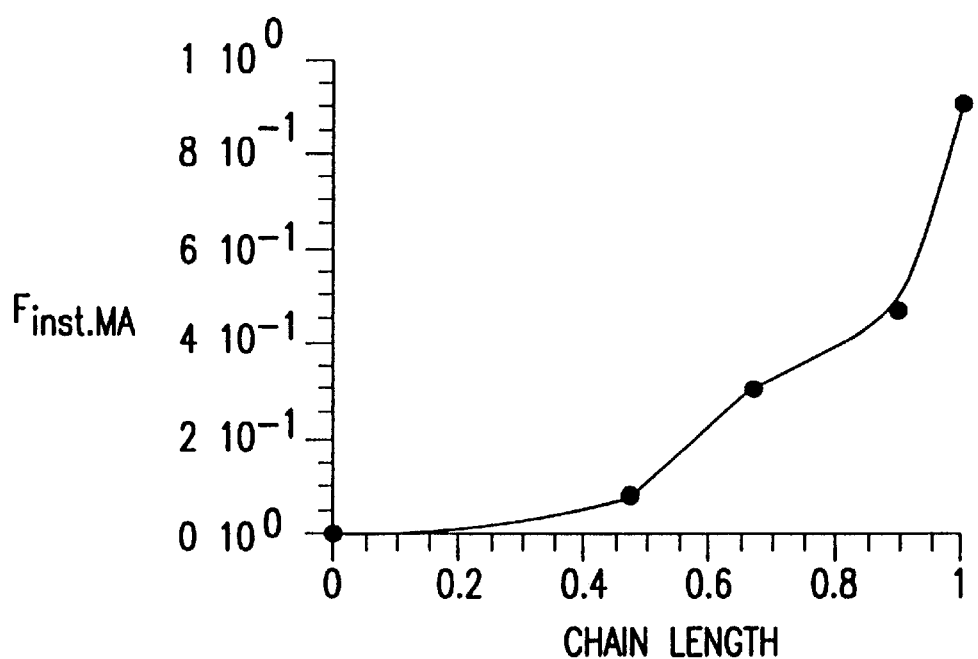

Example 16:
Preparation of a methyl acrylate/methyl methacrylate gradient copolymer 0.029 g of CuBr, 0.096 g of 2,2'-bipyridyl and 0.030 ml of ethyl-2-bromoisobutyrate were added to a degassed solution of methyl acrylate (2.5 ml) and methyl methacrylate (2.0 ml) in ethyl acetate (2.0 ml). The reaction mixture was thermostated at 90° C. and samples were withdrawn after 3.0 hr, 5 hr, 7 hr and 23 hr. From the composition data obtained from NMR measurements of these samples and from molecular weights evaluation from GPC measurements relative to polystyrene standards, the compositional gradient along the chain of the final copolymer was calculated (FIGS. 3A–B). The final polymer (at 96% conversion) was purified by reprecipitation from methanol/THF.

Figure 4A:
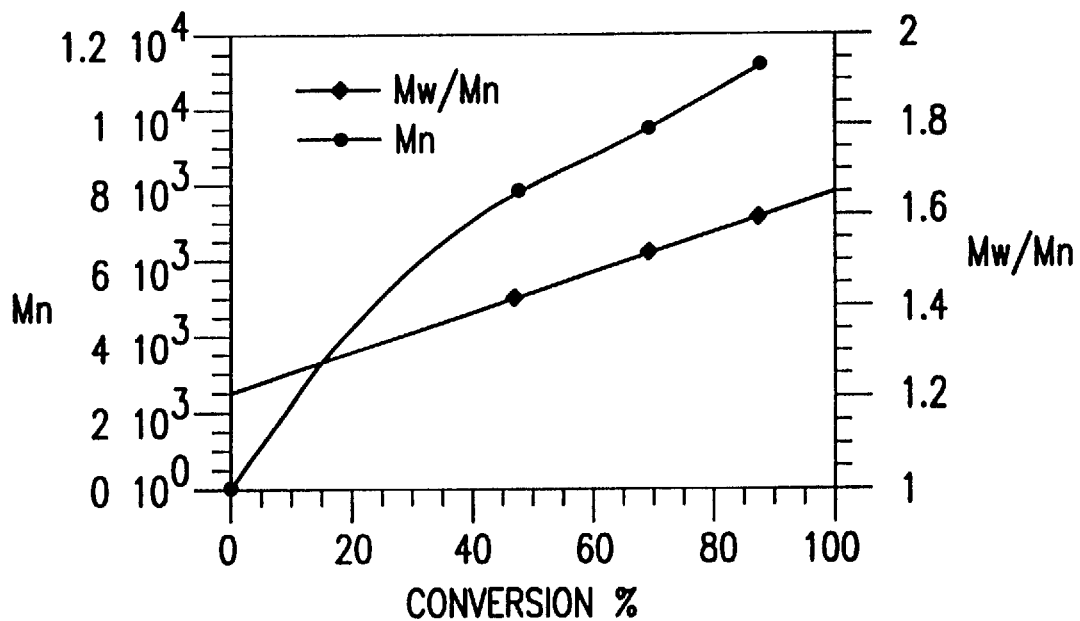
FIGS. 4A–B are plots of molecular weight ($M_n$) and polydispersities ($M_w/M_n$) vs. time (FIG. 4A) and of the instantaneous composition of the copolymer ($F_{inst}$) vs. chain length (FIG. 4B) for the gradient copolymerization of Example 17 below.
Figure 4B:
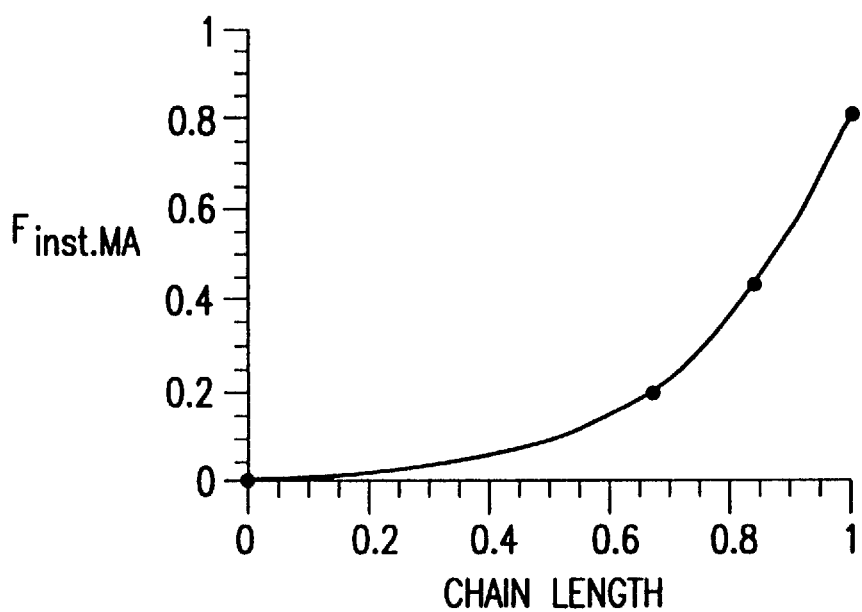

Example 17:

0.125 g of CuBr, 0.407 g of 2,2'-bipyridyl and 0.118 ml of ethyl-2-bromoisobutyrate was added to a degassed mixture of methyl acrylate (3.8 ml) and methyl methacrylate (4.8 ml). The reaction mixture was thermostated at 80° C. and samples were withdrawn after 0.5 hr, 1 hr and 1.5 hr. From the composition data obtained from NMR measurements of these samples and from molecular weights evaluation from GPC measurements relative to polystyrene standards, the compositional gradient along the chain of the final copolymer was calculated (FIGS. 4A–B). The final polymer (at 88% conv.) was purified by reprecipitation from methanol/THF.

Figure 5A:
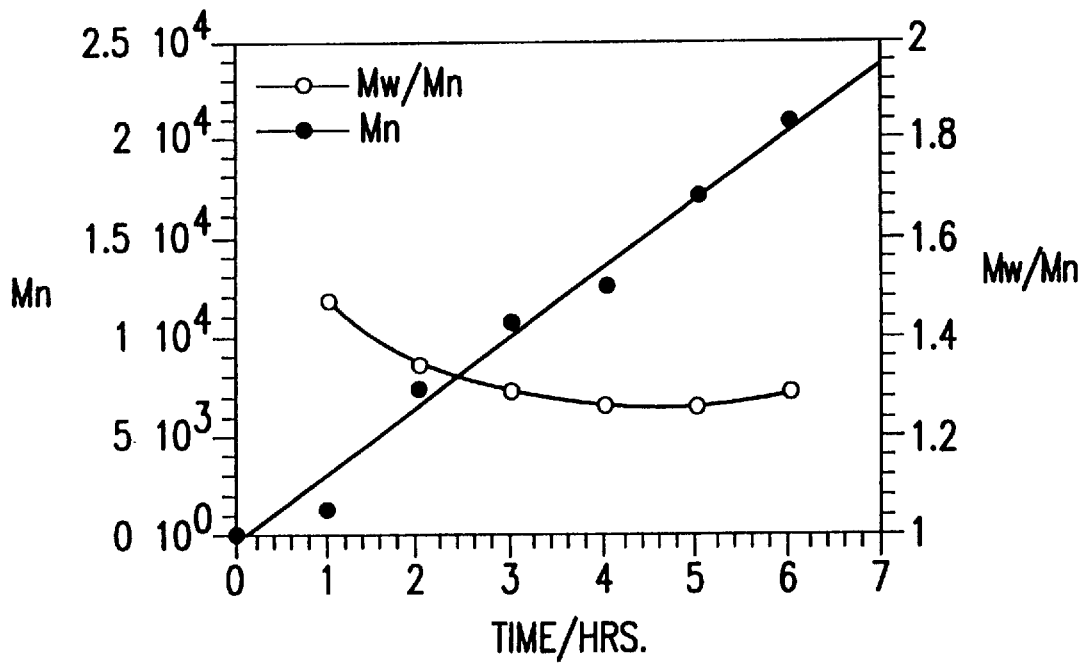
FIGS. 5A–B are plots of molecular weight ($M_n$) and polydispersities ($M_w/M_n$) vs. time (FIG. 5A) and of the instantaneous composition of the copolymer ($F_{inst}$) vs. chain length (FIG. 5B) for the gradient copolymerization of Example 18 below.
Figure 5B:
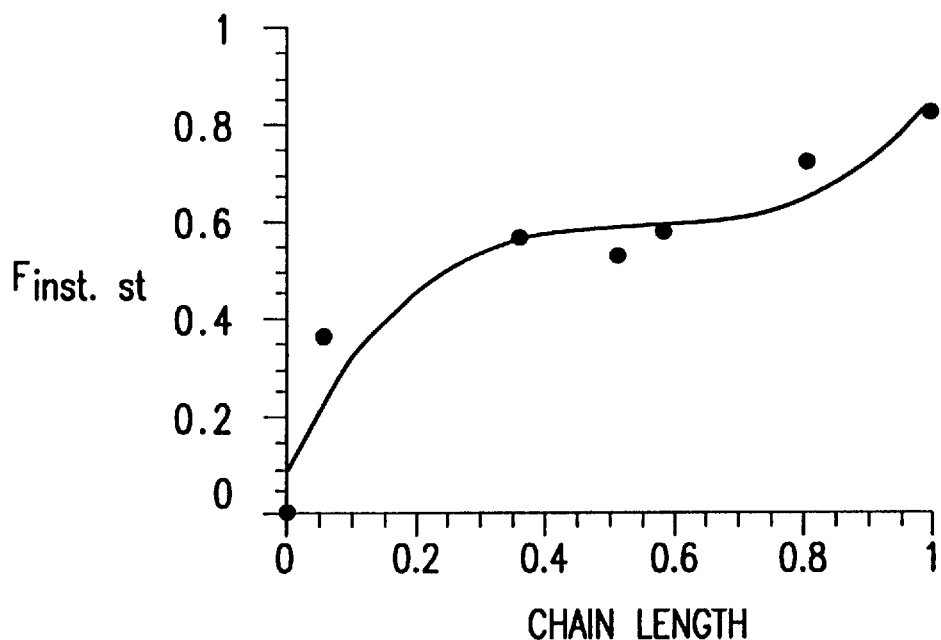

Example 18:
Preparation of a styrene/methyl methacrylate gradient copolymer 0.063 g of CuBr, 0.205 g of 2,2'-bipyridyl and 0.064 ml of ethyl-2-bromoisobutyrate was added to 5 ml of styrene and the mixture was heated at 110° C. A mixture of styrene (5 ml) and methyl methacrylate (5 ml) was added at a rate of addition of 0.1 ml/min, followed by 10 ml of methyl methacrylate added at the same rate. Samples were withdrawn at certain time periods, and from the composition data obtained from NMR measurements of these samples and from GPC measurement of the molecular weights relative to polystyrene standards, the compositional gradient along the chain of the final copolymer was calculated (FIGS. 5A–B). The final polymer (2.34 g) was purified by reprecipitation from methanol/THF. DSC measurements of the final copolymer show a single glass transition with $T_g$=106° C.

Figure 6A:
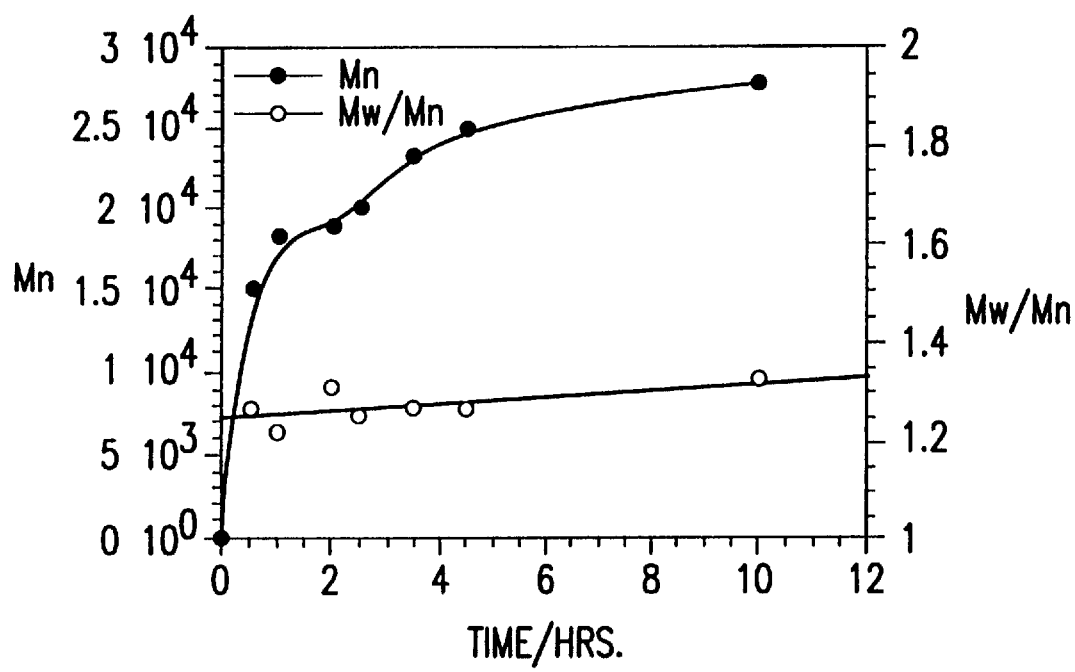
FIGS. 6A–B are plots of molecular weight ($M_n$) and polydispersities ($M_w/M_n$) vs. time (FIG. 6A) and of the instantaneous composition of the copolymer ($F_{inst}$) vs. chain length (FIG. 6B) for the gradient copolymerization of Example 19 below.
Figure 6B:
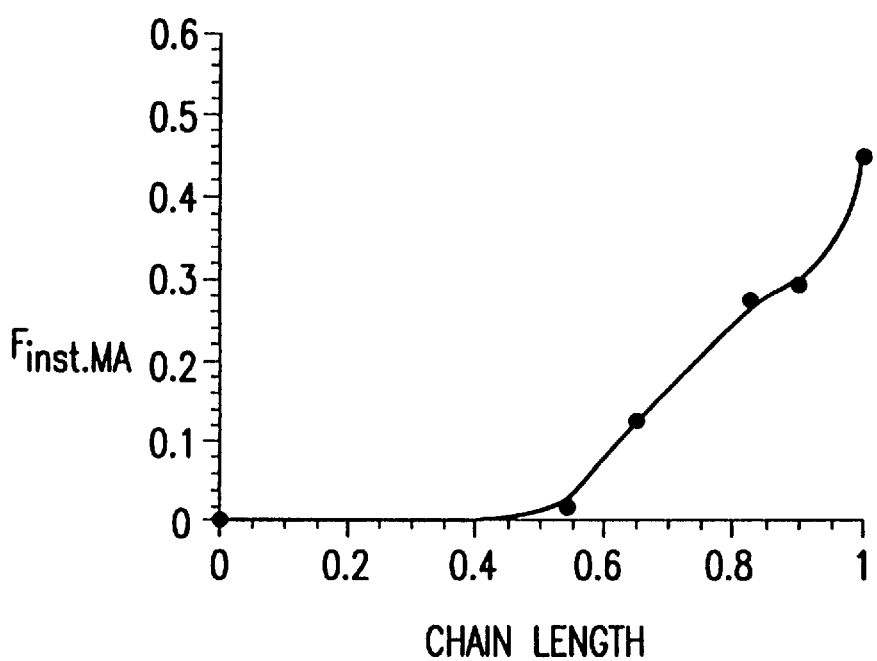

Example 19:
Preparation of methyl acrylate/methyl methacrylate gradient copolymer 0.107 g of CuBr, 0.349 g of 2,2'-bipyridyl and 0.109 ml of ethyl-2-bromoisobutyrate was added to a mixture of methyl acrylate (5 ml) and methyl methacrylate (10 ml), and the reaction mixture was heated to 90° C. Methyl acrylate (20 ml) was added to the reaction mixture at a rate of addition of 0.1 ml/min. Samples were withdrawn at certain time periods, and from the composition data obtained from NMR measurements of these samples and from GPC measurement of the molecular weights relative to polystyrene standards, the compositional gradient along the chain of the final copolymer was calculated (FIGS. 6A–B). The final polymer (3.15 g) was purified by reprecipitation from methanol/THF. DSC measurements of the final copolymer show a single glass transition with $T_g$=52° C.

Figure 7A:
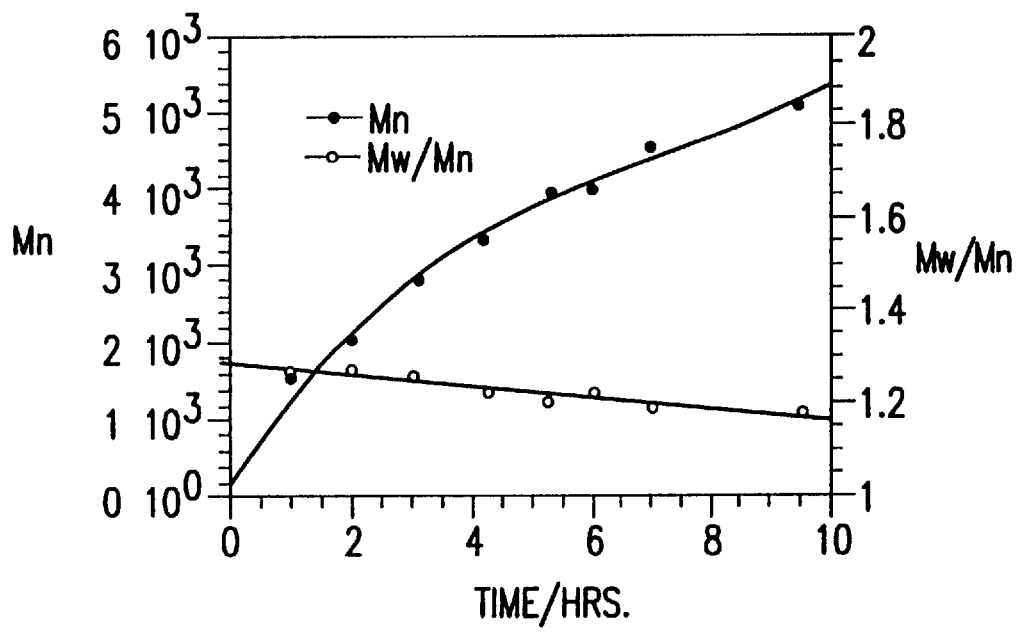
FIGS. 7A–B are plots of molecular weight ($M_n$) and polydispersities ($M_w/M_n$) vs. time (FIG. 7A) and of the instantaneous composition of the copolymer ($F_{inst}$) vs. chain length (FIG. 7B) for a gradient copolymerization described in Example 20 below.
Figure 7B:
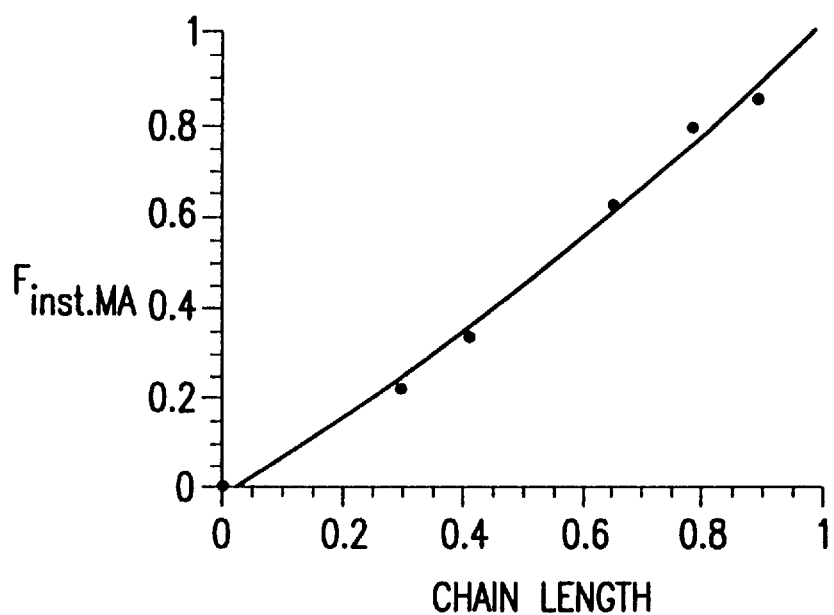

Example 20:
Preparation of methyl acrylate/styrene gradient copolymers with varying gradient of composition 0.063 g of CuBr, 0.205 g of 2,2'-bipyridyl and 0.64 ml of ethyl-2-bromoisobutyrate was added to 10 ml of styrene and the reaction mixture was heated to 95° C. Methyl acrylate was added to the reaction mixture at a rate of addition of 0.1 ml/min such that the final reaction mixture contained 90% of methyl acrylate. Samples were withdrawn at certain time periods and from the composition data obtained from NMR measurements of these samples and from GPC measurement of the molecular weights relative to polystyrene standards, the compositional gradient along the chain of the final copolymer was calculated (FIGS. 7A–B). The final polymer (1.98 g) was purified by reprecipitation from methanol/THF. DSC measurements of the final copolymer show a single glass transition with $T_g$=58° C.

Figure 8A:
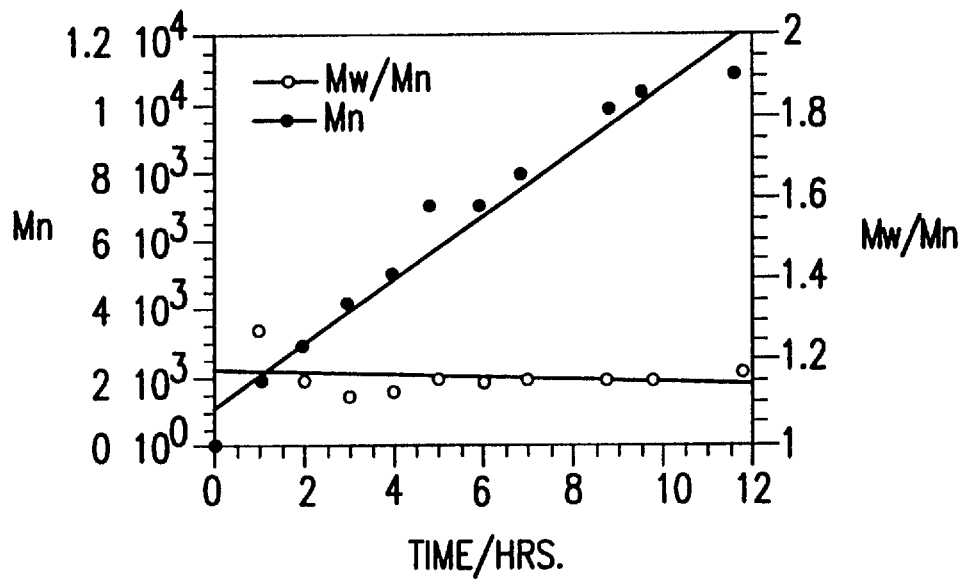
FIGS. 8A–B are plots of molecular weight ($M_n$) and polydispersities ($M_w/M_n$) vs. time (FIG. 8A) and of the instantaneous composition of the copolymer ($F_{inst}$) vs. chain length (FIG. 8B) for a gradient copolymerization described in Example 20 below.
Figure 8B:
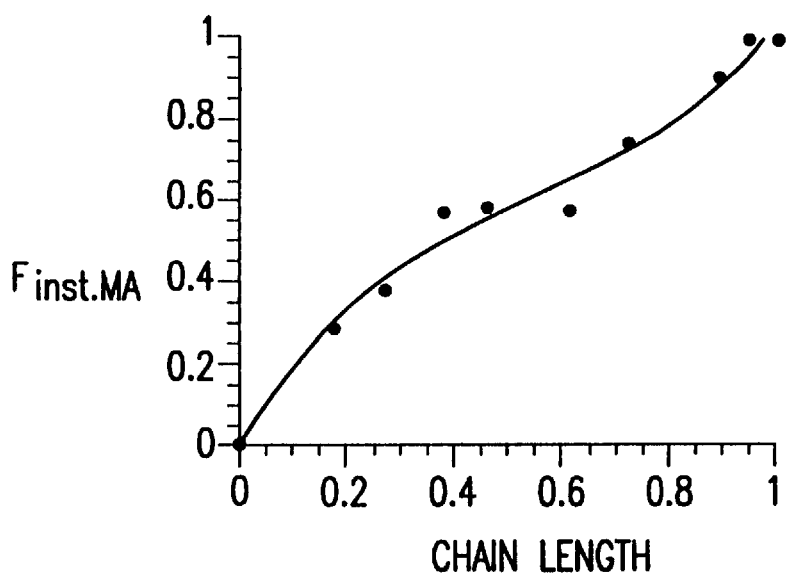

In a separate experiment, 0.063 g of CuBr, 0.205 g of 2,2'-bipyridyl and 0.64 ml of ethyl-2-bromoisobutyrate was added to 10 ml of styrene and the reaction mixture was heated to 95° C. Methyl acrylate was added to the reaction mixture at a rate of addition of 0.085 ml/min such that the final reaction mixture contained 90% of methyl acrylate. Samples were withdrawn at certain time periods. From the composition data obtained from NMR measurements of these samples and from GPC measurement of the molecular weights relative to polystyrene standards, the compositional gradient along the chain of the final copolymer was calculated (FIGS. 8A–B). The final polymer (1.94 g) was purified by reprecipitation from methanol/THF. DSC measurements of the final copolymer show a single glass transition with $T_g=72°$ C.

Figure 9A:
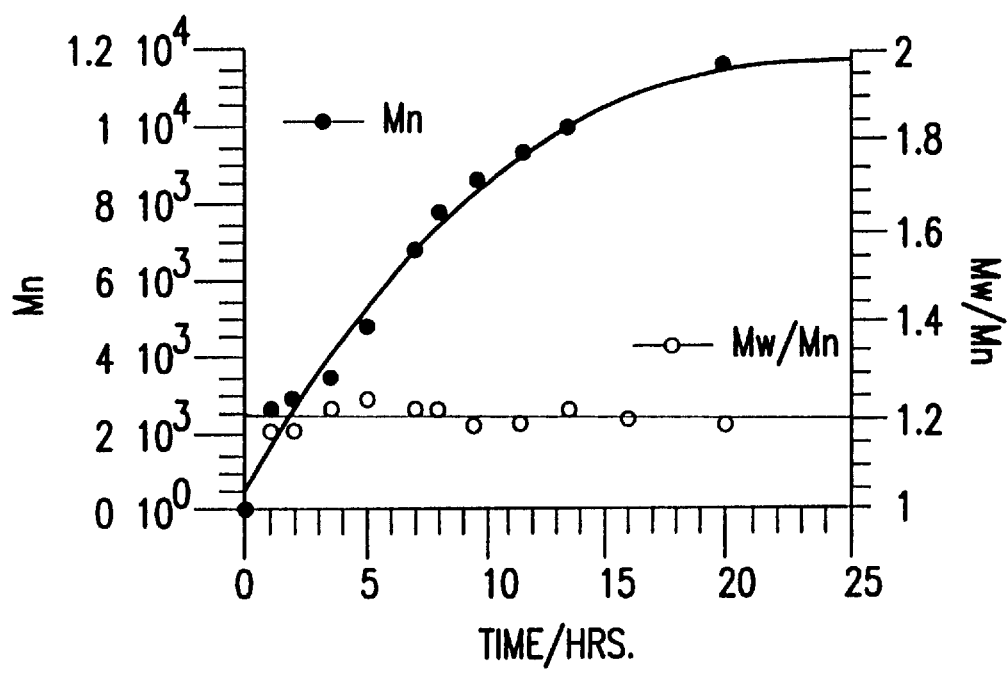
FIGS. 9A–B are plots of molecular weight ($M_n$) and polydispersities ($M_w/M_n$) vs. time (FIG. 9A) and of the instantaneous composition of the copolymer ($F_{inst}$) vs. chain length (FIG. 9B) for a gradient copolymerization described in Example 20 below.
Figure 9B:
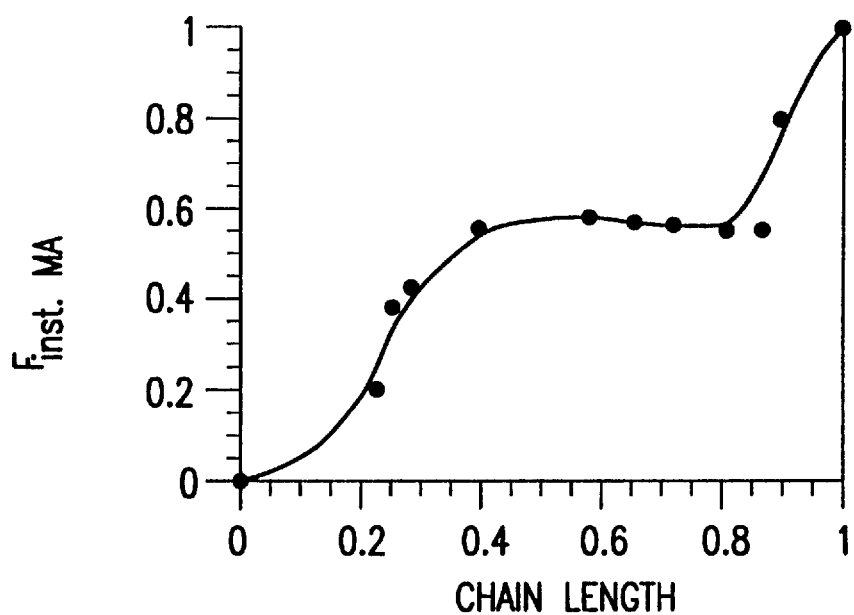

In a third experiment, 0.063 g of CuBr, 0.205 g of 2,2'-bipyridyl and 0.64 ml of ethyl-2-bromoisobutyrate was added to 10 ml of styrene and the reaction mixture was heated to 95° C. Methyl acrylate was added to the reaction mixture at a rate of addition of 0.05 ml/min such that the final reaction mixture contained 90% of methyl acrylate. Samples were withdrawn at certain time periods. From the composition data obtained from NMR measurements of these samples and from GPC measurement of the molecular weights relative to polystyrene standards, the compositional gradient along the chain of the final copolymer was calculated (FIGS. 9A–B). The final polymer (3.08 g) was purified by reprecipitation from methanol/THF. DSC measurements of the final copolymer show a single glass transition with $T_g=58°$ C.

Example 21:
Branched and Hyperbranched Polymers

Homopolymerizations were performed as follows: Typically, p-chloromethylstyrene, p-CMS, was polymerized in the presence of CuCl (1% relative to PCS) and 2,2'-bipyridyl (3%), at 110° C., under oxygen free conditions, i.e., argon atmosphere. p-Chloromethylstyrene was added to a flask containing CuCl/bipyridyl. Immediately upon addition of p-CMS, a deep red, slightly heterogeneous solution was obtained. Heating resulted in the color of the solution changing from red to green within fifteen minutes of heating.

After a period of time the reaction was stopped and the sample dissolved in THF. Conversion was determined by $^1$H NMR, and was found to be greater than 80%. The samples showed almost no observable change in viscosity at the reaction temperature, but cooling to room temperature resulted in the sample becoming solid. The green copper(II) material was removed by passing the mixture through a column of alumina. Unprecipitated samples were analyzed by GPC relative to polystyrene standards. The polymer was then purified by precipitation into methanol from THF. These samples were then analyzed by $^1$H NMR to determine molecular weight. Table 9 outlines experimental results. All yields were >70%.

TABLE 9

Homopolymerization of p-Chloromethylstyrene
in the Presence of Cu (I) and 2,2'-Bipyridyl[a]

| Temperature | Time (h) | Conversion (%)[c] | $M_n^d$ | $M_n^e$ | $M_w/M_n^e$ | $M_n^f$ |
|---|---|---|---|---|---|---|
| 125° C. | 0.5 | 67 | 1900 | 1160 | 1.8 | 1070 |
| " | 1.0 | 75 | 2250 | 1780 | 2.1 | 1870 |
| " | 1.5 | 90 | 2940 | 2410 | 2.1 | 2480 |
| " | 2.0 | 92 | 6280 | 2510 | 2.5 | 2750 |

TABLE 9-continued

Homopolymerization of p-Chloromethylstyrene
in the Presence of Cu (I) and 2,2'-Bipyridyl[a]

| Temperature | Time (h) | Conversion (%)[c] | $M_n^d$ | $M_n^e$ | $M_w/M_n^e$ | $M_n^f$ |
|---|---|---|---|---|---|---|
| 110° C.[b] | 24.0 | 96 | 2420 | 2100 | 1.3 | — |

[a]Bulk polymerization, $[M]_o$ = 7.04 M, $[CuCl]_o$ = 0.07 M, $[bipy]_o$ = 0.21 M.
[b]Solution polymerization in benzene, [M] = 3.52 M, $[CuCl]_o$ = 0.035 M, $[bipy]_o$ = 0.11 M.
[c]Conversion based on consumption of double bonds.
[d]$M_n$ determined by $^1$H NMR after precipitation.
[e]$M_n$, $M_w$ determined of entire sample, prior to precipitation, by GPC, using linear polystyrene standards.
[f]$M_n$ by GPC, using linear polystyrene standards, after precipitation into methanol/brine.

Copolymerizations were carried out as follows: Styrene (18.18 g, 20 ml) was polymerized in a 50% w/v solution using p-dimethoxybenzene (20 g) as solvent. The amount of p-chloromethylstyrene was 2% (0.4 ml). The molar ratio of p-chloromethylstyrene/CuCl (0.2594 g)/2,2'-bipyridyl (1.287 g) was 1:1:3. The solids were placed in a flask with a rubber septum and magnetic stirrer, and degassed three times by vacuum and back filling with argon. Degassed monomer was added via syringe. The appropriate amount of p-chloromethyl-styrene was then added via syringe. The reaction was heated to 130° C. The reaction was quenched by precipitation into methanol. After 15 hours, conversion was 94.3% as determined by $^1$H NMR. Yield was 76%.

The sample was evaluated by SEC using relative calibration, and found to have Mn=13400 and $M_w$=75000. By universal calibration, in conjunction with light scattering, the $M_n$=31,600 and $M_w$=164,500.

Methyl methacrylate (20 ml, 18.72 g) was used in place of styrene. The reaction was run for 2 hours at 100° C. $M_{n,SEC}$=44,700 and $M_{w,SEC}$=112,400. $M_n$=58,700 (universal calibration), $M_w$=141,200 (light scattering).

Cross-Linked Polymers and Gels

Example 22:

Styrene (9.09 g, 10 ml) was polymerized in a 50% (w/vol.) solution using p-dimethoxybenzene (10 g) as solvent. The amount of p-chloromethylstyrene was 2% (0.2 ml). The molar ratio of p-chloromethylstyrene/CuCl (0.1297 g)/2,2'-bipyridyl (0.6453 g) was 1:1:3. The solids were placed in a flask with a rubber septum and magnetic stirrer, and degassed three times by vacuum and back filling with argon. Degassed monomer was added via syringe. p-Chloromethylstyrene was then added via syringe. The reaction was heated to 130° C. The reaction was quenched by precipitation into methanol. After 64.5 hours, conversion was 94.3% as determined by $^1$H NMR. Yield was 90%. A cloudy polymer solution was made in THF, but could not be passed through a 0.45 micron PTFE filter. Upon placing the solution in a centrifuge for 26 hours at 7000 rpm, the solution was clear with a slight layer of solid material at the bottom of the vial. The solution was passed through a 0.45 micron PTFE filter. $M_n$=118,000, $M_w/M_n$=3.74.

Example 23:

Styrene (9.09 g, 10 ml) was polymerized in a 50% (w/vol.) solution using p-dimethoxybenzene (10 g) as solvent. The amount of p-CMS was 10% (0.2 ml). The molar ratio of p-CMS/CuCl (0.1297 g)/2,2'-bipyridyl (0.6453 g) was 1:1:3. The solids were placed in a flask with a rubber septum and magnetic stirrer, and degassed three times by vacuum and back filling with argon. Degassed monomer was added via syringe. p-Chloromethyl styrene was then added via syringe. The reaction was heated to 130° C. The reaction was quenched by precipitation into methanol. After 24 hours, conversion was 94.3% as determined by $^1$H NMR. Yield was >90%. The polymer was stirred in THF but could not be dissolved. The polymer sample was placed in a soxhlet apparatus under refluxing THF to remove copper salts.

The obtained sample was placed in THF and allowed to come to equilibrium. The gel was determined to have an equilibrium THF content of 89%.

Example 24:
Difunctional Polymers

Polystyrene with two bromine or azide end groups were synthesized.

(A) α,ω-Dibromopolystyrene:

Styrene (18.18 g, 20 ml) was polymerized in a 50% (w/vol.) solution using p-dimethoxybenzene (20 g) as solvent. α,α'-Dibromo-p-xylene (1.848 g) was used as the initiator. The molar ratio of α,α'-Dibromo-p-xylene/styrene/CuBr (1.00 g)/2,2'-bipyridyl (3.28 g) was 1:1:3. The solids were placed in a flask with a rubber septum and magnetic stirrer, and degassed three times by vacuum and back filling with argon. Degassed monomer was added via syringe. The reaction was heated to 110° C. After 5.5 hours conversion was >95% as determined by $^1$H NMR. The reaction was quenched by precipitation into methanol. Yield was >90%. The polymer was redissolved in THF and precipitated into methanol three times. The polymer sample was dried under vacuum at room temperature overnight. Mn, as determined by comparison of the methine protons adjacent to bromine and the aliphatic protons, was 2340. SEC, Mn=2440.

(B) αω-Diazidopolystyrene:

A sample of the above α,ω-dibromopolystyrene (5.0 g) was dissolved in dry THF (20 ml) in the presence of tetrabutyl ammonium fluoride (1 mmol F$^-$/g) on silica gel (6.15 g). Trimethylsilyl azide (0.706 g, 0.81 ml) was then added via syringe. The solution was stirred for 16 hours under argon. $^1$H NMR showed complete conversion of the methine protons adjacent to bromine to being adjacent to $N_3$. $M_n$, by $^1$H NMR, was 2340. Infrared spectroscopy showed a peak at 2080 cm$^{-1}$, which corresponds to the azide functional group.

A sample of the α,ω-diazidopolystyrene (4.7 mg) was placed in a DSC sample pan and was heated to 250° C. and held for 15 minutes. A series of endo and exothermic peaks were seen starting at 215° C. The sample was allowed to cool and then dissolved in THF. The solution was injected into a SEC instrument. The Mn was 6500, a 250% increase in molecular weight. The distribution was broad, however.

Example 25:
Water Swellable Polymers
A: NVP/VAc-Cl Polymer:

N-vinylpyrrolidinone (50 ml, 48.07 g), vinyl chloroacetate (0.26 g, 0.25 ml), and AIBN (0.7102 g) were combined in a 300 ml three-neck, round-bottom flask. The monomers were degassed by bubbling argon through the mixture. The mixture was heated to 60° C. for 1 h. The resulting solid polymer was allowed to cool and then dissolved in THF. The solution was precipitated into hexanes, and the resulting polymer filtered and dried at 70° C. under vacuum for three days.

(B): Hydrogel A:

The NVP/VAc-Cl polymer (5.0 g) of Example 25(A) was dissolved in styrene (20 ml), in the presence of CuCl (0.0411 g) and 4,4'-di-t-butyl-2, 2'-bipyridyl (0.2224 g), under oxygen free conditions. The reaction mixture was heated to 130° C. After 30 minutes, the reaction mixture became gelatinous. The mixture was dissolved in DMF and precipitated into water. A gel-like mass was obtained and filtered. The resulting solid was a gel weighing 20.0 g. The gel was dried over $P_2O_5$ at 70° C. under vacuum for 2.5 days. Yield 4.0 g.

(C): Hydrogel B:

The NVP/VAc-Cl polymer (5.0 g) of Example 25(A) was dissolved in styrene (20 ml), in the presence of CuCl (0.0041 g) and 4,4'-di-t-butyl-2,2'-bipyridyl (0.0222 g), under oxygen free conditions. The reaction mixture was heated to 130° C. After two hours, the reaction mixture became gelatinous. The reaction was stirred for three more hours until the mixture was so viscous that the magnetic stir bar did not turn. The mixture was dissolved in DMF and precipitated into water. A gel-like mass was obtained and filtered. The resulting solid was a gel having a mass of 20.0 g. The gel was dried over $P_2O_5$ at 70° C. under vacuum for 2.5 days. Yield 4.0 g.

(D): Macromonomers of Styrene (i): Synthesis of Polystyrene with a Vinyl Acetate End Group (VAc-Styrene)

5K Polystyrene:

Cu(I)Cl (0.5188 g) and 2,2'-bipyridyl (2.40 g) were added to a 100 ml round bottom flask and sealed with rubber septum. The contents of the flask were placed under vacuum, then backfilled with argon. This was repeated two additional times. Diphenyl ether (30.0 ml), deinhibited styrene (30.0 ml) and vinyl chloroacetate (0.53 ml), all of which were previously degassed by bubbling argon through the liquids, were added to the flask via syringe. The reaction mixture was then heated to 130° C. for 6 hours. The reaction mixture was then transferred into methanol to precipitate the formed polymer. The precipitate was then twice reprecipitated from THF into methanol. The isolated white powder was then dried under vacuum at room temperature. Yield: 21.68 g (77.4%). GPC: $M_n$=4400, PD=1.22.

10K Polystyrene:

Cu(I)Cl (0.5188 g) and 2,2'-bipyridyl (2.40 g) were added to a 250 ml round bottom flask and sealed with a rubber septum. The contents of the flask were placed under vacuum, then backfilled with argon. This was repeated two additional times. Diphenyl ether (60.0 ml), deinhibited styrene (60.0 ml) and vinyl chloroacetate (0.53 ml), all of which were previously degassed by bubbling argon through the liquids, were added to the flask via syringe. The reaction mixture was then heated to 130° C. for 24 hours. The reaction mixture was then transferred into methanol to precipitate the formed polymer. The precipitate was then twice reprecipitated from THF into methanol. The isolated white powder was then dried under vacuum at room temperature. Yield: 44.36 g (81.3%). GPC: $M_n$=10,500, PD=1.25.

(ii): Synthesis of Water Swellable Polymers Copolymerization of N-Vinyl Pyrrolidinone (75 wt. %) with VAc-Styrene (Mn=4400; 25 wt. %):

AIBN (0.0106 g) and VAc-styrene (2.50 g) were added to a 50 ml round bottom flask and sealed with a rubber septum. The contents of the flask were placed under vacuum and backfilled with argon three times. Previously degassed DMSO (20.0 ml) and N-vinyl pyrrolidinone (7.5 ml) were added to the flask by syringe. The reaction was then heated to 60° C. for 20 hours. A highly viscous fluid was obtained and diluted with DMF (30.0 ml). The reaction mixture was precipitated into water. The precipitate was a swollen solid. This was filtered and dried under vacuum at 70° C. to produce the obtained polymer. The obtained polymer was placed in a water bath for 3 days. The equilibrium water content was 89%.

Copolymerization of N-Vinyl Pyrrolidinone (75 wt. %) with VAc-Styrene (Mn=10500. 25 wt. %)

AIBN (0.0106 g) and VAc-Styrene (2.50 g) were added to a 50 ml round bottom flask and sealed with a rubber septum. The contents of the flask were placed under vacuum and backfilled with argon three times. Previously degassed DMSO (20.0 ml) and N-vinyl pyrrolidinone (7.5 ml) were added to the flask by syringe. The reaction was then heated to 60° C. for 20 hours. A highly viscous fluid was obtained and diluted with DMF (30.0 ml). The reaction mixture was precipitated into water. The precipitate was a white, jelly-like mass. The liquid was decanted, the precipitate was air-dried overnight, and then dried under vacuum at 70° C. to produce the obtained polymer. $M_n$=116,000; PD=2.6.

After placing in a water bath for 3 days, the equilibrium water content was determined to be 89%.

Example 26:
Thiocyanate transfer polymerizations

It has been previously reported that thiocyanate (SCN) is transferred from Cu(SCN)$_2$ to an alkyl radical at roughly the same rate as chloride from CuCl$_2$ (Kochi et al, *J. Am. Chem. Soc.*, 94, 856, 1972).

A 3:1:1 molar ratio of ligand (2,2'-bipyridyl [bipy] or 4,4'-di-n-heptyl-2,2'-bipyridyl [dHbipy]) to initiator (PhCH$_2$SCN) to transition metal compound (CuSCN) was used for each polymerization. The initiator system components were weighed and combined in air under ambient conditions. The reactions were run in bulk according to the procedure of Example 4, but at 120° C.

Reactions employing bipy were very viscous after 5 h, at which time they were cooled to room temperature. Reactions employing dHbipy were not viscous after 5 h, and were therefore heated for 24 h before cooling to room temperature. Results are shown in Table 10 below.

TABLE 10

| Ligand | M/I | % Conv. | $M_n$ | PDI |
|---|---|---|---|---|
| bipy | 193 | 39 | 158,300 | 1.61 |
| bipy | 386 | 43 | 149,100 | 1.75 |
| dHbipy | 193 | 86 | 28,100 | 2.10 |
| dHbipy | 386 | 89 | 49,500 | 1.89 | where "M/I" is the monomer/initiator ratio, "% Conv." refers to the percent conversion, and "PDI" refers to the polydispersity.

The bipy reactions showed less than optimal molecular weight control, but the dhbipy reactions showed excellent molecular weight control. It is believed that PDI can be improved further by increasing the amount or concentration of Cu(II) at the beginning of polymerization.

Example 27:
Synthesis of comb-shaped PSt

The macro ATRP initiator, poly(p-chloromethylstyrene), PCMS, was synthesized by polymerizing p-chloromethylstyrene (0.02 mol) in benzene (50%) at 60° C. for 24 hours using ICH$_2$CN (0.0023 mol) and AIBN (0.0006 mol). Yield: 92%. $M_n$=1150, $M_w/M_n$=1.20.

Subsequently, a degassed solution containing St (0.012 mol), purified PVBC (9.6×10$^{-5}$ mol), CuCl (1.5×10$^{-4}$ mol) and bipy (4.5×10$^{-4}$ mol) was heated at 130° C. for 18 hrs.

Comb-shaped PSt was obtained (yield=95%). $M_n$=18500, /$M_w/M_n$=1.40. At lower initial concentrations of PCMS, higher molecular weight comb-shaped polystyrenes were formed ($M_n$=40,000 and 80,000 g/mol, as compared to linear polystyrene standards, cf. the first three entries in Table 15).

Example 28:
Synthesis of PVAc-g-PSt

Vinyl acetate end-capped PSt (PSt-VAc) was synthesized by polymerizing St (0.019 mol) in bulk at 130° C. for 18 h using ClCH$_2$COOCH=CH2 (0.0018 mol), CuCl (0.0018 mol) and bipy (0.0054 mol). Yield: 95%. Mn=1500, $M_w/M_n$=1.35.

Subsequently, a degassed solution containing vinyl acetate (5.8×10$^{-3}$ mol), purified PSt-VAc (6.67×10$^{-5}$ mol) and AIBN (1×10$^{-4}$ mol) in ethyl acetate was heated at 60° C. for 48 h (ca. 85% conversion of macromonomer). Final grafting copolymer composition: Mn=54500, $M_w/M_n$=1.70.

Example 29:
End-Functional Polymers

One of the advantages of ATRP process is that one can synthesize well-defined end-functional polymers by using functional alkyl halides and transition metal species (Scheme 4).

Scheme 4

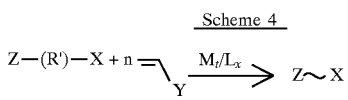

Tables 11 and 12 report the characterization data of ATRP's of St using various functional alkyl halides as initiators under typical ATRP experimental conditions.

From Table 11, it appears that acid-containing alkyl halides give rise to relatively uncontrolled polymers (e.g., limited conversions, higher molecular weights than expected, and relatively broad molecular weight distributions). This suggests that CuCl may react with these alkyl halides with formation of side products which disturb the "living" ATRP process.

Using 3-chloro-3-methyl-1-butyne, the monomer conversion was almost quantitative. However, the experimental molecular weight is ca. 3 times as high as expected, and the polydispersity is as high as 1.95. This suggests that initiation is slow and the triple bond might also be attacked by the forming radicals.

In addition, using 2-(bromomethyl)naphthalene and 9-(chloromethyl)anthracene as initiators, the polymers obtained showed properties as good as polymers obtained by using 1-alkyl-2-phenylethyl halide initiators. However, 1,8-bis(bromomethyl)naphthalene does not seem to be as efficient an ATRP initiator as 2-(bromomethyl)naphthalene and 9-(chloromethyl)anthracene under the same conditions.

More importantly, several Pst macromonomers containing polymerizable double bonds can be obtained in a controlled manner (Table 11). The $^1$H NMR spectrum of Pst initiated with vinyl chloroacetate in the presence of 1 molar equiv. of CuCl and 3 molar equiv. of bipy at 130° C. shows signals at 4.0 to 5.5 ppm, assigned to vinylic end-groups. A comparison of the integration of the vinylic protons with the protons in the backbone gives a molecular weight similar to the molecular weight obtained from SEC; i.e., a functionality close to 0.90. This suggests that the double bond is unreactive towards a minute amount of St type radicals during ATRP of St.

TABLE 11

ATRP Synthesis of End-Functional Polymers[a]

| RX | CuX | Conv. % | $M_{n,th.}$[b] | $M_n$,SEC | $M_w/M_n$ |
|---|---|---|---|---|---|
| ClCH$_2$—COOH | CuCl | 60 | 3000 | 12500 | 1.50 |
| HC≡CC(CH$_3$)$_2$Cl | CuCl | 95 | 4800 | 14100 | 1.90 |
| ClCH$_2$—CONH$_2$ | CuCl | 70 | 3500 | 21300 | 1.70 |
| 9-(chloromethyl)anthracene | CuCl | 92 | 4140 | 6730 | 1.35 |
| 1-(bromomethyl)naphthalene | CuBr | 96 | 1200 | 1010 | 1.35 |
| 1-(bromomethyl)naphthalene | CuBr | 99 | 5260 | 4300 | 1.25 |
| 1,8-bis(bromomethyl)naphthalene | CuBr | 75 | 1180 | 820 | 1.25 |
| BrCH$_2$—CH=CH$_2$ | CuBr | 99 | 5260 | 6500 | 1.23 |
| " | CuBr | 99 | 1000 | 970 | 1.23 |
| ClCH$_2$—COOCH=CH$_2$ | CuCl | 95 | 1000 | 1500 | 1.35 |
| " | CuCl | 98 | 3000 | 3150 | 1.30 |
| " | CuCl | 99 | 5000 | 5500 | 1.30 |
| CH$_3$CHBr—COOCH$_2$CH=CH$_2$ | CuBr | 90 | 4730 | 4580 | 1.40 |

[a]Polymerization conditions: molar ratio of RX/CuX/Bpy: 1/1/3; temp: Cl-ATRP, 130° C.; Br-ATRP, 110° C.
[b]Calculated based on $M_n = M_o \times (D[M]/[RX]_o)$.

Example 30:

Sequential Block Copolymerization

ATRP can also be successfully used to produce well-defined di- and tri-block copolymers by means of sequential addition technique.

As seen in Table 12, di- and tri-block copolymers of St and MA obtained are very well defined, regardless of monomer addition order. The molecular weights are close to theoretical, and molecular weight distributions remain very narrow, $M_w/M_n$ from ~1.0 to ~1.25. SEC traces show that almost no first polymer contaminates the final block copolymer.

DSC measurements of several samples in Table 12 were also carried out. There appears to be two glass transition temperatures around 30° and 100° C., very close to the Tg's of PMA and PSt, respectively. NMR analysis of the purified polymer also shows the presence of PMA and PSt segments. All these results indicate that well-defined block copolymers have been synthesized.

TABLE 12

Synthesis of Di- and Tri- Block Copolymers Through Sequential Addition[a]

| Monomer Sequence | $M_n$, SEC (First block) | $M_w/M_n$ (First block) | $M_n$, calc. (Co-polymer) | $M_n$, SEC (Co-polymer) | M, NMR (Co-polymer) | $M_w/M_n$ (Co-polymer) |
|---|---|---|---|---|---|---|
| PMA-PSt | 6040 | 1.25 | 8920 | 8300 | — | 1.20 |
| " | 5580 | 1.20 | 10900 | 10580 | — | 1.12 |
| " | 15100 | 1.14 | 20700 | 21700 | — | 1.2 |
| " | 10000 | 1.25 | 21800 | 29000 | 27500 | 1.2 |
| " | 3900 | 1.25 | 18700 | 21400 | — | 1.13 |

TABLE 12-continued

Synthesis of Di- and Tri- Block Copolymers Through Sequential Addition[a]

| Monomer Sequence | $M_n$, SEC (First block) | $M_w/M_n$ (First block) | $M_n$, calc. (Co-polymer) | $M_n$, SEC (Co-polymer) | M, NMR (Co-polymer) | $M_w/M_n$ (Co-polymer) |
|---|---|---|---|---|---|---|
| PSt-PMA-PSt | 9000 | 1.25 | 23800 | 26100 | 25500 | 1.40 |
| " | 12400 | 1.25 | 23800 | 24200 | — | 1.15 |
| " | 4000 | 1.25 | 12100 | 19200 | 18500 | 1.13 |
| PMA-PSt-PMA | 5300 | 1.13 | 12900 | 12600 | — | 1.25 |
| " | 7700 | 1.14 | 21700 | 21300 | — | 1.20 |

[a]All polymerizations were carried out at 110° C.
[b]Initiators used: di-block copolymer: 1-phenylethyl bromide; tri-block copolymers: α,α'-dibromoxylene ATRP is superior to living ionic polymerization for producing well-controlled block copolymers. First of all, the experimental conditions are relatively mild. Furthermore, cross-propagation is facile, leading to block copolymerization regardless of monomer addition order, as exemplified by the MA and St copolymerization above. Moreover, tri-block copolymers can be easily obtained by using a di-functional initiator. As expected, star-shaped block copolymers can be obtained by using multi-functional alkyl halides.

Example 31:
Star-Shaped Polymer (i) Synthesis of 4- and 6-arm star shaped PSt using 1,2,4,5-tetrakis(bromomethyl)benzene and hexakis (bromomethyl)benzene as initiator.

Table 13 lists the results regarding synthesis of four-arm and six-arm star-shaped PSt using 1,2,4,5-tetrakis (bromomethyl)benzene and hexakis(bromomethyl)benzene as initiator, respectively. The molecular weight distribution is fairly narrow, i.e., $M_w/M_n<1.3$ The $M_n$ of these star-shaped polymers linearly increases with monomer conversion, indicating the presence of negligible amount of chain in transfer reactions (data not shown).

A key question involves whether the forming polymers have six or four arms. Thus, ATRP of deuterated styrene was performed using hexakis(bromomethyl)benzene as an initiator in the presence of 2 molar equiv. of CuBr and 6 molar equiv of bipy at 110° C., the same experimental conditions employed for synthesizing the six-arm PSt listed in Table 13.

Except for the observation of a —CH$_2$— resonance at ca. 1.55 ppm, the $^1$H NMR signals corresponding to —CH$_2$Br, which usually resonate at ca. 5.0 ppm, cannot be detected at all in the $^1$H NMR spectrum of the PSt-d$_8$. This provides strong evidence that a six-arm PSt-d$_8$ was produced.

TABLE 13

Synthesis of 4- and 6-Arm PSt Using $C_6H_2(CH_2-Br)_4$ and $C_6(CH_2-Br)_6$ as Initiators at 110° C.[a]

| Time, h | Yield, % | $M_n$, calc. | $M_n$, SEC | $M_n/M_n$ |
|---|---|---|---|---|
| 4.75[b] | 90 | 9000 | 12300 | 1.65 |
| 5[b] | 90 | 27000 | 31100 | 1.29 |
| 71[b] | 85 | 51200 | 62400 | 1.23 |
| 16[c] | 92 | 13000 | 11800 | 1.30 |
| 16[c] | 89 | 36400 | 28700 | 1.25 |

[a][R-Br]$_0$/[CuBr]$_0$/[bpy]$_0$ = 1/2/6;
[b]six-arm;
[c]four-arm (ii) Synthesis of 4- and 6-arm star-shaped PMA and PMMA using 1,2,4,5 tetrakis(bromomethyl)benzene and hexakis(bromomethyl)benzene as initiator As noted in Table 14, 4- and 6-arm PMA and PMMA can also be synthesized by using the same technique for star-shaped St polymerization. However, it may be advantageous to lower the concentration of the catalyst (e.g., CuBr—bipy), otherwise gelation may occur at a relatively low monomer conversion.

This appears to confirm the radical process of ATRP. On the other hand, it also suggests that the compact structure of growing polymer chains may affect the "living" course of ATRP, since at the same concentration of initiating system, MA and MMA ATRP represents a rather controlled process, when a mono-functional initiator was used.

TABLE 14

Synthesis of 4- and 6-Arm PMA and PMMA Using $C_6H_2(CH_2-Br)_4$ and $C_6(CH_2-Br)_6$ as Initiator at 110° C.[a]

| R-Br/CuBr/bpy | polymer | Time, h | Yield, % | $M_n$, calc | $M_n$, SEC | $M_n/M_w$ |
|---|---|---|---|---|---|---|
| 1/2/6 | $C_6(PMA)_6$ | 5 | 95 | 9500 | 10500 | 1.55 |
| " | " | 4 | 90 | 9000 | 9700 | 1.65 |
| " | $C_6(PMMA)_6$ | 4.5 | 92 | 9100 | 12000 | 1.75 |
| " | $C_6H_2(PMA)_4$ | 25 | gel | 20000 | — | — |
| " | $C_6H_2(PMA)_4$ | 25 | gel | 40000 | — | — |
| 1/1/3 | " | 18 | 95 | 9500 | 6750 | 1.23 |
| " | $C_6H_2(PMMA)_4$ | 20 | 0.90 | 9000 | 9240 | 1.72 |
| " | " | 20 | 0.91 | 18200 | 17500 | 1.49 |

[a]Polymerization at 110° C.

Example 32:
Graft Technique

Well-defined comb-shaped PSt has been successfully obtained using PCMS as an ATRP initiator. Table 15 shows the SEC results of final polymers. The MWD is rather narrow.

TABLE 15

Synthesis of Graft Copolymers Using PCMS (DP$_n$ = 11) as Initiator[a]

| Monomer | Time, hr | Yield, % | M$_n$, SEC | M$_w$/M$_n$ |
|---|---|---|---|---|
| St[b] | 18 | 95 | 18500 | 1.40 |
| St[b] | 18 | 90 | 38500 | 1.35 |
| St[b] | 18 | 85 | 80500 | 1.54 |
| BA | 15 | 95 | 18400 | 1.60 |
| MMA | 15 | 95 | 37700 | 1.74 |
| BA[c] | 22 | 90 | 24000 | 1.46 |
| MMA[c] | 22 | 90 | 46500 | 1.47 |
| MMA[c] | 22 | 85 | 51100 | 1.44 |

[a]Polymerization at 130° C. in bulk.
[b]Taken from Example 27.
[c]Polymerization in 50% ethyl acetate solution.

Similar to 4- and 6-arm polymers, a key question is whether all chlorine atoms in PCMS participate in the ATRP. A comparison of the $^1$H NMR spectra of PCMS and PSt-d$_8$-g-PCMS shows that the resonances at ca. 5 ppm, corresponding to CH$_2$Cl in PCMS, completely disappear, suggesting the formation of pure PSt comb-copolymer.

Example 33:
Synthesis of ABA Block Copolymers with B=2-Ethylhexyl Acrylate (a) Synthesis of Center B Block (α,ω-Dibromopoly(2-ethylhexyl acrylate))

To a 50 ml round bottom flask, CuBr (0.032 g), dTBiby (0.129 g) and α,α'-dibromo-p-xylene (0.058 g) were added. The flask was then sealed with a rubber septum. The flask was degassed by applying a vacuum and backfilling with argon. Degassed and deinhibited racemic 2-ethylhexyl acrylate (10.0 ml) was then added via syringe. Degassed diphenyl ether (10.0 ml) was also added by syringe. The reaction was heated to 100° C. and stirred for 24 hours. Conversion by $^1$H NMR was >90%. M$_n$=40,500; M$_w$/M$_n$=1.35.

(b) A=Methyl Methacrylate

To the reaction mixture obtained in Example 33(a) containing the poly(2-ethylhexyl acrylate), methyl methacrylate (4.53 ml) was added by syringe. The reaction was stirred at 100° C. for 8 hours. Conversion of MMA>90%. Mn (overall)=58,000; M$_w$/M$_n$=1.45.

(c) A=Acrylonitrile

The experiment of Example 33(a) was repeated. To the reaction mixture containing the (2-ethylhexyl acrylate) (M$_n$=40,500; M$_w$/M$_n$=1.35), acrylonitrile (5.44 ml) was added by syringe. The reaction was stirred at 100° C. for 72 hours. Conversion of acrylonitrile=35%. M$_n$ (overall)=47,200; M$_w$/M$_n$=1.45.

Example 34:
Synthesis of MMA-BA-MMA Block Copolymer Synthesis of α,ω-dibromopoly(butyl acrylate):

To a 50 ml round bottom flask, α,α'-dibromo-p-xylene (0.0692 g), CuBr (0.0376 g), and 2,2'-bipyridyl (0.1229 g) were added and sealed with a rubber septum. The flask was then evacuated and filled with argon three times. Previously degassed butyl acrylate (15.0 ml) and benzene (15.0 ml) were added via syringe. The reaction was heated to 100° C. for 48 hours, after which time the conversion was 86.5%, as determined by $^1$H NMR. The reaction mixture was poured into cold methanol (−78° C.) to precipitate the polymer. The precipitate was filtered. The obtained solid was a tacky, highly viscous oil. M$_n$=49,000, M$_w$/M$_n$=1.39.

Synthesis of poly(MMA-BA-MMA):

In a round bottom flask, α,ω-dibromopoly(butyl acrylate) (2.0 g), CuBr (0.0059 g), 2,2'-bipyridyl (0.0192 g) and dimethoxybenzene (2.0 g) were added. The flask was sealed with a rubber septum and placed under an argon atmosphere as described above for the synthesis of α,ω-dibromopoly (butyl acrylate). Degassed methyl methacrylate (0.73 ml) was added via syringe. The reaction was heated to 100° C. for 5.25 hours. The conversion was determined to be 88.8% by $^1$H NMR. The reaction mixture was poured into methanol to precipitate the polymer. The solid which was obtained was colorless and rubbery. M$_n$=75,400, M$_w$/M$_n$=1.34.

Example 35:
Synthesis of poly(p-t-butylstyrene)

To a 100 ml round bottom flask, dimethoxybenzene (25.0 g), CuCl (0.2417 g) and 2,2'-bipyridyl (1.170 g) were added and sealed with a rubber septum. The flask was then evacuated and filled with argon three times. Degassed t-butylstyrene (28.6 ml) and 1-phenylethyl chloride (0.33 ml) were added via syringe. The reaction was then heated to 130° C. for 8.5 hours. The reaction mixture was precipitated into methanol, filtered and dried. M$_n$=5531. M$_w$/M$_n$=1.22.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters PATENT of the United States is:

1. A controlled free radical polymerization process, of atom or group transfer radical polymerization, comprising the steps of:

radically polymerizing one or more radically (co) polymerizable monomers in the presence of a system comprising:

an initiator having one or more radically transferable atoms or groups, a transition metal compound which participates in a reversible redox cycle with said initiator or a dormant polymer chain end, and in its redox conjugate form with a growing polymer chain end radical, an amount of the redox conjugate of the transition metal compound sufficient to deactivate at least some initially-formed radicals, wherein the transition metal compound and the redox conjugate are present in amounts providing a transition metal compound:redox conjugate molar ratio of from 99.9:0.1 to 0.1:99.9, and any N-, O-, P- or S- containing ligand which coordinates in a σ-bond to the transition metal, any carbon-containing ligand which coordinates in a π-bond to the transition metal or any carbon-containing ligand which coordinates in a carbon-transition metal a-bond but which does not form a carbon-carbon bond with said monomer under the polymerizing conditions, wherein said transition metal compound and said ligand are matched with one another in order to provide reaction with said initiator to reversibly generate a radical; to form a (co)polymer.

2. The process of claim 1, further comprising the step of adding said redox conjugate to a reaction vessel prior to said polymerizing step.

3. The process of claim 1, further comprising the step of exposing said transition metal compound to oxygen for a length of time sufficient to form said redox conjugate.

4. The process of claim 1, wherein said polymerizing is conducted in an aqueous medium.

5. The process of claim 1, wherein said transition metal compound participates in a reversible redox cycle with said initiator and said (co)polymer.

6. The process of claim 1, wherein said initiator comprises a compound of the formula:

$R^{11}R^{12}R^{13}C-X$ $R^{11}C(O)-X$ $R^{11}R^{12}R^{13}Si-X$ $R^{11}R^{12}N-X$ $R^{11}N-X_2$ $(R^{11})_nP(O)_m-X_{3-n}$ $(R^{11}O)_nP(O)_m-X_{3-n}$ and/or $(R^{11})(R^{12}O)P(O)_m-X$ wherein:

X is selected from the group consisting of Cl, Br, I, $OR^{10}$, $SR^{14}$, $SeR^{14}$, $OC(=O)R^{14}$, $OP(=O)R^{14}$, $OP(=O)(OR^{14})_2$, $OP(=O)OR^{14}$, $O-N(R^{14})_2$, $S-C(=S)N(R^{14})_2$, CN, NC, SCN, CNS, OCN, CNO and $N_3$, where $R^{10}$ is alkyl of from 1 to 20 carbon atoms in which each of the hydrogen atoms may be independently replaced by halide, alkenyl of from 2 to 20 carbon atoms, alkynyl of from 2 to 20 carbon atoms, phenyl or aralkyl which may be substituted with from 1 to 5 halogen atoms or alkyl groups of from 1 to 4 carbon atoms, and $R^{14}$ is independently aryl or a straight or branched $C_1$–$C_{20}$ alkyl group, or where an $N(R^{14})_2$ group is present the two $R^{14}$ groups may be joined to form a 5-, 6- or 7 membered heterocyclic ring;

$R^{11}$, $R^{12}$ and $R^{13}$ are each independently selected from the group consisting of H, halogen, $C_1$–$C_{20}$ alkyl, $C_3$–$C_8$ cycloalkyl, $C(=Y)R^5$, $C(=Y)NR^6R^7$, COCl, OH, CN, $C_2$–$C_{20}$ alkenyl or alkynyl, oxiranyl, glycidyl, aryl, heterocycyl, aralkyl, aralkenyl, $C_2$–$C_6$ alkylene or alkenylene substituted with oxiranyl or glycidyl, $C_1$–$C_6$ alkyl in which from 1 to all of the hydrogen atoms are replaced with halogen, and $C_1$–$C_6$ alkyl substituted with from 1 to 3 substituents selected from the group consisting of $C_1$–$C_4$ alkoxy, aryl, heterocyclyl, $C(=Y)R^5$, $C(=Y)NR^5R^7$ (where $R^6$ and $R^7$ are as defined above), oxiranyl and glycidyl; where $R^5$ is alkyl of from 1 to 20 carbon atoms, alkylthio of from 1 to 20 carbon atoms, or 24 (where $R^{24}$ is H or an alkali metal), alkoxy of from 1 to 20 carbon atoms, aryl, aralkyl, heterocyclyl, aryloxy or heterocyclyloxy;

$R^6$ and $R^7$ are independently H or alkyl of from 1 to 20 carbon atoms, or $R^6$ and $R^7$ may be joined together to form an alkylene group of from 2 to 7 carbon atoms, thus forming a 3- to 8-membered ring, and $R^8$ is H, straight or branched $C_1$–$C_{20}$ alkyl or aryl; m is 0 or 1; and n is 0, 1 or 2 wherein when $R^{11}$, $R^{12}$ and $R^{13}$ are other than hydrogen or halogen, each can, independently, be substituted with an X group as defined above.

7. The process of claim 1, wherein said ligand has a formula selected from the group consisting of $R^{16}-Z-R^{17}$ $R^{16}-Z-(R^{18}-Z)_m-R^{17}$ and $R^{20}R^{21}C(C(=Y)R^5)_2$ where:

$R^{16}$ and $R^{17}$ are independently selected from the group consisting of H, $C_1$–$C_{20}$ alkyl, aryl, heterocyclyl, and $C_1$–$C_6$ alkyl substituted with $C_1$–$C_6$ alkoxy, $C_1$–$C_4$ dialkylamino, $C(=Y)R^5$, $C(=Y)R^6R^7$ and/or $YC(=Y)R^8$, or $R^{16}$ and $R^{17}$ can be joined to form a saturated, unsaturated or heterocyclic ring, where Y is $NR^8$, S or O, $R^5$ is alkyl of from 1 to 20 carbon atoms, alkylthio of from 1 to 20 carbon atoms, $OR^{24}$ (where $R^{24}$ is H or an alkali metal), alkoxy of from 1 to 20 carbon atoms, aryl, aralkyl, heterocyclyl, aryloxy or heterocyclyloxy, $R^6$ and $R^7$ are independently H or alkyl of from 1 to 20 carbon atoms, or $R^6$ and $R^7$ may be joined together to form an alkylene group of from 2 to 7 carbon atoms, thus forming a 3- to 8-membered ring, and $R^8$ is H, straight or branched $C_1$–$C_{20}$ alkyl or aryl;

each $R^{18}$ is independently a divalent group selected from the group consisting of $C_2$–$C_4$ alkylene and $C_2$–$C_4$ alkenylene where the covalent bonds to each Z are at vicinal positions or at β-positions, and $C_3$–$C_8$ cycloalkanediyl, $C_3$–$C_8$ cycloalkenediyl, arenediyl and heterocyclylene where the covalent bonds to each Z are at vicinal positions;

Z is O, S, $NR^{19}$ or $PR^{19}$, where $R^{19}$ is selected from the same group as $R^{16}$ and $R^{17}$;

each of $R^{20}$ and $R^{21}$ is independently selected from the group consisting of H, halogen, $C_1$–$C_{20}$ alkyl, aryl and heterocyclyl, and $R^{20}$ and $R^{21}$ may be joined to form a $C_3$–$C_8$ cycloalkyl ring or a hydrogenated aromatic or heterocyclic ring; and m is from 1 to 6;

where at least one of $R^{16}$ and $R^{17}$ or at least one of $R^{20}$ and $R^{21}$ are $C_2$–$C_{20}$ alkyl, $C_1$–$C_6$ alkyl substituted with $C_1$–$C_6$ alkoxy and/or $C_1$–$C_4$ dialkylamino, or are aryl or heterocyclyl substituted with at least one aliphatic substituent selected from the group consisting of $C_1$–$C_{20}$ alkyl, $C_2$–$C_{20}$ alkenyl, $C_2$–$C_{20}$ alkynyl and alkyl-substituted aryl such that at least two carbon atoms are members of the aliphatic substituent(s).

8. A process of controlled free radical polymerization by atom or group transfer radical polymerization, comprising the steps of:

polymerizing one or more radically (co)polymerizable monomers in a homogeneous reaction medium comprising:

an initiator having one or more radically transferable atoms or groups, a transition metal compound which participates in a reversible redox cycle with said initiator or a dormant polymer chain end, and any N-, O-, P- or S- containing ligand which coordinates in a σ-bond to the transition metal, any carbon-containing ligand which coordinates in a π-bond to the transition metal or any carbon-containing ligand which coordinates in a carbon-transition metal σ-bond but which does not form a carbon-carbon bond with said monomer under the polymerizing conditions, wherein said transition metal compound and said ligand are matched with one another in order to provide reaction with said initiator to reversibly generate a radical, and wherein said transition metal compound and said ligand are selected in order to render the transition metal complex thus formed soluble in the homogeneous reaction medium; to form a (co)polymer.

9. A process for preparing a graft copolymer, comprising the process of claim 1, wherein said initiator is a (co)polymer macroinitiator having one or more radically transferable atoms or groups.

10. The process of claim 9, further comprising the step of preparing said (co)polymer macroinitiator.

11. A process for preparing a graft copolymer, comprising:
preparing a (co)polymer macroinitiator having one or more radically transferable atoms or groups by a conventional polymerization process,
grafting from said (co)polymer macroinitiator one or more further (co)polymer chains or blocks by the process of claim 1 to form a graft (co)polymer.

12. The process of claim 1, wherein said process is performed in bulk.

13. The process of claim 1, wherein said process is performed in an inorganic medium.

14. The process of claim 1, wherein the N-, O-, P- or S-containing ligand which coordinates in a π-bond to the transition metal is chosen to render the transition metal complex thus formed soluble in the polymerization medium.

15. The process of claim 1, wherein said one or more radically polymerizable monomers is added continuously to the polymerization process.

16. The process of claim 8, wherein the N-, O-, P- or S-containing ligand which coordinates in a π-bond to the transition metal is chosen to render the transition metal complex thus formed soluble in the polymerization medium.

17. The process of claim 8, wherein said one or more radically polymerizable monomers is added continuously to the polymerization process.

18. The process of claim 1, wherein said one or more radically polymerizable monomers is added in portions to the polymerization process.

19. The process of claim 8, wherein said one or more radically polymerizable monomers is added in portions to the polymerization process.

20. The process of claim 1, wherein said one or more radically polymerizable monomers comprise a first vinyl monomer and a second vinyl monomer, wherein said first vinyl monomer is an electron donor and said second vinyl monomer is an electron acceptor.

21. The process of claim 1, wherein said initiator is formed in situ by reaction of a conventional free radical generating compound with a transition metal compound present in a higher of two available oxidation states for said transition metal compound, such that a radically transferable atom or group is transferred from the transition metal compound to a free radical generated by said conventional free radical generating compound to form said initiator.

22. The process of claim 8, wherein said one or more radically polymerizable monomers comprise a first vinyl monomer and a second vinyl monomer, wherein said first vinyl monomer is an electron donor and said second vinyl monomer is an electron acceptor.

23. The process of claim 8, wherein said initiator is formed in situ by reaction of a conventional free radical generating compound with a transition metal compound present in a higher of two available oxidation states for said transition metal compound, such that a radically transferable atom or group is transferred from the transition metal compound to a free radical generated by said conventional free radical generating compound to form said initiator.

24. The process of claim 1 wherein the transition metal compound is added to the monomers a sufficient amount of time prior to addition of the initiator to allow any dissolved oxygen to react with the transition metal compound and form the redox conjugate of the transition metal compound.

* * * * *